US009365163B2

(12) United States Patent
Matsumoto et al.

(10) Patent No.: US 9,365,163 B2
(45) Date of Patent: Jun. 14, 2016

(54) DEVICE FOR VISUALLY CONFIRMING FORWARD DIRECTION

(75) Inventors: Yoshiyuki Matsumoto, Utsunomiya (JP); Yuya Kishimoto, Utsunomiya (JP); Hiroshi Uematsu, Hiki-gun (JP); Yuji Kuwashima, Shioya-gun (JP); Miku Sasaki, Utsunomiya (JP); Toshihiro Hashimoto, Haga-gun (JP)

(73) Assignee: HONDA MOTOR CO., LTD., Tokyo (JP)

( * ) Notice: Subject to any disclaimer, the term of this patent is extended or adjusted under 35 U.S.C. 154(b) by 826 days.

(21) Appl. No.: 13/583,269

(22) PCT Filed: Feb. 15, 2011

(86) PCT No.: PCT/JP2011/053134

§ 371 (c)(1),
(2), (4) Date: Sep. 7, 2012

(87) PCT Pub. No.: WO2011/111480

PCT Pub. Date: Sep. 15, 2011

(65) Prior Publication Data

US 2013/0038956 A1 Feb. 14, 2013

(30) Foreign Application Priority Data

Mar. 10, 2010 (JP) ................................ 2010-053751
Apr. 23, 2010 (JP) ................................ 2010-100065
Apr. 23, 2010 (JP) ................................ 2010-100066
May 18, 2010 (JP) ................................ 2010-114195
Oct. 19, 2010 (JP) ................................ 2010-234582

(51) Int. Cl.
*G02B 5/10* (2006.01)
*B60R 1/04* (2006.01)

(Continued)

(52) U.S. Cl.
CPC . *B60R 1/10* (2013.01); *B60R 1/006* (2013.01); *B60R 1/04* (2013.01); *B60R 1/082* (2013.01); *G02B 5/10* (2013.01); *G02B 17/0605* (2013.01)

(58) Field of Classification Search
CPC ........ G02B 5/10; G02B 17/0605; B60R 1/04; B60R 1/08; B60R 1/081; B60R 1/10; B60R 1/082
USPC .................. 359/855, 856, 857, 858, 859, 862
See application file for complete search history.

(56) References Cited

U.S. PATENT DOCUMENTS 1,533,937 A * 4/1925 Mógor .......................... 359/855
1,719,342 A * 7/1929 Rodgers, Jr. .................. 359/862

(Continued)

FOREIGN PATENT DOCUMENTS

CN 2361508 2/2000
CN 1315270 10/2001

(Continued)

OTHER PUBLICATIONS

Chinese Office Action dated Sep. 19, 2014, Application No. 201180021407.7, English translation of Search Report only included, 7 pages.

(Continued)

*Primary Examiner* — Ricky D Shafer

(74) *Attorney, Agent, or Firm* — Rankin, Hill & Clark LLP

(57) ABSTRACT

A device for visually confirming a forward direction that allows a crew member to visually confirm a desired range on the forward side of a vehicle includes a first reflecting mirror that reflects the desired range and a second reflecting mirror that reflects a reflected image reflected on the first reflecting mirror toward the crew member, the first reflecting mirror is arranged on a dashboard that is located inside the vehicle, and the second reflecting mirror is arranged on a lower side of the dashboard, and a first light transmitting part and a second light transmitting part are disposed in an area that connects the first reflecting mirror and the second reflecting mirror and an area that connects the second reflecting mirror and an eye-point of the crew member.

31 Claims, 30 Drawing Sheets

(51) Int. Cl.

| | |
|---|---|
| ***B60R 1/08*** | (2006.01) |
| ***B60R 1/10*** | (2006.01) |
| ***G02B 17/06*** | (2006.01) |
| ***B60R 1/00*** | (2006.01) |

(56) References Cited

U.S. PATENT DOCUMENTS

| | | | | |
|---|---|---|---|---|
| 1,727,727 | A * | 9/1929 | Ostrander | 359/862 |
| 1,768,191 | A * | 6/1930 | Crook | 359/527 |
| 2,674,921 | A * | 4/1954 | Williams | 359/862 |
| 2,854,882 | A * | 10/1958 | Cooper | 356/17 |
| 3,372,970 | A * | 3/1968 | Winkle | 359/527 |
| 3,857,632 | A | 12/1974 | Yamashita et al. | |
| 5,644,443 | A * | 7/1997 | Hung | 359/856 |
| 5,790,328 | A * | 8/1998 | Strauss et al. | 359/856 |
| 6,012,819 | A * | 1/2000 | Pai | 359/855 |
| 6,196,689 | B1 * | 3/2001 | Brown et al. | 359/857 |
| 6,715,894 | B1 * | 4/2004 | Taylor | 359/862 |

FOREIGN PATENT DOCUMENTS

| | | |
|---|---|---|
| GB | 2210835 | 6/1989 |
| JP | 63-064544 | 4/1988 |
| JP | 63-087144 | 6/1988 |
| JP | 4-016051 | 2/1992 |
| JP | 10-194044 | 7/1998 |
| JP | 2001-253295 | 9/2001 |
| JP | 2001-315575 | 11/2001 |
| JP | 2002-211318 | 7/2002 |
| JP | 2005-088790 | 4/2005 |
| JP | 2009-056934 | 3/2009 |

OTHER PUBLICATIONS

European Search Report, Application No. 11753142.6, dated Jan. 18, 2013, 3 pages.

* cited by examiner

DEVICE FOR VISUALLY CONFIRMING FORWARD DIRECTION

TECHNICAL FIELD

The present invention relates to a device for visually confirming a forward direction, which indirectly visually confirms the forward side of a vehicle.

Priority is claimed on Japanese Patent Application No. 2010-053751, filed Mar. 10, 2010, Japanese Patent Application No. 2010-114195, filed May 18, 2010, Japanese Patent Application No. 2010-100065, filed Apr. 23, 2010, Japanese Patent Application No. 2010-100066, filed Apr. 23, 2010, and Japanese Patent Application No. 2010-234582, filed Oct. 19, 2010, the content of which is incorporated herein by reference.

BACKGROUND ART

As devices for visually confirming a forward direction, devices are known in which imaging means is installed to a front portion of a vehicle, and an image that is imaged by the imaging means is projected to a monitor disposed inside the vehicle (for example, see Patent Document 1 and Patent Document 2).

In devices of such a type for visually confirming a forward direction, while a desired area in the forward direction of the vehicle can be satisfactorily visually confirmed, the cost of the imaging means and the monitor is high, and accordingly, it is desired that a less expensive structure be devised.

In addition, as a device for visually confirming a forward direction that does not use imaging means and a monitor, a device is proposed in which a reflecting mirror is arranged in a front portion of a vehicle (for example, see Patent Document 3).

In the device for visually confirming a forward direction, which is disclosed in Patent Document 3, one pair of reflecting mirrors that reflect the forward side of the vehicle on the left and right sides are disposed in an upper portion of a front bumper so as to protrude. In the case of this device for visually confirming a forward direction, since a structure is employed in which images reflected on the reflecting mirrors disposed outside the vehicle are directly visually confirmed by a crew member present on the inside of the vehicle, the images visually confirmed by the crew member are horizontally-reversed images so as to easily give a sense of discomfort to the crew member, and the reflecting mirrors may be easily contaminated or damaged.

As a device for visually confirming a forward direction, which is enhanced in this point, a device is proposed in which a first reflecting mirror directly reflecting the forward side of a vehicle and a second reflecting mirror reflecting a reflected image of the first reflecting mirror toward a crew member are installed inside the vehicle (see Patent Document 4 and Patent Document 5).

In the devices for visually confirming a forward direction, which are disclosed in Patent Document 4 and Patent Document 5, the first reflecting mirror that reflects the forward side of the vehicle is arranged in a portion of the ceiling near a room mirror inside the vehicle, and the second reflecting mirror is arranged on a dashboard disposed inside the vehicle. In these devices for visually confirming a forward direction, the horizontal reversal of a visually confirmed image can be removed through double reflection using the first reflecting mirror and the second reflecting mirror so as to improve the visibility, and the problems of becoming dirty and becoming damaged are also resolved by arranging both the reflecting mirrors inside the vehicle.

CITATION LIST

Patent Literature

[Patent Document 1] Japanese Unexamined Patent Application, First Publication No. 2001-315575

[Patent Document 2] Japanese Unexamined Patent Application, First Publication No. 2001-253295

[Patent Document 3] Japanese Unexamined Patent Application, First Publication No. 2002-211318

[Patent Document 4] Japanese Unexamined Utility Model Application, First Publication No. S63-64544

[Patent Document 5] Japanese Unexamined Patent Application, First Publication No. 2005-88790

SUMMARY OF INVENTION

Technical Problem

However, in the devices for visually confirming a forward direction, which are disclosed in Patent Document 4 and Patent Document 5, since the first reflecting mirror is arranged on the ceiling, there is a significant constraint on arranging the first reflecting mirror, which reflects the forward side of the vehicle, to the forward side of the vehicle.

In order to arrange the first reflecting mirror to a forward side of the vehicle as far as possible, it may be considered to install the first reflecting mirror in the upper portion of the dashboard together with the second reflecting mirror. However, in such a case, it is necessary to change the heights of the first reflecting mirror and the second reflecting mirror in the vertical direction, which results in one of the reflecting mirrors disturbing the field of vision of the crew member.

In addition, in the above-described devices for visually confirming a forward direction, since the first reflecting mirror is arranged near the ceiling inside the vehicle and is arranged therefrom toward the lower side of the forward side of the vehicle, it is possible to check the blind spot located on the lower side of a bonnet, but a blind spot located on the lateral side with respect to the traveling direction of the vehicle cannot be sufficiently checked.

In addition, in a case where an inclined posture of the first reflecting mirror with respect to the vertical direction of the vehicle is set up so as to broaden the visible range on the left and right sides of the forward side of the vehicle, external light such as a head light of a vehicle disposed on the opposite side or sun light is reflected, whereby there is a problem in that the visibility of other vehicles or the like is lowered.

In addition, there is a problem in that it is difficult to recognize proximity (a relative position and the like) of other vehicles that are located on the left side or the right side with respect to the traveling direction of the vehicle based on the mirror image reflected on the second reflecting mirror.

Thus, an object of an aspect of the present invention is to provide a device for visually confirming a forward direction, capable of improving the visibility without incurring an increase in the product cost.

In addition, an object of another aspect of the present invention is to provide a device for visually confirming a forward direction, capable of suppressing a decrease in the visibility due to external light.

Furthermore, an object of a another aspect of the present invention is to provide a device for visually confirming a forward direction that enables easy perception of the degree of proximity of an object (for example, other vehicle) that is located on the lateral side with respect to the traveling direction of the vehicle.

Solution to Problem (1) According to an aspect of the present invention, a device is provided for visually confirming a forward direction that allows a crew member to visually confirm a desired range on the forward side of a vehicle, the device including: a first reflecting mirror that reflects the desired range; and a second reflecting mirror that reflects a reflected image reflected on the first reflecting mirror toward the crew member, wherein the first reflecting mirror is arranged on a dashboard that is located inside the vehicle, and the second reflecting mirror is arranged on a lower side of the dashboard, and wherein a first light transmitting part and a second light transmitting part are disposed in an area that connects the first reflecting mirror and the second reflecting mirror and an area that connects the second reflecting mirror and an eye-point of the crew member.

Accordingly, an image of the forward side of the vehicle is reflected in the first reflecting mirror disposed on the dashboard, and the reflected image is reflected in the second reflecting mirror that is disposed on the lower side of the dashboard through the first light transmitting part. The reflected image reflected in this second reflecting mirror is visually recognized by a crew member through the second light transmitting part.

(2) In the aspect described in (1), it may be configured such that a protruded part that protrudes to the inside of the vehicle is disposed on the dashboard, and the second light transmitting part is formed on a face of the protruded part that is located on the backward side of the vehicle.

(3) In the aspect described in (1), it may be configured such that a protruded part that protrudes to the inside of the vehicle is disposed on the dashboard, and the first reflecting mirror is disposed on a face of the protruded part that is located on the forward side of the vehicle.

(4) In the aspect described in (1), it may be configured such that a protruded part that protrudes to the inside of the vehicle is disposed on the dashboard, and the first light transmitting part is disposed in the protruded part on a forward side of the vehicle.

(5) In the aspect described in (1), one of the first light transmitting part and the second light transmitting part may an opening that is disposed on the dashboard.

(6) In the aspect described in (1), the opening may be closed by a transmission plate through which light is transmitted.

(7) In the aspect described in (1), at least a cross-section of the first reflecting mirror along a vehicle width direction may be formed as a curved face having convex curvature that is convex to the forward side of the vehicle.

(8) In the aspect described in (1), at least a cross-section of the second reflecting mirror along a vehicle width direction may be formed as a curved face having concave curvature that is concave to the forward side of the vehicle.

(9) In the aspect described in (1), the second reflecting mirror may be arranged in front of the crew member seated on a seat of the vehicle.

(10) In the aspect described in (1), the first reflecting mirror and the second reflecting mirror may be arranged at the center of the vehicle width of the vehicle on the dashboard.

(11) In the aspect described in (1), it may be configured such that at least the cross-section of the second reflecting mirror along the vehicle width direction is formed as a curved face having concave curvature that is concave to the forward side of the vehicle, and the second reflecting mirror is arranged so as to be inclined such that a mirror face faces the driver's seat side.

(12) In the aspect described in (1), in a reflecting face of the first reflecting mirror, an end portion side in the vehicle width direction may be formed so as to be further inclined toward a lower side of a front portion than a center side in the vehicle width direction.

In such a case, the image of the forward side of the vehicle is reflected in the first reflecting mirror disposed on the dashboard, and the reflected image is reflected in the second reflecting mirror that is disposed on the lower side of the dashboard through the first light transmitting part. The reflected image reflected in the second reflecting mirror is visually recognized by the crew member through the second light transmitting part.

At this time, a wide range of the front portion side of the vehicle is reflected in the reflected face of the first reflecting mirror that is formed as a curved face having convex curvature. Since the reflecting face of the first reflecting mirror is formed as a curved face having convex curvature that is convex forward, the image of the first reflecting mirror is reflected in the second reflecting mirror such that both end portions in the vehicle width direction lower downward. On the other hand, in the reflecting face of the first reflecting mirror, the end portion side in the vehicle width direction is further inclined toward a lower side of the front portion than the center side, and accordingly, in the reflecting face of the first reflecting mirror that is reflected in the second reflecting mirror, the image of the forward side of the vehicle that is offset to a lower side of the center side on the end portion side in the vehicle width direction is reflected. Accordingly, although the image of the first reflecting mirror of which both end portions in the vehicle width direction lower downward is reflected in the second reflecting mirror, the image of the forward side of the vehicle in which the end portion side in the vehicle width direction is offset to a lower side of the center side is reflected in the reflecting face of the first reflecting mirror, and accordingly, the distortion of the end portion side of the image of the forward side that is viewed through the second reflecting mirror is suppressed.

(13) In the aspect described in (1), the reflecting face of the first reflecting mirror may be formed such that an angle of inclination toward the lower side of the front portion gradually increases from the center toward the end portion in the vehicle width direction.

(14) In the aspect described in (1), a reflecting face of the first reflecting mirror may be formed such that a radius of convex curvature of the end portion side in the vehicle width direction is larger than a radius of convex curvature of the center side in the vehicle width direction.

In such a case, the image of the forward side of the vehicle is reflected in the first reflecting mirror disposed on the dashboard, and the reflected image is reflected in the second reflecting mirror that is disposed on the lower side of the dashboard through the first light transmitting part. The reflected image reflected in the second reflecting mirror is visually recognized by the crew member through the second light transmitting part.

At this time, a wide range of the front portion side of the vehicle is reflected in the reflected face of the first reflecting mirror that is formed as a curved face having convex curvature. Since the reflecting face of the first reflecting mirror is formed as a curved face having convex curvature that is convex forward, the image of the first reflecting mirror is reflected in the second reflecting mirror so as to be further reduced toward the end portion in the vehicle width direction. On the other hand, in the reflected face of the first reflecting mirror, the radius of convex curvature on the end portion side in the vehicle width direction is formed to be larger than the radius of convex curvature on the center side in the vehicle width direction, and accordingly, the image of the forward side of the vehicle that is reflected in the end portion side in the vehicle width direction is enlarged more than the image of the forward side of the vehicle that is reflected on the center side. Accordingly, in the reflecting face of the second reflecting mirror, although the reflecting face of the first reflecting mirror is reflected so as to be further reduced toward the end portion of the vehicle width direction, in the reflecting face of the first reflecting mirror, the image of the forward side of the vehicle is reflected in which the end portion side in the vehicle width direction is enlarged more than the center side, whereby a difference between the sizes of the center side of the forward side of the vehicle and the end portion side that is viewed through the second reflecting mirror is corrected.

(15) In the aspect described in (1), the reflecting face of the first reflecting mirror may be formed such that a radius of convex curvature of the cross-section along the vehicle width direction gradually increases from the center side to the end portion side in the vehicle width direction.

(16) In the aspect described in (1), the reflecting face of the first reflecting mirror may be formed such that a radius of convex curvature of the cross-section along the vertical direction gradually increases from the center side to the end portion side in the vehicle width direction.

(17) In the aspect described in (1), a transmission suppressing part that suppresses transmission of light may be disposed in a center portion of a mirror face of one of the first reflecting mirror and the second reflecting mirror in the horizontal direction.

(18) In the aspect described in (1), the transmission suppressing part is disposed in the first reflecting mirror.

(19) In the aspect described in (1), in at least one of end portions of the mirror face of the first reflecting mirror in the horizontal direction, a second transmission suppressing part that suppresses transmission of light may be disposed at a position located on an upper side of the center of a line that joins an upper end and a lower end of the mirror face in the vertical direction of the vehicle.

(20) In the aspect described in (1), the second transmission suppressing part may be configured by a gradation film or a polarizing filter.

(21) In the aspect described in (1), the transmission suppressing part may be configured by a gradation film or a polarizing filter.

(22) In the aspect described in (1), a position recognition mark displayed by position recognition displaying means may be arranged on a road face side of the reflected image in a mirror image, which is reflected on the second reflecting mirror, visually recognized by a driver.

(23) In the aspect described in (1), it may be configured such that the position recognition displaying means is disposed in a black-printed part that is printed in a band shape along a lower edge of a front window shield glass of the vehicle, and the displayed position recognition mark forms a linear shape in the vertical direction of the vehicle.

(24) In the aspect described in (1), the position recognition displaying means may be configured by a slit-shaped notch that is formed in the black-printed part.

(25) In the aspect described in (1), the position recognition displaying means may be configured by a bar-shaped mark that is formed in a linear shape along a traveling direction of the vehicle on a face that is the upper face of the dashboard and faces the front window shield glass.

(26) In the aspect described in (1), it may be configured such that the position recognition displaying means is disposed in a defroster that is open to the upper face of the dashboard, and the bar-shaped mark is configured by a frame of an outlet of the defroster that is radially formed with the first reflecting mirror set as the center.

(27) In the aspect described in (1), it may be configured such that proximity checking means is disposed in a mirror image, which is visually recognized by a driver, reflected on the second reflecting mirror, the proximity checking means is formed by a plurality of linear-shaped position checking means that is disposed along the vertical direction of the vehicle and is arranged in the horizontal direction with respect to the traveling direction of the vehicle, and a gap between the position checking means decreases toward the left and right sides.

(28) In the aspect described in (1), it may be configured such that proximity checking means is disposed in a mirror image, which is visually recognized by a driver, reflected on the second reflecting mirror, the proximity checking means is formed by a plurality of linear-shaped position checking means that is disposed along the vertical direction of the vehicle and is arranged in the horizontal direction with respect to the traveling direction of the vehicle, and a width of the position checking means in the horizontal direction decreases toward the left and right sides.

(29) In the aspect described in (1), it may be configured such that in the front window shield glass of the vehicle, a band-shaped black-printed part is disposed along a peripheral edge, and the position checking means is configured by an image of the mark disposed in the black-printed part that extends along the lower edge of the front window shield glass.

(30) In the aspect described in (1), the mark may be configured by a slit-shape notch that is formed in the black-printed part.

(31) In the aspect described in (1), the position checking means may be configured by an image of a bar-shaped mark that is formed in a linear shape along a traveling direction of the vehicle on a face that is the upper face of the dashboard and faces the front window shield glass.

(32) In the aspect described in (1), it may be configured such that the bar-shaped mark is configured by a frame of an outlet of the defroster that is open to the upper face of the dashboard, and the frame is radially formed with the first reflecting mirror set as the center.

Advantageous Effects of Invention

According to the aspect described in (1), since the image of the forward side of the vehicle that is reflected in the first reflecting mirror disposed on the dashboard is reflected by the second reflecting mirror disposed on the lower side of the dashboard so as to be visually recognized by a crew member, the first reflecting mirror and the second reflecting mirror can be disposed at sufficiently low positions not narrowing the field of vision of the crew member. Thus, according to the present invention, high visibility can be acquired through a simple structure in which high-cost components are not used.

In addition, in the above-described aspect, the second reflecting mirror that reflects the reflected image of the first reflecting mirror is arranged on the lower side of the dashboard, and accordingly, the first reflecting mirror can be disposed at a sufficiently low position on the dashboard. Accordingly, even in a vehicle designed to have a large angle of forward inclination of the window shield glass, the first reflecting mirror can be arranged at a position located on the forward side of the inside of the vehicle at which the field of vision is not disturbed by a front pillar. Therefore, the visibility for the left and right sides of the forward side of the vehicle can be improved.

In the case of (2) described above, since the second light transmitting part is formed in the protruded part that protrudes from the dashboard to the inside of the vehicle and can be easily viewable, the crew member's visual recognition can be performed well. In addition, the second light transmitting part is formed on a face of the protruded part that faces almost in front of the crew member and is located on the backward side of the vehicle, the visible range in which the second reflecting mirror is viewed can be sufficiently secured while the area of the second light transmitting part is suppressed to a minimum.

In the case of (3) described above, since the first reflecting mirror is disposed on a face of the protruded part that is located on the forward side of the vehicle, the first reflecting mirror does not directly break into the eyes of the crew member, the visibility of the crew member for the forward side is improved, and the external display is improved.

In the case of (4) described above, since the first light transmitting part is disposed on the vehicle forward side of the protruded part, the first light transmitting part does not directly break into the eyes of the crew member, and the external display is improved.

In the case of (5) described above, since one of the first light transmitting part and the second light transmitting part is an opening that is disposed on the dashboard, the light transmitting part can be formed in an easy manner.

In the case of (6) described above, since the opening is closed by the transmission plate, the penetration of dusts, water vapor, or the like into the opening can be suppressed.

In the case of (7) described above, since the first reflecting mirror that reflects the forward side of the vehicle is a convex mirror, the visible area of the forward side of the vehicle can be increased.

In the case of (8) described above, since the second reflecting mirror that reflects the reflected image of the first reflecting mirror is a concave mirror, a reflected image of a wider range can be visually recognized by the crew member.

In the case of (9) described above, since the second reflecting mirror is arranged in front of the crew member seated on the seat, distortion of the image that is visually recognized by the crew member can be further decreased.

In addition, even when the eye-point moves to the forward or backward side due to a difference in the physique of a driver, the distortion of the image can be decreased further without changing the direction of the second reflecting mirror.

In the case of (10) described above, since the first reflecting mirror and the second reflecting mirror are arranged at the vehicle width center of the dashboard, a sufficient distance can be acquired between left and right front pillars of the vehicle. Accordingly, even when snow is collected on the window shield glass along the left and right front pillars, the forward side or the left and right sides of the first reflecting mirror are not covered with snow, and accordingly, the visual area can be widely secured constantly.

In the case of (11) described above, since the second reflecting mirror is a concave mirror, and the mirror face is arranged to be inclined so as to face the driver's seat side, distortion of the image can be further decreased even in a case where the second reflecting mirror is arranged at the center of the vehicle width.

In the case of (12) described above, since the image of the forward side of the vehicle that is reflected in the first reflecting mirror disposed on the dashboard is reflected by the second reflecting mirror disposed on the lower side of the dashboard so as to be visually recognized by a crew member, the first reflecting mirror and the second reflecting mirror can be disposed at sufficiently low positions not narrowing the field of vision of the crew member. Thus, in such a case, high visibility can be acquired through a simple structure in which high-cost components are not used.

In addition, in such a case, since the second reflecting mirror that reflects the reflected image of the first reflecting mirror is arranged on the lower side of the dashboard, the first reflecting mirror can be disposed at a sufficiently low position on the dashboard. Accordingly, even in a vehicle designed to have a large angle of forward inclination of the window shield glass, the first reflecting mirror can be arranged at a position located on the forward side inside the vehicle at which the field of vision is not disturbed by the front pillar. Therefore, the visibility for the left and right sides of the forward side of the vehicle can be improved.

In addition, in such a case, the reflecting face of the first reflecting mirror is formed as a curved face having convex curvature in which at least a cross-section along the vehicle width direction is convex toward the forward side of the vehicle, and accordingly, a wide range of the forward side of the vehicle can be reflected in the reflecting face of the first reflecting mirror, and the lowering of the image of the first reflecting mirror reflected in the second reflecting mirror to the lower side in the end portion side in the vehicle width direction due to the inclination toward a further lower side of the front portion of the end portion side of the reflecting face of the first reflecting mirror in the vehicle width direction is offset by reflecting an image, which is offset to the lower side of the forward side of the vehicle, to the end portion side of the reflecting face of the first reflecting mirror in the vehicle width direction, whereby a sense of discomfort given to the crew member can be further decreased by reducing the distortion of the image, which is viewed by the crew member, on the end portion side in the vehicle width direction.

In the case of (13) described above, since the reflecting face of the first reflecting mirror is formed such that the angle of inclination toward the lower side of the front portion gradually increases from the center in the vehicle width direction toward the center, the distortion of the image on the end portion side in the vehicle width direction, which is viewed by the crew member, is gently corrected, whereby the visibility can be further improved.

In the case of (14) described above, the reflecting face of the first reflecting mirror is formed as a curved face having convex curvature in which at least a cross-section along the vehicle width direction is convex toward the forward side of the vehicle, and accordingly, a wide range of the forward side of the vehicle can be reflected in the reflecting face of the first reflecting mirror, and reduction of the end portion side of the image of the first reflecting mirror in the vehicle width direction, which is reflected in the second reflecting mirror, due to the radius of the convex curvature of the end portion side of the reflecting face of the first reflecting mirror in the vehicle width direction that is larger than the radius of convex curvature of the center side in the vehicle width direction is offset by reflecting the image reflected in the end portion side of the first reflecting mirror in the vehicle width direction in a scale larger than that of the image reflected in the center side, whereby a difference in the sizes of the images on the center side in the vehicle width direction and the end portion side, which is viewed by the crew member is decreased so as to further decrease a sense of discomfort that is given to the crew member.

In the case of (15) described above, since the reflecting face of the first reflecting mirror is formed such that the radius of convex curvature of the cross-section along the vehicle width direction gradually increases from the center side to the end portion side in the vehicle width direction, a difference between the size of the image on the center side in the vehicle width direction and the size of the image on the end portion side in the vehicle width direction is gently corrected, whereby the visibility can be further improved.

In the case of (16) described above, since the reflecting face of the first reflecting mirror is formed such that the radius of convex curvature of the cross-section along the vertical direction gradually increases from the center side toward the end portion side in the vehicle width direction, a difference in the height direction between the size of the image on the center side in the vehicle width direction and the size of the image on the end portion side in the vehicle width direction, which are viewed by the crew member, is forced to be gentle, whereby the visibility can be further improved.

In the case of (17) described above, since the image of the forward side of the vehicle that is reflected in the first reflecting mirror disposed on the dashboard is reflected by the second reflecting mirror disposed on the lower side of the dashboard so as to be visually recognized by a crew member, the first reflecting mirror and the second reflecting mirror can be disposed at sufficiently low positions not narrowing the field of vision of the crew member. Thus, high visibility can be acquired through a simple structure in which high-cost components are not used.

In addition, in this case, since the second reflecting mirror that reflects the reflected image of the first reflecting mirror is arranged on the lower side of the dashboard, and accordingly, the first reflecting mirror can be disposed at a sufficiently low position on the dashboard. As a result, the blind spot located on the lateral side with respect to the traveling direction of the vehicle can be easily reflected. Furthermore, since a gap between the first reflecting mirror disposed on the dashboard and the second reflecting mirror disposed on the lower side of the dashboard can be configured to be relatively small, the reflected image of the first reflecting mirror can be reflected on the second reflecting mirror to be large, whereby high visibility can be acquired. Particularly, also in a vehicle designed to have a large angle of forward inclination of the front window shield glass, the first reflecting mirror can be arranged at a position located on the forward side of the inside of the vehicle at which the field of vision is not disturbed by the front pillar, whereby the visibility for the left and right sides of the forward side of the vehicle can be further improved.

In addition, in this case, since the transmission suppressing part is disposed in the center portion of the mirror face of one of the first reflecting mirror and the second reflecting mirror in the horizontal direction, even when external light of a headlight of a vehicle located on the opposite side or the like is incident to the center portion of the mirror face of the first reflecting mirror, or the reflected light of the external light that is reflected by the first reflecting mirror is incident to the center portion of the mirror face of the second reflecting mirror, the incident light and the reflected light of the incident light are suppressed from being transmitted by the transmission suppressing part, whereby a decrease in the visibility due to the reflection of the external light can be suppressed.

In the case of (18) described above, since the transmission suppressing part is disposed in the first reflecting mirror, compared to a case where the transmission suppressing part is disposed in the second reflecting mirror, an allowed area of the eye-point in which the effect of suppressing the transmission of light can be broadened.

In the case of (19) described above, since the second transmission suppressing part is disposed on an upper side of the center of at least one of the cross-section of the mirror face of the first reflecting mirror in the horizontal direction, even in a case where external light (for example, sun light or the like) is incident to the end portion of the first reflecting mirror, the incident light and the reflected light of the incident light is suppressed from being transmitted by the second transmission suppressing part, a decrease in the visibility due to the reflection of the external light can be suppressed.

In the case of (20) described above, only by attaching a gradation film or a polarizing filter to the end portion of the first reflecting mirror, the second transmission suppressing part can be disposed, whereby the operability is improved.

In the case of (21) described above, only by attaching a gradation film or a polarizing filter to the center portion of the first reflecting mirror or the center portion of the second reflecting mirror, the transmission suppressing part can be disposed, whereby the operability is improved.

In the case of (22) described above, since the image of the forward side of the vehicle that is reflected in the first reflecting mirror disposed on the dashboard is reflected by the second reflecting mirror disposed on the lower side of the dashboard so as to be visually recognized by a crew member, the first reflecting mirror and the second reflecting mirror can be disposed at sufficiently low positions not narrowing the field of vision of the crew member. Thus, high visibility can be acquired through a simple structure in which high-cost components are not used.

In addition, in this case, the second reflecting mirror that reflects the reflected image of the first reflecting mirror is arranged on the lower side of the dashboard, and accordingly, the first reflecting mirror can be disposed at a sufficiently low position on the dashboard. As a result, the blind spot located on the lateral side with respect to the traveling direction of the vehicle can be easily reflected. Furthermore, since a gap between the first reflecting mirror disposed on the dashboard and the second reflecting mirror disposed on the lower side of the dashboard can be configured to be relatively small, the reflected image of the first reflecting mirror can be reflected on the second reflecting mirror to be large, whereby high visibility can be acquired. Particularly, also in a vehicle designed to have a large angle of forward inclination of the front window shield glass, the first reflecting mirror can be arranged at a position located on the forward side of the inside of the vehicle at which the field of vision is not disturbed by the front pillar, whereby the visibility for the left and right sides of the forward side of the vehicle can be further improved.

In addition, in this case, since the position recognition marks are arranged on the road surface side of the reflected image in the mirror image reflected in the second reflecting mirror, a relative position of an object (for example, another vehicle) reflected in the reflected image with respect to the vehicle can be recognized, whereby the proximity state of the object can be reliably recognized. Particularly, since the position recognition marks are arranged on the road surface side of the reflected image, the position of the object can be reliably recognized regardless of the height of the object.

In the case of (23) described above, the length of the position recognition mark can be shortened, and there is no deviation in the position of the position recognition mark due to a variation of the physique of the crew member, whereby the position recognition mark can be easily recognized.

In the case of (24) described above, the position recognition displaying means can be formed when the black-printed part is printed on the front window shield glass, and accordingly, an independent manufacturing process used only for forming the position recognition displaying means is not necessary.

In the case of (25) described above, since bar-shaped marks formed on the dashboard are reflected in the front window shield, and these are reflected in the first reflecting mirror together with an object (for example, another vehicle) located on the left or right side with respect to the traveling direction of the vehicle, the position recognition marks formed by the bar-shaped marks in the mirror image reflected in the second reflecting mirror and the image of the above-described object are viewed by the crew member in an overlapping manner, and accordingly, the position of the object can be more easily recognized, whereby the proximity state can be reliably recognized.

In the case of (26) described above, since the bar-shape mark is configured by the frames of the outlet of the defroster, an independent manufacturing process used only for forming the position recognition displaying means is not necessary.

In the case of (27) described above, since the image of the forward side of the vehicle that is reflected in the first reflecting mirror disposed on the dashboard is reflected by the second reflecting mirror disposed on the lower side of the dashboard so as to be visually recognized by a crew member, the first reflecting mirror and the second reflecting mirror can be disposed at sufficiently low positions not narrowing the field of vision of the crew member. Accordingly, high visibility can be acquired through a simple structure in which high-cost components are not used.

In addition, in this case, since the second reflecting mirror that reflects the reflected image of the first reflecting mirror is arranged on the lower side of the dashboard, the first reflecting mirror can be disposed at a sufficiently low position on the dashboard. As a result, the blind spot located on the lateral side with respect to the traveling direction of the vehicle can be easily reflected. Furthermore, since a gap between the first reflecting mirror disposed on the dashboard and the second reflecting mirror disposed on the lower side of the dashboard can be configured to be relatively small, the reflected image of the first reflecting mirror can be reflected on the second reflecting mirror to be large, whereby high visibility can be acquired. Particularly, also in a vehicle designed to have a large angle of forward inclination of the front window shield glass, the first reflecting mirror can be arranged at a position located on the forward side of the inside of the vehicle at which the field of vision is not disturbed by the front pillar, whereby the visibility for the left and right sides of the forward side of the vehicle can be further improved.

In addition, in this case, the proximity checking means is disposed in the mirror image reflected in the second reflecting mirror, and the linear-shaped position checking means configuring the proximity checking means has a gap (the width of the position checking means in horizontal direction) that decreases toward the left and right sides, and accordingly, when an object (for example, another vehicle) that approaches from the left or right side of the forward side of the vehicle is reflected in the second reflecting mirror, the degree of approach of the object can be easily recognized.

In the case of (28) described above, since the image of the forward side of the vehicle that is reflected in the first reflecting mirror disposed on the dashboard is reflected by the second reflecting mirror disposed on the lower side of the dashboard so as to be visually recognized by a crew member, the first reflecting mirror and the second reflecting mirror can be disposed at sufficiently low positions not narrowing the field of vision of the crew member. Accordingly, high visibility can be acquired through a simple structure in which high-cost components are not used.

In addition, in this case, since the second reflecting mirror that reflects the reflected image of the first reflecting mirror is arranged on the lower side of the dashboard, the first reflecting mirror can be disposed at a sufficiently low position on the dashboard. As a result, the blind spot located on the lateral side with respect to the traveling direction of the vehicle can be easily reflected. Furthermore, since a gap between the first reflecting mirror disposed on the dashboard and the second reflecting mirror disposed on the lower side of the dashboard can be configured to be relatively small, the reflected image of the first reflecting mirror can be reflected on the second reflecting mirror to be large, whereby high visibility can be acquired. Particularly, also in a vehicle designed to have a large angle of forward inclination of the front window shield glass, the first reflecting mirror can be arranged at a position located on the forward side of the inside of the vehicle at which the field of vision is not disturbed by the front pillar, whereby the visibility for the left and right sides of the forward side of the vehicle can be further improved.

In addition, in this case, the proximity checking means is disposed in the mirror image reflected in the second reflecting mirror, and the linear-shaped position checking means configuring the proximity checking means has a gap (the width of the position checking means in horizontal direction) that decreases toward the left and right sides, and accordingly, when an object (for example, another vehicle) that approaches from the left or right side of the forward side of the vehicle is reflected in the second reflecting mirror, the degree of approach of the object can be easily recognized. In addition, although the image of an object located far from the vehicle is located in the end portion of the mirror image of the second reflecting mirror in the horizontal direction, the position checking means has a width that decreases toward the left or right side, and accordingly, the ratio of the width of the position checking means to the width of the image even in the end portion of the mirror image in the horizontal direction does not increase, whereby the visibility of the image is improved.

In the case of (29) described above, the length of the position checking means can be shortened, and there is no deviation in the position of the position checking means due to a variation of the physique of the crew member, whereby the position checking means can be easily recognized.

In the case of (30) described above, the marks can be formed when the black-printed part is printed on the front window shield glass, and accordingly, an independent manufacturing process used only for forming the marks is not necessary.

In the case of (31) described above, since bar-shaped marks formed on the dashboard are reflected in the front window shield, and these are reflected in the first reflecting mirror together with an object located on the left or right side with respect to the traveling direction of the vehicle, the position checking means formed by the bar-shaped marks in the mirror image reflected in the second reflecting mirror and the image of the above-described object are viewed by the crew member in an overlapping manner, and accordingly, the degree of proximity of the object can be more easily recognized.

In the case of (32) described above, since the bar-shape mark is configured by the frames of the outlet of the defroster, an independent manufacturing process used only for forming the bar-shaped marks is not necessary.

DESCRIPTION OF EMBODIMENTS

First Embodiment

Hereinafter, a first embodiment according to the present invention will be described with reference to the drawings.

Figure 1:
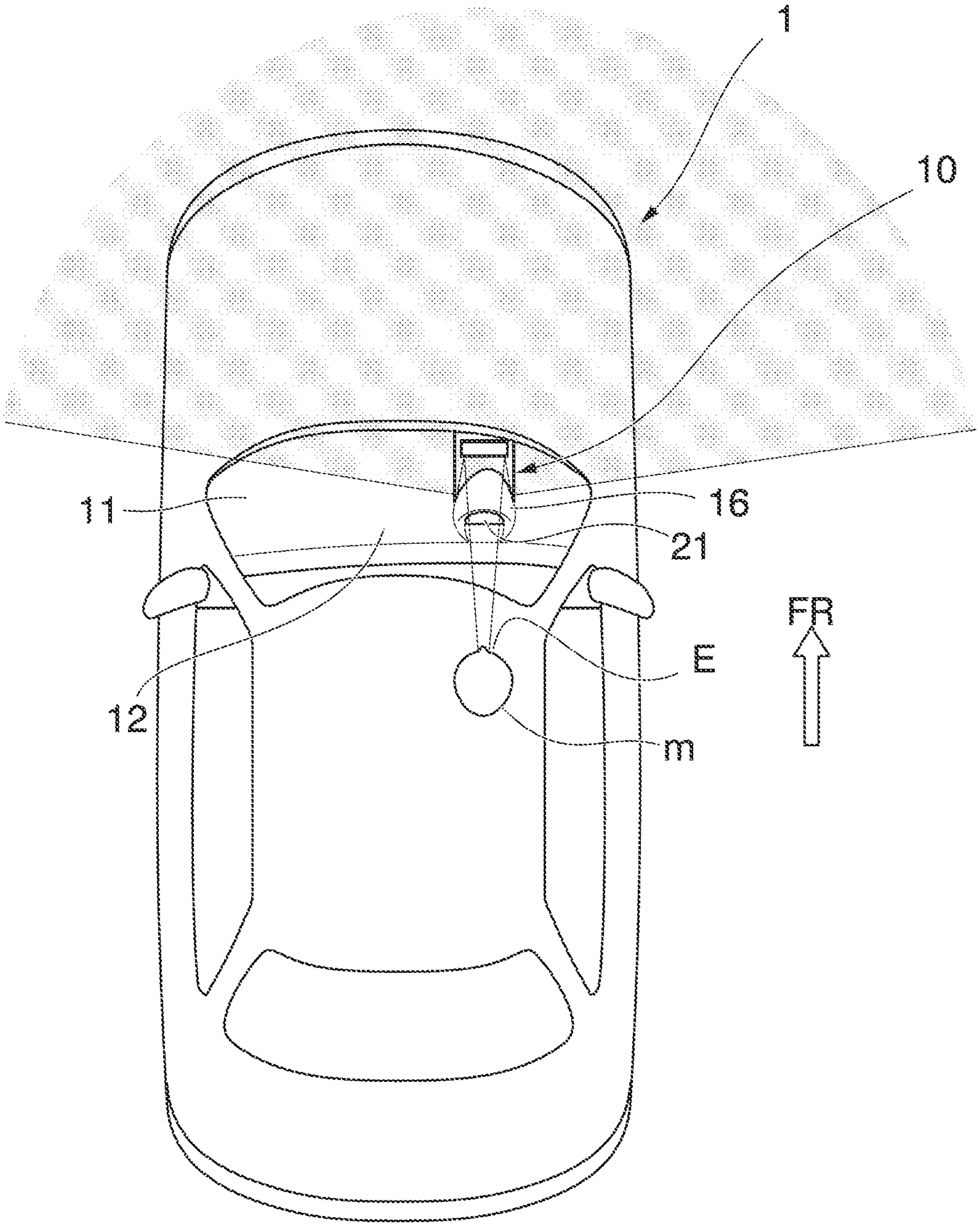
FIG. 1 is schematic plan view of a vehicle that uses a device for visually confirming a forward direction according to a first embodiment of the present invention.

FIG. 1 is schematic view of a vehicle 1 that uses a device 10 for visually confirming a forward direction according to this embodiment, and FIGS. 2 to 4B are diagrams that illustrate a specific configuration of the device 10 for visually confirming a forward direction. In the figures, arrow FR represents a forward direction of the vehicle, and arrow UP represents an upward direction of the vehicle.

The device 10 for visually confirming a forward direction is arranged on the forward side of a driver's seat located inside the vehicle such that a crew member m seated on the driver's seat can visually confirm the lower side and the left/right side of a front portion of the vehicle 1 with his line of sight facing forward.

Figure 2:
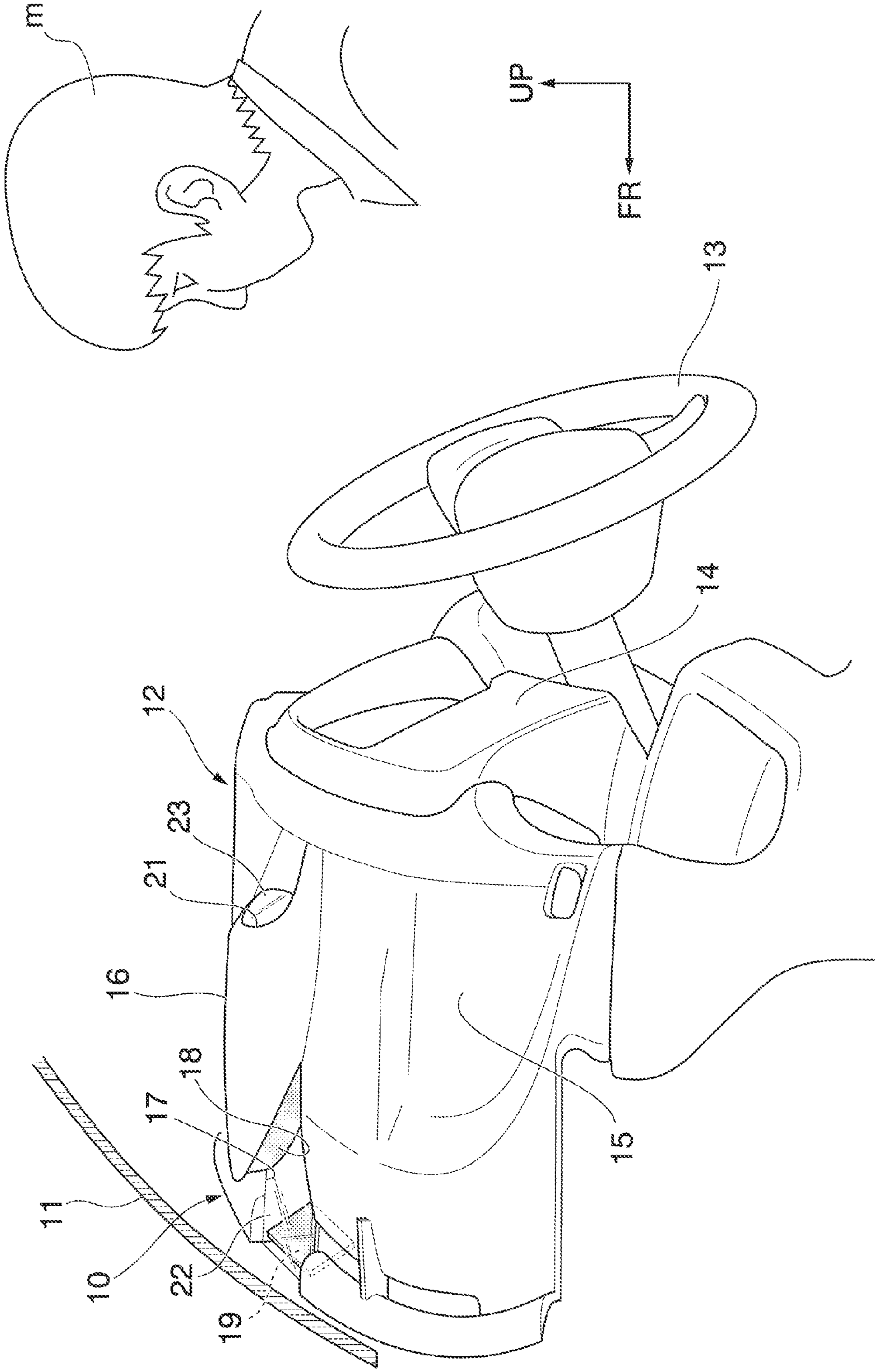
FIG. 2 is a perspective view of the inside of the vehicle that uses the device for visually confirming a forward direction according to the first embodiment of the present invention.
Figure 3:
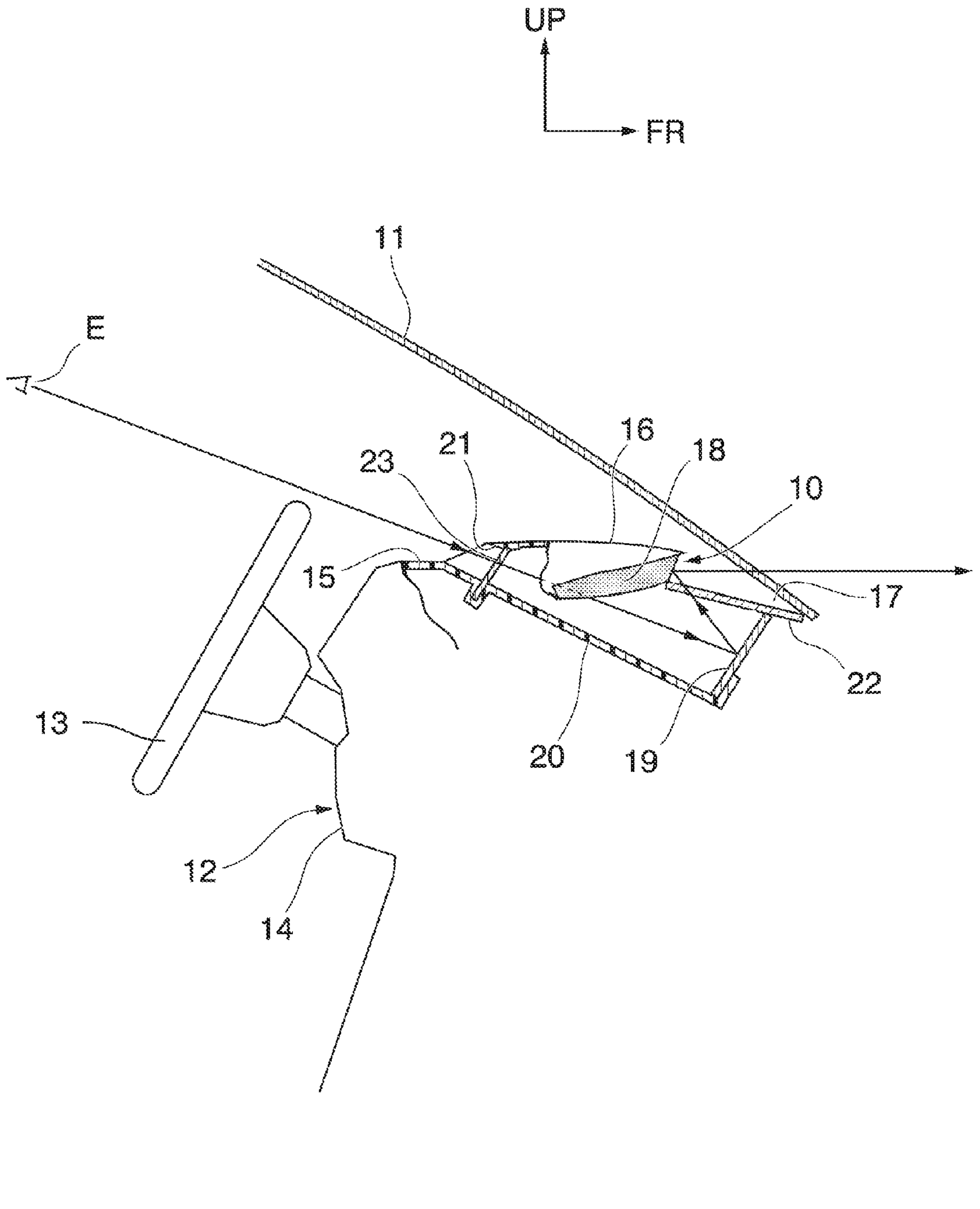
FIG. 3 is a cross-sectional view that illustrates a schematic configuration of the device for visually confirming a forward direction according to the first embodiment of the present invention.

In FIGS. 2 and 3, reference numeral 11 is a window shield glass that is disposed so as to be forward sloped (sloped toward the lower side of the front portion) on the front side of the front seat of the vehicle 1, reference numeral 12 is a dashboard on which meters such as a speedometer and a tachometer are arranged on the front face side facing the driver's seat, and reference numeral 13 is a steering wheel that is arranged on the front side of the driver's seat.

The dashboard 12 includes a front part wall 14 that has meters arranged thereon and faces a crew member m seated on the front seat and an upper part wall 15 that extends approximately horizontally from the upper end portion of the front part wall 14 toward the lower edge of the window shield glass 11. In a portion of the upper part wall 15, which is located at the front position (the forward position of the front face of the steering wheel 13) of the driver's seat, a protruded part 16 is disposed. This protruded part 16 is formed in the shape of an approximate half cylinder extending along the forward/backward direction of the vehicle body. In addition, in a portion of the upper part wall 15, which is located on the vehicle forward side of the protruded part 16, a first opening 17 is arranged.

The front portion of the protruded part 16 is notched so as to form an approximate "U" shape that is convex to the forward side in the top view, and a first reflecting mirror 18 is attached to the curved notch end. The first reflecting mirror 18 is configured by a convex mirror that is curved in an approximate "U" shape in the vehicle width direction, and the mirror face is installed to the front part face of the protruded part 16 such that the mirror face faces the lower side of the front portion of the vehicle. This first reflecting mirror 18 is set such that a broad range in the lower side of the front portion and the left and right sides of the vehicle is projected through the window shield glass 11. In addition, the first opening 17 located on the dashboard 12 is formed on the forward side of the first reflecting mirror 18 so as to have approximately the same width as that of the first reflecting mirror 18.

In addition, a second reflecting mirror 19, which reflects a reflected image that is imaged on the first reflecting mirror 18 toward the crew member m side, is installed to the lower side of the upper part wall 15 of the dashboard 12. The second reflecting mirror 19 is configured by a plane mirror and is arranged such that the mirror face faces the backward side of the vehicle on the lower side of the front end portion side of the first opening 17. In the case of this embodiment, the second reflecting mirror 19 is attached to the rear face of the dashboard 12 through a bracket 20.

On the other hand, a face of the protruded part 16 that is located on the rear side of the vehicle is inclined to the upper side so as to confront the face of the crew member m seated on the driver's seat, and a second opening 21 that is horizontally long and has an approximate oval shape is formed at an approximate center of the above-described face. This second opening 21 is arranged in an area combining the second reflecting mirror 19 and the eye-point E of the crew member so as to enable the crew member to visually confirm the second reflecting mirror 19 that is located on the lower side of the upper part wall 15. In addition, the first opening 17 is arranged in an area that connects the first reflecting mirror 18 and the second reflecting mirror 19. Accordingly, a reflected image of the forward side of the vehicle that is projected to the first reflecting mirror 18 can be visually confirmed by the crew member m through the second reflecting mirror 19 and the second opening 21.

Figure 4A:
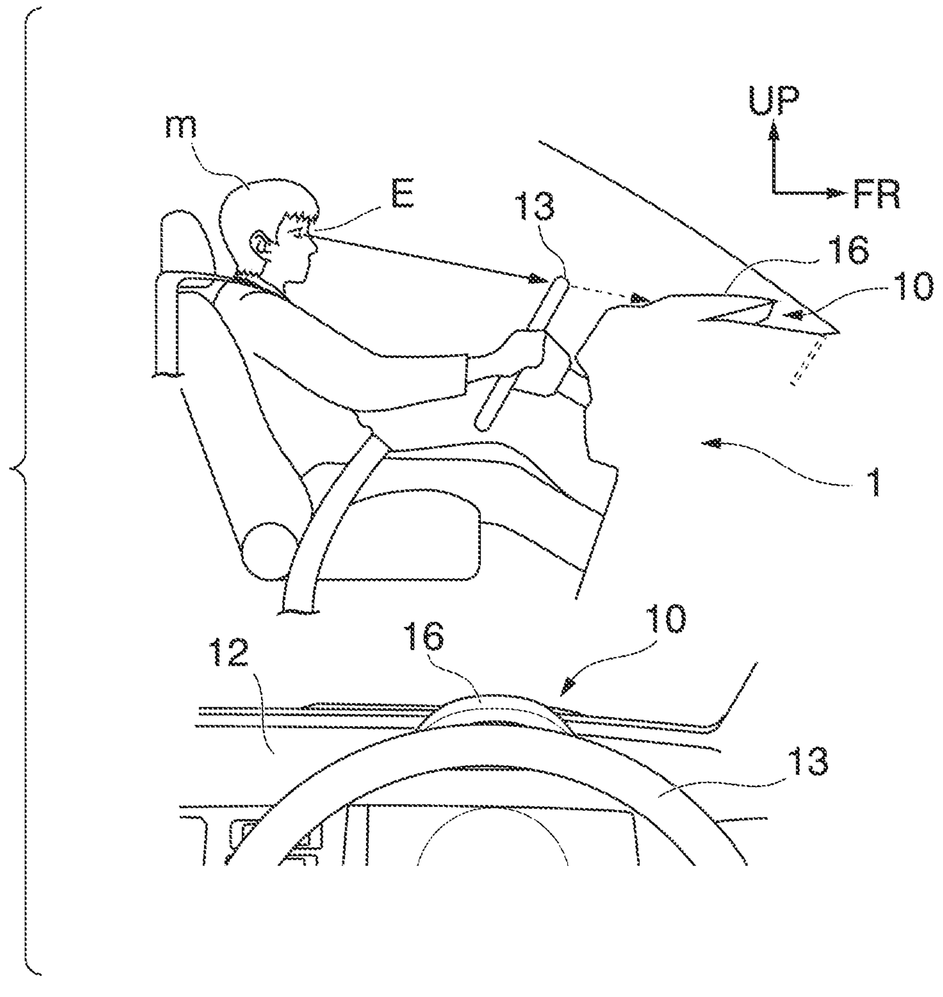
FIG. 4A is a diagram that illustrates a forward field of view of the vehicle that uses the device for visually confirming a forward direction according to the first embodiment of the present invention at a normal time and the posture of a crew member at that time.
Figure 4B:
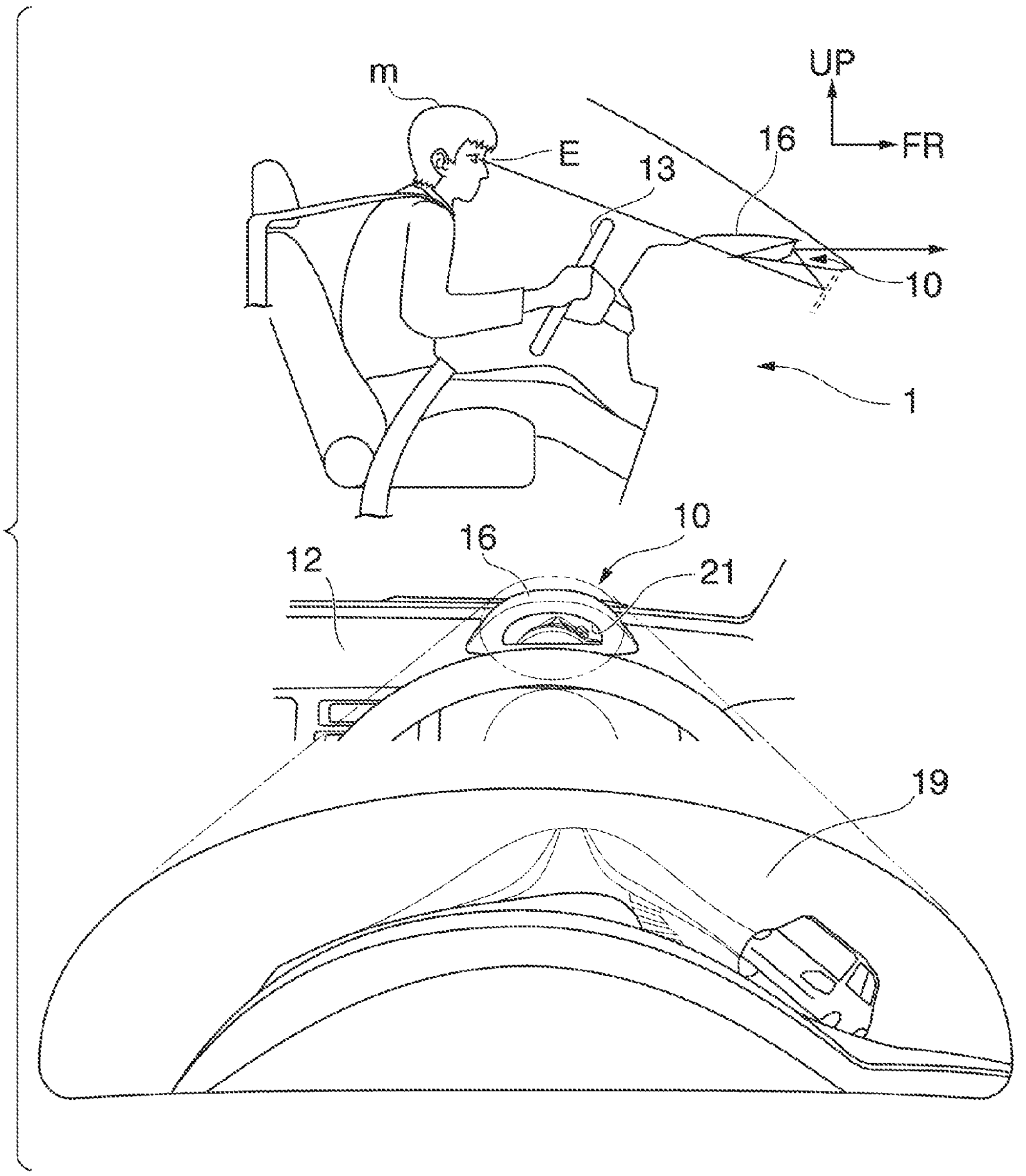
FIG. 4B is a diagram that illustrates a forward field of view at the time of stretched-up visual confirmation of a vehicle that uses the device for visually confirming a forward direction according to the first embodiment and the posture of a crew member at that time and an image that is projected to the device for visually confirming a forward direction.

In addition, it is preferable that the second opening 21 has such a height so as to be hidden by the steering wheel 13 in the posture of the crew member at the time of normal driving as illustrated in FIG. 4A, and to be viewed from the upper portion of the steering wheel 13 at a time when the crew member m seated on the driver's seat stretches upward and looks into the second opening 21 in the forward direction, as illustrated in FIG. 4B.

In addition, transmission plates 22 and 23, which are formed from transparent resin or the like, are attached to the first opening portion 17 that is located on the forward side of the protruded part 16 and the second opening 21 that is located on the rear face side of the protruded part 16.

In this embodiment, a first transmission part is configured by the first opening 17 and the transmission plate 22, and a second transmission part is configured by the second opening 21 and the transmission plate 23.

In the above-described configuration, in a case where the crew member m seated on the driver's seat looks into the second opening 21 located on the dashboard 12 while visually confirming the forward direction of the vehicle, a reflected image, which is located on the forward side, projected to the first reflecting mirror 18 is viewed through the second reflecting mirror 19.

At this time, since the first reflecting mirror 18 is configured by a convex mirror that is curved from the center to the left and right sides in the widthwise direction, a reflected image that is reflected by the second reflecting mirror 19 and is viewed by the crew member m, as illustrated in FIG. 4B, projects a wide range of the lower side of the front portion and the left and right sides of the vehicle 1. Since the image viewed by the crew member m is an image that has been reflected twice by the first reflecting mirror 18 and the second reflecting mirror 19, the image is not horizontally revered and allows the crew member m to confirm surrounding conditions without any sense of discomfort.

As above, in the device 10 for visually confirming a forward direction, the first reflecting mirror 18 that reflects the lower side of the front portion and the left and right sides of the vehicle 1 is installed to the front face of the protruded part 16 located on the dashboard 12, the second reflecting mirror 19 that reflects the image imaged on the first reflecting mirror 18 to the crew member m side is arranged on the lower side of the dashboard 12, and the first opening 17 and the second opening 21 are disposed in the area that connects the first reflecting mirror 18 and the second reflecting mirror 19 that are located on the dashboard 12 and the area that connects the second reflecting mirror 19 and the eye-point E of the crew member m, whereby the first reflecting mirror 18 and the second reflecting mirror 19 are arranged at positions, which are sufficiently low, not disturbing the forward field of view of the crew member m. Accordingly, while a simple structure is employed in which expensive components such as imaging means and a motor are not used, high visibility can be secured.

Especially, in the device 10 for visually confirming a forward direction, since the second reflecting mirror 19 is arranged on lower side of the dashboard 12, the first reflecting mirror 18 that directly reflects the forward side and the left and right sides of the vehicle 1 can be installed at a portion on the dashboard 12 that is sufficiently low, and accordingly, even in a vehicle having large forward inclination of the window shield glass 11, the first reflecting mirror 18 can be arranged near the front end portion inside the vehicle. Accordingly, in a case where the left and right sides of the front portion of the vehicle 1 are reflected, a front pillar FP of the vehicle 1 does not disturb the reflected field of view, and the visibility in the horizontal direction can be improved.

In addition, in the device 10 for visually confirming a forward direction, the protruded part 16 is disposed on the upper part wall 15 of the dashboard 12, and the second opening 21 is arranged on a face of the protruded part 16 that is located on the backward side of the vehicle, whereby the second opening 21 can be visually noticeable in an easy manner when the crew member m visually confirms a front direction with stretching upward.

Accordingly, the visibility for the crew member can be improved. In addition, in the case of this device 10 for visually confirming a forward direction, the second opening 21 is formed on a face of the protruded part 16 that forwardly faces the face of the crew member m, and accordingly, the visible range in which the second reflecting mirror 19 of the second opening 21 is visible can be sufficiently secured while the area of the second opening 21 is suppressed to be minimal.

In addition, in the device 10 for visually confirming a forward direction, since the first reflecting mirror 18 is arranged on the face of the protruded part 16, which is at a blind spot for the crew member m, that is located on the forward side of the vehicle, the first reflecting mirror 18 is not directly visible to the crew member m during driving.

Accordingly, the field of view of the crew member m can be prevented from being disturbed by reflected light or the like, and the outer appearance is good.

In addition, in the case of the device 10 for visually confirming a forward direction, since the first opening 17 located on the dashboard 12 is arranged on the forward side of the protruded part 16, that is at a blind spot of the crew member m, it is advantageous to improve the outer appearance.

Furthermore, in the device 10 for visually confirming a forward direction according to this embodiment, since the first opening 17 and the second opening 21 that are located on the dashboard 12 are closed by the transmission plates 22 and 23, the penetration of dusts, water vapor, or the like into the inside of the dashboard 12 can be prevented. In addition, even in a case where the transmission plates 22 and 23 are attached to any one of the first opening 17 and the second opening 21, such an advantage can be acquired.

In addition, in the above-described embodiment, although the first reflecting mirror 18 is configured by a convex mirror, the first reflecting mirror 18 may be a plane mirror.

Furthermore, the second reflecting mirror 19 that mirrors the reflected image of the first reflecting mirror 18 may be configured by a convex mirror. In such a case, light reflected by the first reflecting mirror 18 can be broadly acquired by the concave mirror, and a wider range of the reflected image can be visually confirmed by the crew member m. In addition, at this time, it is preferable to arrange the second reflecting mirror 19 in front of the crew member m seated on the driver's seat. In this manner, distortion of the image that is visually confirmed by the crew member m can be reduced. Especially, even in a case where the eye-point moves to the front or rear side due to a difference in the driver's physique, distortion of the image can be reduced without changing the direction of the second reflecting mirror 19.

Figure 5:
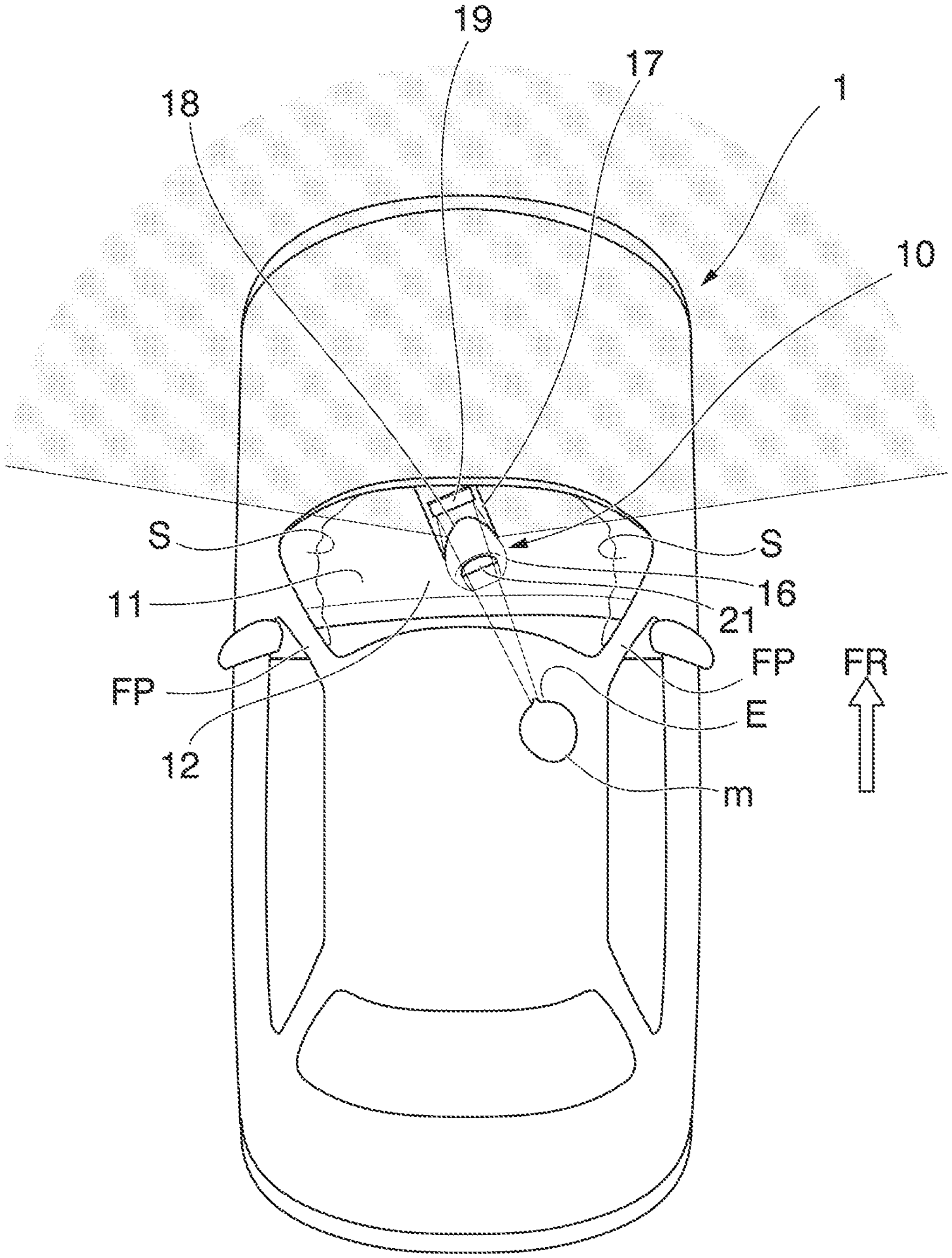
FIG. 5 is a schematic plan view of a vehicle that uses a device for visually confirming a forward direction according to another embodiment of the present invention.

Furthermore, in the above-described embodiment, although the device 10 for visually confirming a forward direction is arranged on the forward side of the driver's seat on the dashboard 12, as illustrated in FIG. 5, the first reflecting mirror 18, the second reflecting mirror 19, the first opening 17, the second opening 21, and the like of the device 10 for visually confirming a forward direction may be arranged at the center of the vehicle width on the dashboard 12.

In such a case, since the first reflecting mirror 18 is arranged at a position located sufficiently apart from the front pillars FP located on the left and right sides, even in a case where snow is collected on the window shield glass 11 so as to follow the front pillar FP at the time of a strong snowfall, the snow does not block the field of view of the device 10 for visually confirming a forward direction.

In addition, in many vehicles, the front end portion of the dashboard 12 or the lower edge of the window shield glass 11 is formed to be curved such that the center side of the vehicle width is convex to the foremost side. In the vehicles of such a type, in a case where the first reflecting mirror 18 is arranged at the center of the vehicle width, the disturbance of the field of view due to the deposition of snow can be further reduced, and, by arranging the first reflecting mirror 18 to a further forward side, the glare of the front pillar FP can be further decreased even at a normal time.

Furthermore, as illustrated in FIG. 5, in a case where the first reflecting mirror 18, the second reflecting mirror 19, the first opening 17, the second opening 21, and the like of the device 10 for visually confirming a forward direction are arranged at the center of the vehicle width on the dashboard 12, it is preferable that the second reflecting mirror 19 is configured by a concave mirror, and the mirror face is inclined toward the driver's seat side.

In such a case, the light reflected by the first reflecting mirror 18 is broadly acquired by the concave mirror, a reflected image in a broader range can be visually confirmed by the crew member m, and the distortion of the image viewed by the crew member m can be further reduced.

The present invention is not limited to the above-described embodiment, and various changes in the design can be made in a range not departing from the concept thereof. For example, in the above-described embodiment, although the first opening 17 and the second opening 21 are formed on the dashboard 12 so as to configure the first light transmitting unit and the second light transmitting unit, it may be configured such that a portion, through which light can be transmitted, is arranged on the dashboard 12 by using transparent resin or the like so as to configure the first light transmitting unit and the second light transmitting unit.

Second Embodiment

Hereinafter, a second embodiment according to the present invention will be described with reference to the drawings.

FIG. 1 is a schematic diagram of a vehicle 1 that uses a device 10 for visually confirming a forward direction according to this embodiment, and FIGS. 2 to 6B are diagrams that illustrate specific configurations of the device 10 for visually confirming a forward direction. In the figures, arrow FR denotes a forward direction of the vehicle, and arrow UP denotes an upward direction of the vehicle.

The device 10 for visually confirming a forward direction is arranged on the forward side of a driver's seat located inside the vehicle such that a crew member m seated on the driver's seat can visually confirm the lower side and the left/right side of a front portion of the vehicle 1 with his line of sight facing forward.

In FIGS. 2 and 3, reference numeral 11 is a window shield glass that is disposed so as to be forward sloped (sloped toward the lower side of the front portion) on the front side of the front seat of the vehicle 1, reference numeral 12 is a dashboard on which meters such as a speedometer and a tachometer are arranged on the front face side facing the driver's seat, and reference numeral 13 is a steering wheel that is arranged on the front side of the driver's seat.

The dashboard 12 includes a front part wall 14 that has meters arranged thereon and faces a crew member m seated on the front seat and an upper part wall 15 that extends approximately horizontally from the upper end portion of the front part wall 14 toward the lower edge of the window shield glass 11. In a portion of the upper part wall 15, which is located at the front position (the forward position of the front face of the steering wheel 13) of the driver's seat, a protruded part 16 is disposed. This protruded part 16 is formed in the shape of an approximate half cylinder extending along the forward/backward direction of the vehicle body. In addition, in a portion of the upper part wall 15, which is located on the vehicle forward side of the protruded part 16, a first opening 17 is arranged.

The front portion of the protruded part 16 is notched so as to form an approximate "U" shape that is convex to the forward side in the top view, and a first reflecting mirror 18 is attached to the curved notch end. The first reflecting mirror 18 is configured by a convex mirror that is curved in an approximate "U" shape in the vehicle width direction, and the mirror face is installed to the front part face of the protruded part 16 such that the mirror face faces the lower side of the front portion of the vehicle. This first reflecting mirror 18 is set such that a broad range in the lower side of the front portion and the left and right sides of the vehicle is reflected through the window shield glass 11. In addition, the first opening 17 located on the dashboard 12 is formed on the forward side of the first reflecting mirror 18 so as to have approximately the same width as that of the first reflecting mirror 18.

In addition, a second reflecting mirror 19, which reflects a reflected image that is imaged on the first reflecting mirror 18 toward the crew member m side, is installed to the lower side of the upper part wall 15 of the dashboard 12. The second reflecting mirror 19 is configured by a plane mirror and is arranged such that the mirror face faces the backward side of the vehicle on the lower side of the front end portion side of the first opening 17. In the case of this embodiment, the second reflecting mirror 19 is attached to the rear face of the dashboard 12 through a bracket 20.

On the other hand, a face of the protruded part 16 that is located on the rear side of the vehicle is inclined to the upper side so as to confront the face of the crew member m seated on the driver's seat, and a second opening 21 that is horizontally long and has an approximate oval shape is formed at an approximate center of the above-described face. This second opening 21 is arranged in an area combining the second reflecting mirror 19 and the eye-point E of the crew member m so as to enable the crew member to visually confirm the second reflecting mirror 19 that is located on the lower side of the upper part wall 15. In addition, the first opening 17 is arranged in an area that connects the first reflecting mirror 18 and the second reflecting mirror 19. Accordingly, a reflected image of the forward side of the vehicle that is projected to the first reflecting mirror 18 can be visually confirmed by the crew member m through the second reflecting mirror 19 and the second opening 21.

Figure 6A:
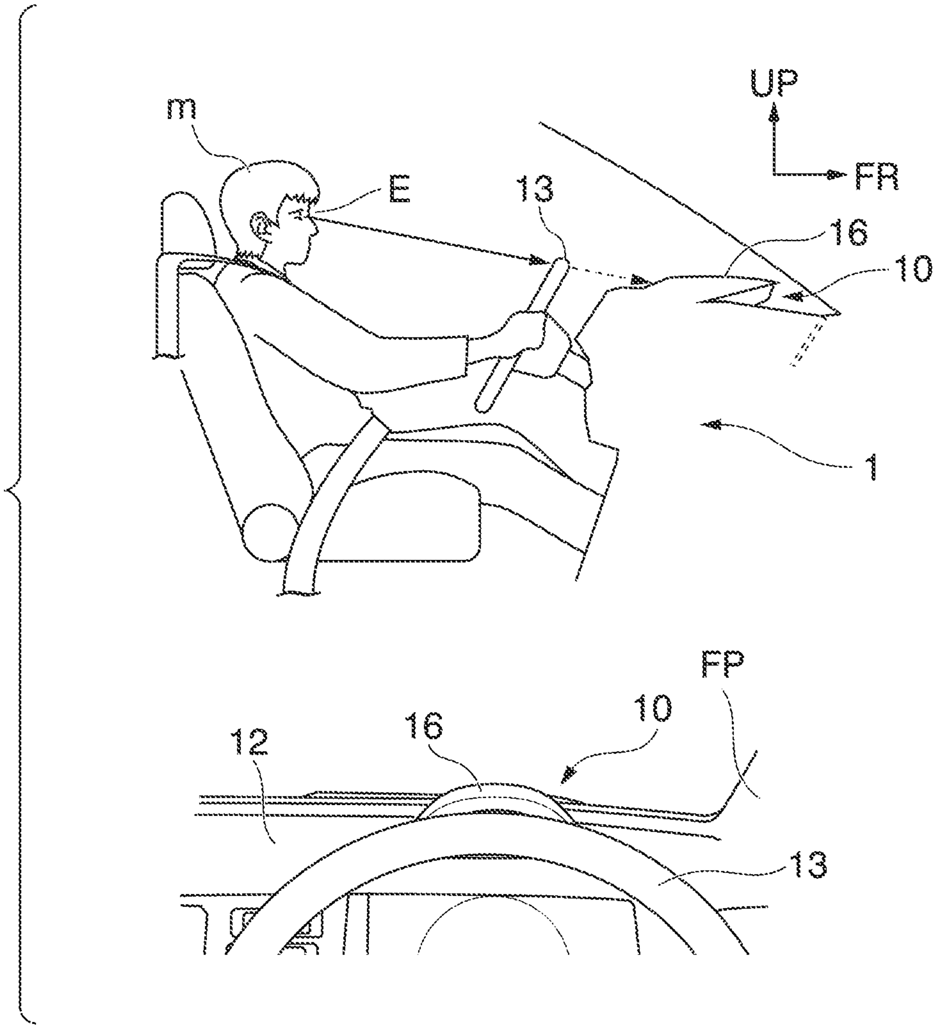
FIG. 6A is a diagram that illustrates a forward field of view of the vehicle that uses a device for visually confirming a forward direction according to a second embodiment of the present invention at a normal time and the posture of a crew member at that time.
Figure 6B:
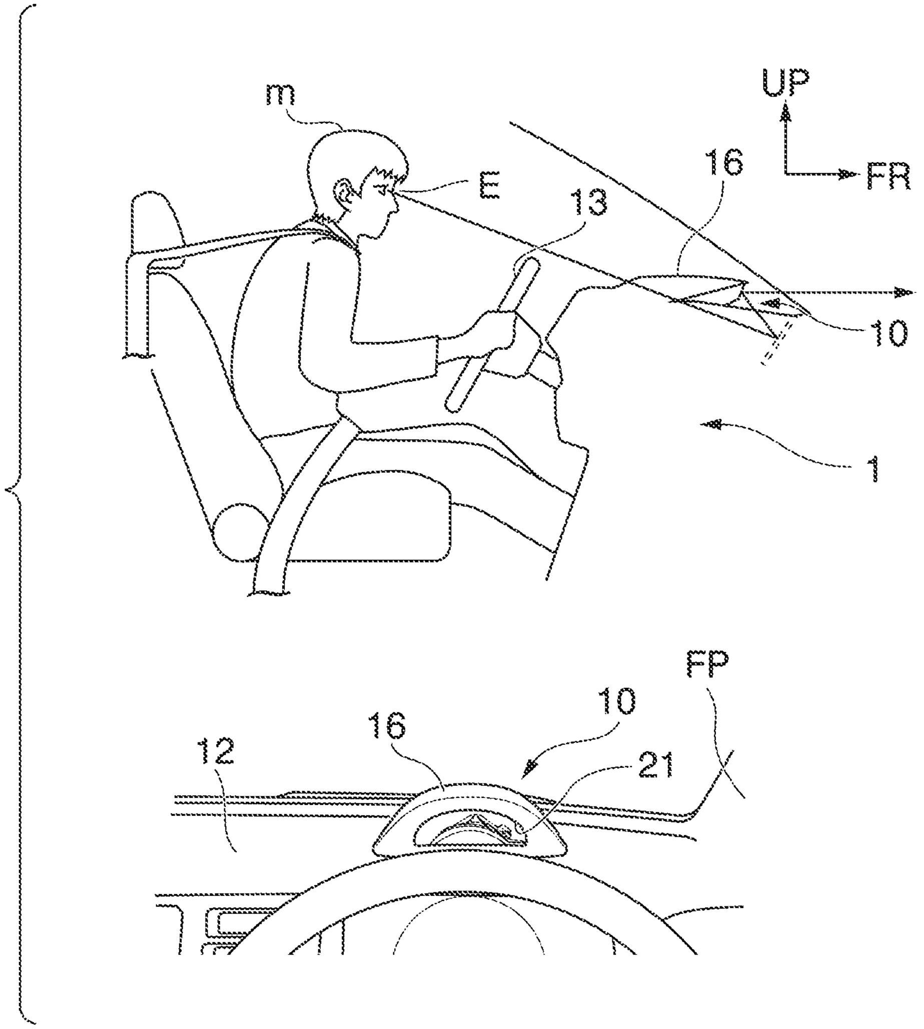
FIG. 6B is a diagram that illustrates a forward field of view at the time of stretched-up visual confirmation of a vehicle that uses the device for visually confirming a forward direction according to the second embodiment and the posture of a crew member at that time.

In addition, it is preferable that the second opening 21 has such a height so as to be hidden by the steering wheel 13 in the posture of the crew member at the time of normal driving as illustrated in FIG. 6A, and to be viewed from the upper portion of the steering wheel 13 at a time when the crew member m seated on the driver's seat stretches upward and looks into the second opening 21 in the forward direction, as illustrated in FIG. 6B.

In addition, transmission plates 22 and 23, which are formed from transparent resin or the like, are attached to the first opening portion 17 that is located on the forward side of the protruded part 16 and the second opening 21 that is located on the rear face side of the protruded part 16.

In this embodiment, a first transmission part is configured by the first opening 17 and the transmission plate 22, and a second transmission part is configured by the second opening 21 and the transmission plate 23.

In the vehicle 1 that uses this device 10 for visually confirming a forward direction, when the crew member m seated on the driver's seat looks into the second opening 21 disposed on the dashboard 12 with visually confirming the forward side of the vehicle, a reflected image of the vehicle forward side that is projected to the first reflecting mirror 18 is viewed through the second reflecting mirror 19.

Figure 7:
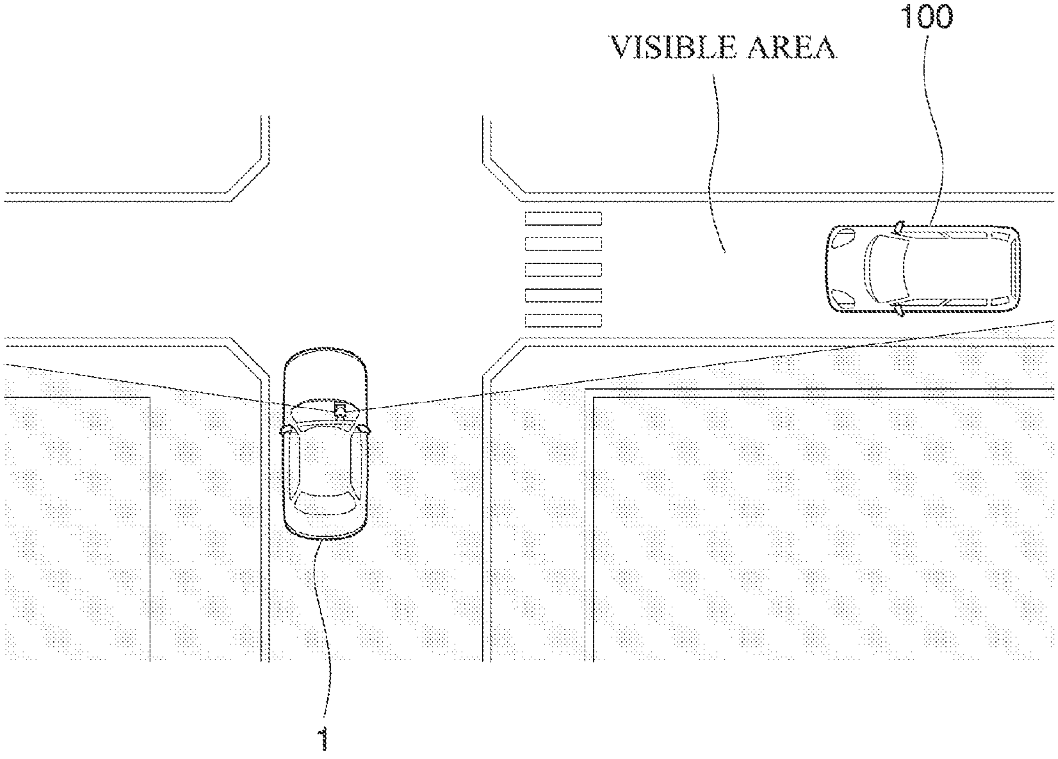
FIG. 7 is a bird's eye view that illustrates a field of view when the device for visually confirming a forward direction is used.
Figure 8:
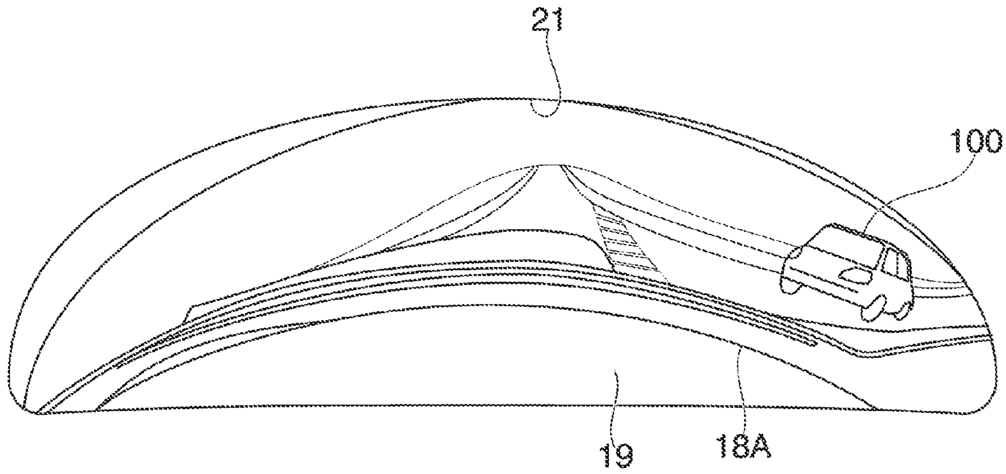
FIG. 8 is a diagram that illustrates an image that is projected to the device for visually confirming a forward direction.

FIG. 7 is a diagram that illustrates a forward range (a portion having no dots) that is viewed from the crew member m through the device 10 for visually confirming a forward direction when the vehicle 1 arrives at an intersection, and FIG. 8 is a diagram that illustrates an image (an image viewed through the second reflecting mirror 19) that is actually viewed by the device 10 for visually confirming a forward direction. In addition, in FIGS. 7 and 8, reference numeral 100 is another vehicle that travels rightward from the intersection, and reference numeral 18A in FIG. 8 is an image of the first reflecting mirror 18 that is projected to the second reflecting mirror 19.

Since the first reflecting mirror 18 is configured by a convex mirror that is curved from the center to the left and right sides in the vehicle width direction, the reflected image that is reflected by the second reflecting mirror 19 so as to be viewed by the crew member m reflects a wide range of the lower side of the front portion and the left and right sides of the vehicle 1. In addition, the image viewed by the crew member m is reflected twice by the first reflecting mirror 18 and the second reflecting mirror 19, the image is not horizontally reversed and allows the crew member m to confirm surrounding conditions without any sense of discomfort.

Here, the first reflecting mirror 18 will be described in more detail.

Figure 9:
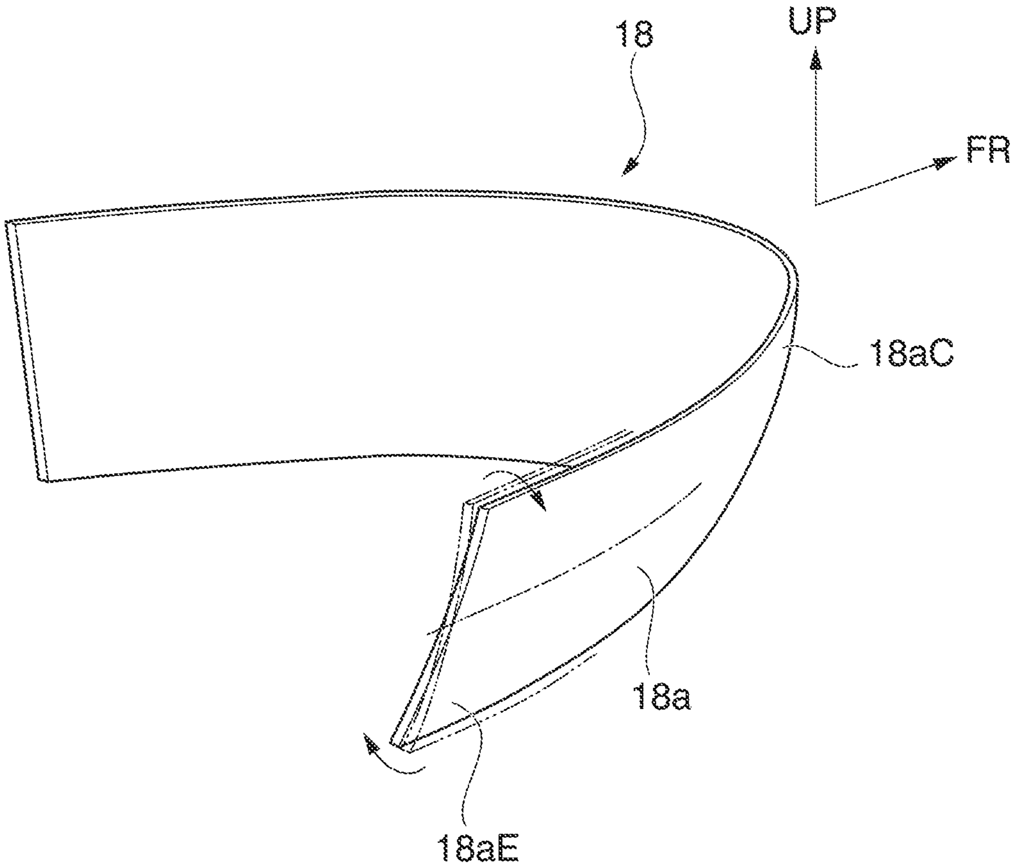
FIG. 9 is a perspective view that illustrates a first reflecting mirror of the device for visually confirming a forward direction according to the second embodiment.
Figure 10:
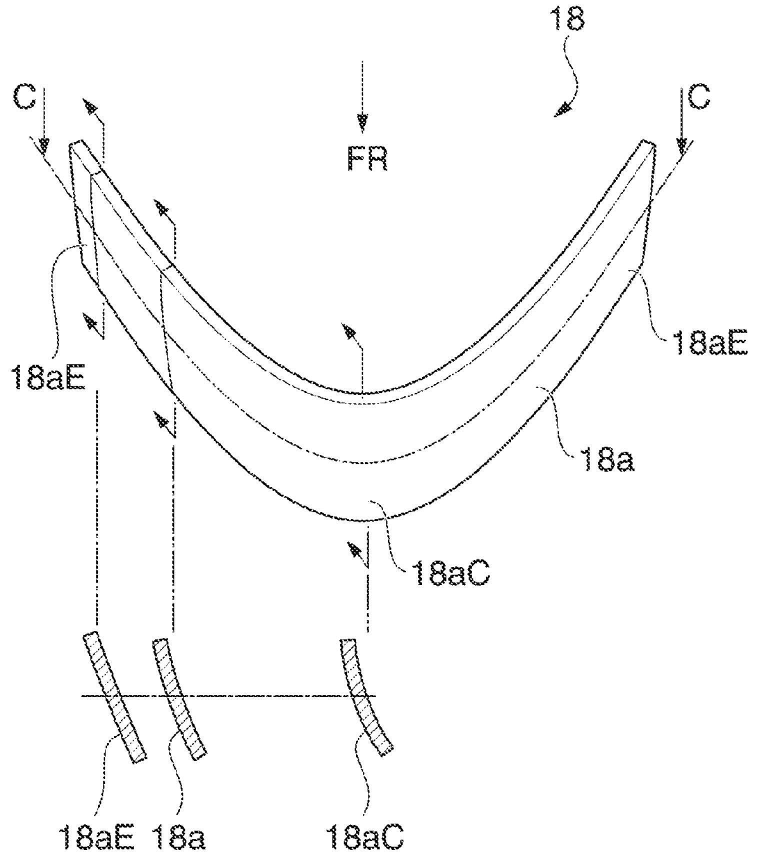
FIG. 10 is a perspective view that illustrates a first reflecting mirror of the device for visually confirming a forward direction according to the second embodiment of the present invention together with a cross-sectional shape of each portion.
Figure 11:
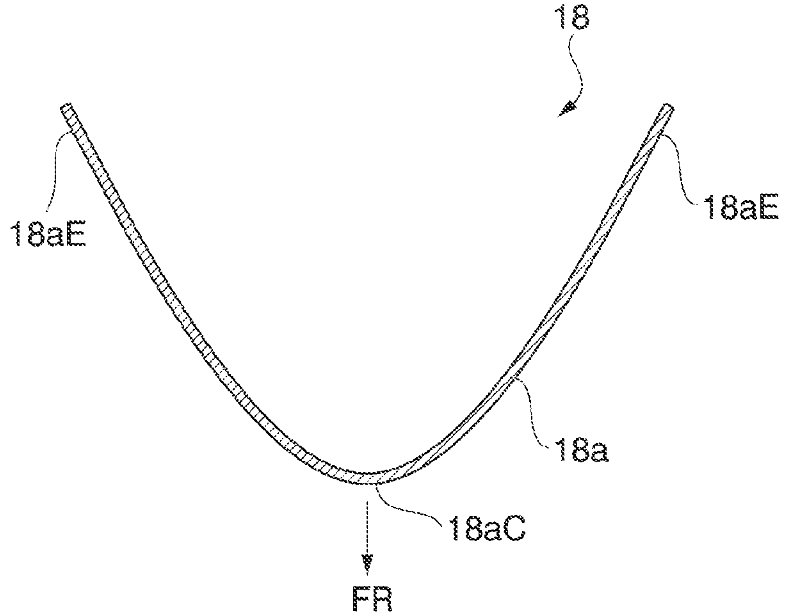
FIG. 11 is a cross-sectional view of the device for visually confirming a forward direction according to the second embodiment, taken along line C-C shown in FIG. 10.

FIG. 9 is a perspective view of the first reflecting mirror 18, viewed from the lower side of the right rear portion, FIG. 10 is a diagram in which a perspective view of the first reflecting mirror 18, viewed from the upper side of the front portion of the front face is presented together with cross-sections of each portion of the first reflecting mirror 18. FIG. 11 is a cross-sectional view taken along line C-C shown in FIG. 10.

In the first reflecting mirror 18, a cross-section of the reflecting face 18*a* facing the vehicle forward side along the vehicle width direction is, as illustrated in FIG. 11, is formed in a curved face having convex curvature that is convex to the vehicle forward direction. In addition, in this embodiment, the curved face, which has convex curvature, of the reflecting face 18*a*, as illustrated in FIG. 10, has a cross-section along the vertical direction that is convex toward the vehicle forward side. However, the radius of curvature of the curved face, which has convex curvature, of the reflecting face 18*a* is not constant but gradually changes from the center side toward the end portions in the vehicle width direction, which will be described in detail.

The reflecting face 18*a* of the first reflecting mirror 18 is inclined toward the lower side of the front portion as a whole as described above, the inclined angle toward the lower side of the front portion is not constant for the whole area in the vehicle width direction but, as illustrated in FIG. 10, the angle of inclination toward the lower side of the front portion is set so as to gradually increase from the center toward the end portions in the vehicle width direction. More specifically, the reflecting face 18*a* of the first reflecting mirror 18, as denoted by an arrow in FIG. 9, is twisted as a whole such that the end portion in the vehicle width direction is inclined toward the foremost side in a state in which the center position in the height direction is fixed. In the figure, 18*a*C denotes a center area of the reflecting face 18*a* of the first reflecting mirror 18 in the vehicle width direction, and 18*a*E denotes an end portion area of the reflecting face 18*a* of the first reflecting mirror 18 in the vehicle width direction.

In addition, the reflecting face 18*a* of the first reflecting mirror 18, as illustrated in FIG. 11, is formed such that the radius of convex curvature of the cross-section along the vehicle width direction gradually increases from the center side to the end portion side in the vehicle width direction, and the radius of convex curvature of the cross-section along the vertical direction, as illustrated in FIG. 10, is formed so as to gradually increase from the center side toward the end portion side in the vehicle width direction.

In this device 10 for visually confirming a forward direction, the first reflecting mirror 18 that reflects the lower side of the front portion and the left and right sides of the vehicle 1 is installed to the front face of the protruded part 16 located on the dashboard 12, the second reflecting mirror 19 that reflects the image imaged on the first reflecting mirror 18 to the crew member m side is arranged on the lower side of the dashboard 12, and the first opening 17 and the second opening 21 are disposed in the area that connects the first reflecting mirror 18 and the second reflecting mirror 19 that are located on the dashboard 12 and the area that connects the second reflecting mirror 19 and the eye-point E of the crew member m, whereby the first reflecting mirror 18 and the second reflecting mirror 19 are arranged at positions, which are sufficiently low, not disturbing the forward field of view of the crew member m. Accordingly, while a simple structure is employed in which expensive components such as imaging means and a motor are not used, high visibility can be secured.

In addition, in the device 10 for visually confirming a forward direction, since the second reflecting mirror 19 is arranged on lower side of the dashboard 12, the first reflecting mirror 18 that directly reflects the forward side and the left and right sides of the vehicle 1 can be installed at a portion on the dashboard 12 that is sufficiently low, and accordingly, even in a vehicle having large forward inclination of the window shield glass 11, the first reflecting mirror 18 can be arranged near the front end portion inside the vehicle. Accordingly, in a case where the left and right sides of the front portion of the vehicle 1 are reflected, a front pillar FP (see FIGS. 6A and 6B) of the vehicle 1 does not disturb the reflected field of view, and the visibility in the horizontal direction can be improved.

In addition, in the device 10 for visually confirming a forward direction, the reflecting face 18a of the first reflecting mirror 18 is configured by a curved face (convex mirror) having convex curvature that is convex toward the vehicle forward side as described above, a wide range to the left and right sides in the vehicle width direction can be reflected onto the first reflecting mirror 18, and the end portion side of the reflecting face 18a of the first reflecting mirror 18 in the vehicle width direction is inclined toward a further lower side of the front portion than the center side in the vehicle width direction, and accordingly, distortion of an image on the end portion side in the vehicle width direction that is reflected in the second reflecting mirror 19 through double reflection can be corrected.

The principle of correcting the distortion of the image will be described.

Figure 12A:
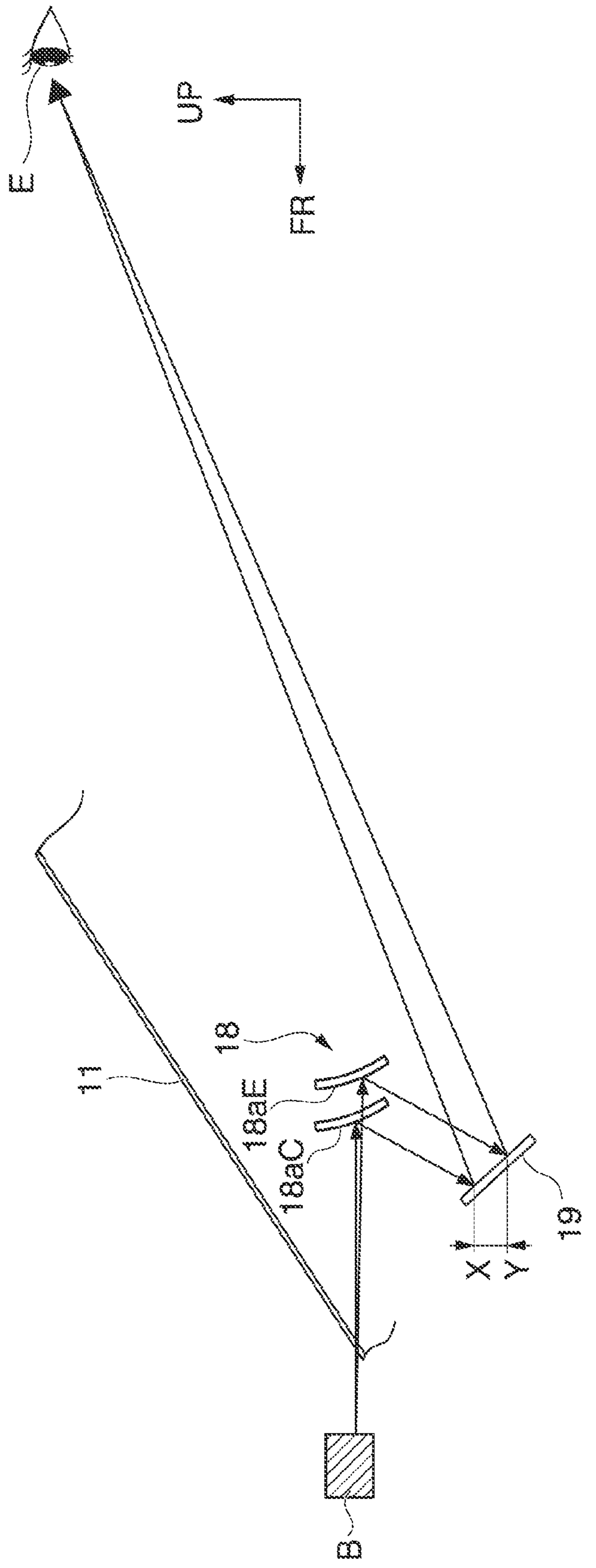
FIG. 12A is a schematic cross-sectional view that illustrates the appearance of an image of a device for visually confirming a forward direction according to a comparative example.
Figure 13A:
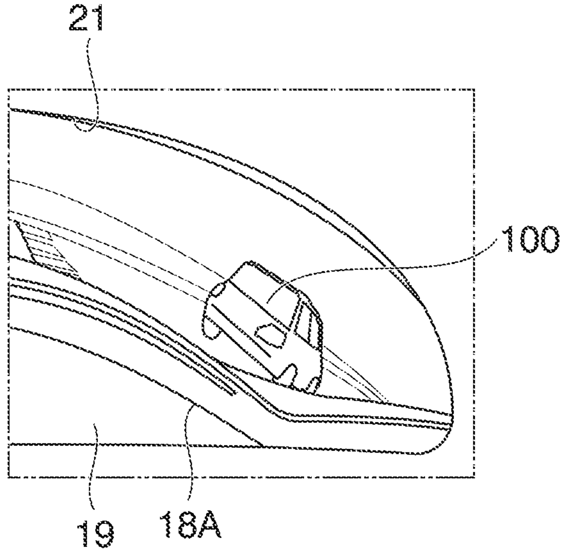
FIG. 13A is a diagram that illustrates an image that is projected to the device for visually confirming a forward direction according to the comparative example.

In the reflecting face 18a of the first reflecting mirror 18, as illustrated in FIG. 12A, the center area 18aC in the vehicle width direction is the closet to the second reflecting mirror 19, and a separation distance therebetween increases toward the end portion area 18aE in the vehicle width direction. Accordingly, as illustrated in FIG. 8, the image 18A of the first reflecting mirror 18 that is reflected on the second reflecting mirror 19 has a curved shape in which the end portion side in the vehicle width direction descends to the lower side. Accordingly, in a case where the angle of inclination of the reflecting face 18a of the first reflecting mirror 18 toward the lower side of the front portion is constant, since a height position X of a target object B that is reflected from the center area 18aC of the reflecting face 18a of the first reflecting mirror 18 in the vehicle width direction and is reflected in the second reflecting mirror 19 and a height position Y of the target object B that is reflected from the end portion area 18aE in the vehicle width direction and is reflected in the second reflecting mirror 19 are different from each other, together with the curve of the image 18A of the first reflecting mirror 18 that is reflected in the second reflecting mirror 19, the image of the vehicle front portion that is projected through reflection occurring twice by the first reflecting mirror 18 and the second reflecting mirror 19 is distorted much toward the end portion (see a comparative example illustrated in FIG. 13A).

Figure 12B:
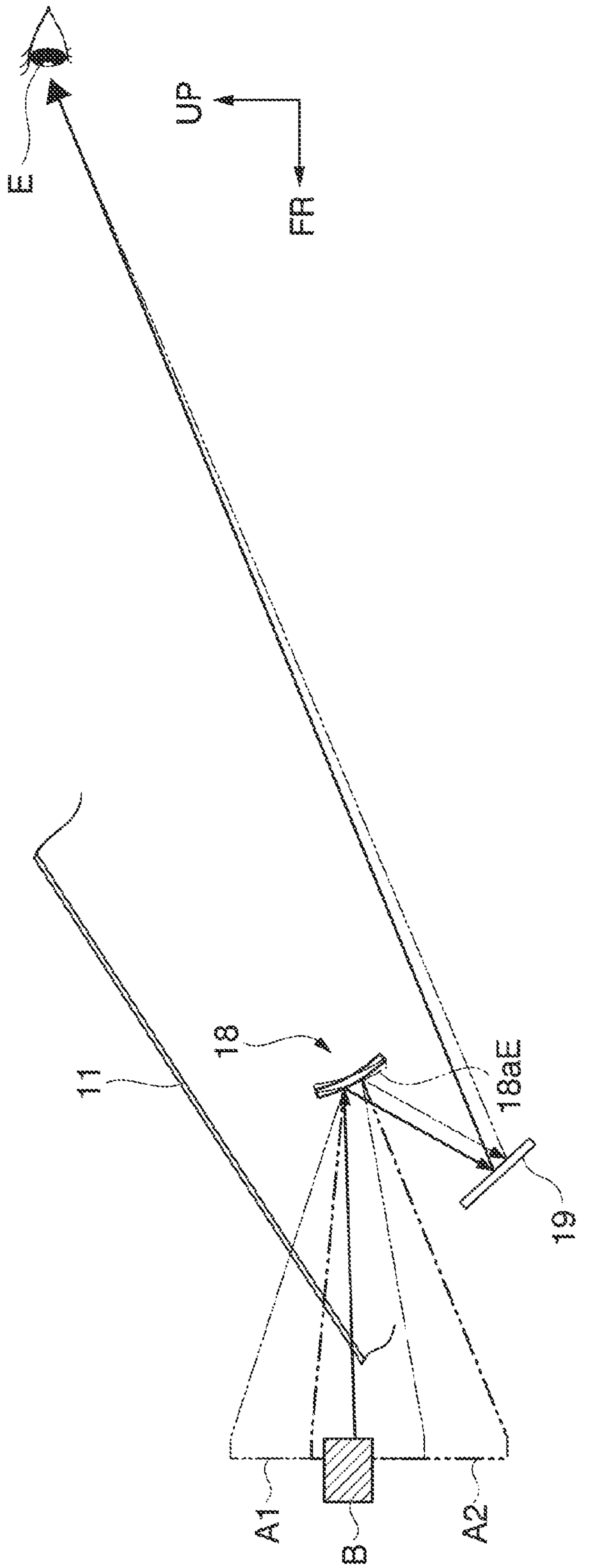
FIG. 12B is a schematic cross-sectional view that illustrates the appearance of an image of the device for visually confirming a forward direction according to the second embodiment of the present invention.

In contrast to this, in the device 10 for visually confirming a forward direction, since the end portion side of the reflecting face 18a of the first reflecting mirror 18 in the vehicle width direction is inclined toward the lower side of the front portion, as illustrated in FIG. 12B, a reflection area A2, which is located on the vehicle forward side, of the end portion area 18aE in the vehicle width direction is lowered than the reflection area A1, which is located on the vehicle forward side, of the end portion area 18aE in the vehicle width direction in the comparative example of a case where the end portion side of the reflecting face 18a of the first reflecting mirror 18 in the vehicle width direction is not inclined toward the lower side of the front portion, and, a target object B located at the same height is reflected on the upper side of the reflecting face 18a for the end portion side in the vehicle width direction. Accordingly, the distortion of the end portion of the image of a vehicle front portion that is reflected through reflection occurring twice on the first reflecting mirror 18 and the second reflecting mirror 19 is corrected through this (see FIG. 13B).

In addition, in the case of the device 10 for visually confirming a forward direction, since the angle of inclination of the reflecting face 18a of the first reflecting mirror 18 toward the side of the front portion gradually increases from the center toward the end portion in the vehicle width direction, the distortion of the image on the end portion side in the vehicle width direction, which is reflected on the crew member m side, can be gently corrected, whereby a sense of discomfort given to the crew member m is reduced so as to further improve the visibility.

Furthermore, in the device 10 for visually confirming a forward direction, since the radius of convex curvature of the end portion side of the reflecting face 18a of the first reflecting mirror 18 in the vehicle width direction is larger than the radius of convex curvature on the center side in the vehicle width direction, a size difference between the image of the vehicle forward side that is reflected in the center area 18aC of the reflecting face 18a of the first reflecting mirror 18 in the vehicle width direction on the second reflecting mirror 19 and the image of the forward side of the vehicle side portion moving to the end portion area 18aE in the vehicle width direction can be decreased.

Figure 13B:
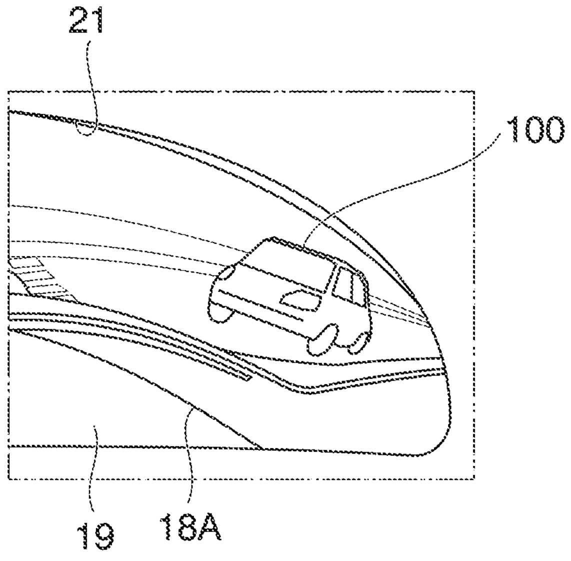
FIG. 13B is a diagram that illustrates an image that is projected to the device for visually confirming a forward direction according to the second embodiment of the present invention.

In other words, since a separation distance between the reflecting face 18a of the first reflecting mirror 18 and the second reflecting mirror 19 increases toward the end portion in the vehicle width direction, the image 18A of the first reflecting mirror 18 that is reflected in the second reflecting mirror 19 decreases toward the end portion in the vehicle width direction. However, in the device 10 for visually confirming a forward direction, since the radius of convex curvature of the end portion side of the reflecting face 18a of the first reflecting mirror 18 in the vehicle width direction is larger than the radius of convex curvature of the center side in the vehicle width direction, a decrease in the image of the first reflecting mirror 18 that is reflected in the second reflecting mirror 19 toward the end portion side can be offset by reflecting the image reflected in the end portion side of the reflecting face 18a of the first reflecting mirror 18 in the vehicle width direction in a relatively enlarged scale compared to the image reflected on the center side. Accordingly, as illustrated in FIG. 13B, a size difference between the image on the center side in the vehicle width direction that is projected through the second reflecting mirror 19 and the image on the end portion side is decreased, whereby a sense of discomfort given to the crew member m is decreased so as to further improve the visibility.

In addition, in the case of the device 10 for visually confirming a forward direction, since the reflecting face 18a of the first reflecting mirror 18 is formed such that the radius of convex curvature of the cross-section along the vehicle width direction gradually increases from the center side to the end portion side in the vehicle width direction, a size difference in the width direction between the image positioned on the center side that is viewed by the crew member m and the image positioned on the end portion side in the vehicle width direction is corrected to be gentle so as to be advantageous to improvement of the visibility.

Furthermore, in the device 10 for visually confirming a forward direction, since the reflecting face 18*a* of the first reflecting mirror 18 is formed such that the radius of convex curvature of the cross-section along the vertical direction gradually increases from the center side toward the end portion side in the vehicle width direction, a difference in the size in the height direction between the image positioned on the center side in the vehicle width direction and the image positioned on the end portion side in the vehicle width direction is forced to be gentle whereby it is advantageous for increasing the visibility.

In addition, the present invention is not limited to the above-described embodiment, and various changes in the design can be made therein in the range not departing from the concept thereof.

Third Embodiment

Hereinafter, examples of a device for visually confirming a forward direction according to a third embodiment of the present invention will be described with reference to the drawings.

Example 1

First, the device for visually confirming a forward direction according to Example 1 of the present invention will be described with reference to FIGS. 1 to 18.

FIG. 1 is a schematic diagram of a vehicle 1 that uses a device 10 for visually confirming a forward direction according to Example 1, and FIGS. 2 to 6B are diagrams that illustrate specific configurations of the device 10 for visually confirming a forward direction. In the figures, arrow FR denotes a forward direction of the vehicle 1 and arrow UP denotes an upward direction of the vehicle 1.

The device 10 for visually confirming a forward direction is arranged on the forward side of a driver's seat located inside the vehicle such that a crew member m seated on the driver's seat can visually confirm the lower side and the left/right side of a front portion of the vehicle 1 with his line of sight facing forward.

In FIGS. 2 and 3, reference numeral 11 is a front window shield glass that is disposed so as to be forward sloped (sloped toward the lower side of the front portion) on the front side of the front seat of the vehicle 1, reference numeral 12 is a dashboard on which meters such as a speedometer and a tachometer are arranged on the front face side facing the driver's seat, and reference numeral 13 is a steering wheel that is arranged on the front side of the driver's seat.

The dashboard 12 includes a front part wall 14 that has meters arranged thereon and faces a crew member m seated on the front seat and an upper part wall 15 that extends approximately horizontally from the upper end portion of the front part wall 14 toward the lower edge of the front window shield glass 11. In a portion of the upper part wall 15, which is located at the front position (the forward position of the front face of the steering wheel 13) of the driver's seat, a protruded part 16 is disposed. This protruded part 16 is formed in the shape of an approximate half cylinder extending along the forward/backward direction of the vehicle body. In addition, in a portion of the upper part wall 15, which is located on the vehicle forward side of the protruded part 16, a first opening 17 is arranged.

Figure 14:
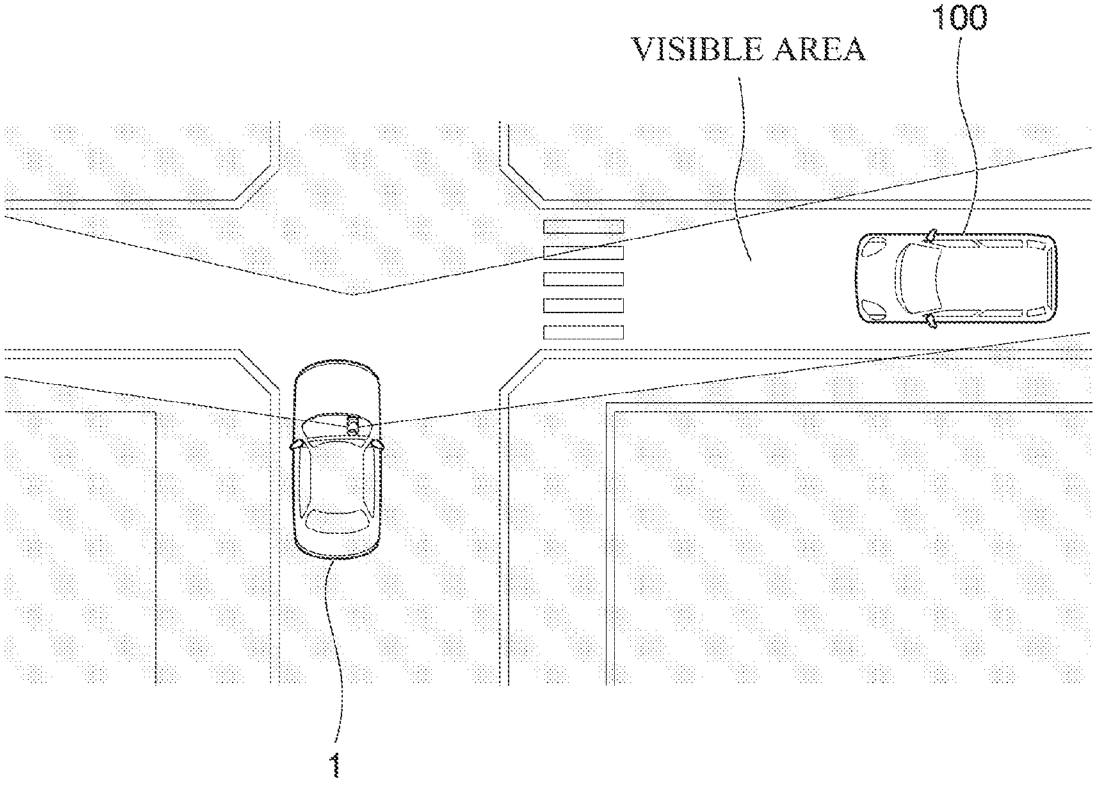
FIG. 14 is a plan view that illustrates a lateral-side area that can be visually confirmed by the device for visually confirming a forward direction.

The front portion of the protruded part 16 is notched so as to form an approximate "U" shape that is convex to the forward side in the plan view, and a first reflecting mirror 18 is attached to the curved notch end. The first reflecting mirror 18 protrudes to the vehicle forward side so as to be curved in an approximate "U" shape in the vehicle width direction and is configured by a convex mirror that is convex toward the vehicle 1 forward side, and the mirror face is installed to the front part face of the protruded part 16 such that the mirror face faces the lower side of the front portion of the vehicle 1. This first reflecting mirror 18 is set such that a broad range in the lower side of the front portion and the left and right sides of the vehicle is reflected through the front window shield glass 11. A lateral-side area that can be viewed by the device 10 for visually confirming a forward direction according to Example 1 is illustrated in FIG. 14. In addition, the first opening 17 located on the dashboard 12 is formed on the forward side of the first reflecting mirror 18 so as to have approximately the same width as that of the first reflecting mirror 18.

Figure 15:
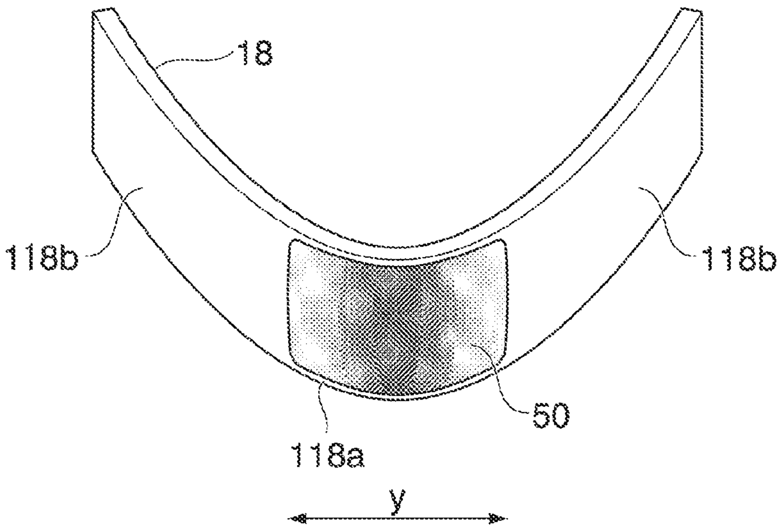
FIG. 15 is a perspective view of a first reflecting mirror of a device for visually confirming a forward direction according to Example 1 of a third embodiment of the present invention.

As illustrated in FIG. 15, a gradation film (a transmission suppressing part; a first transmission suppressing part) 50 that suppresses the transmission of light is attached to a center portion 118*a* of the mirror face of the first reflecting mirror 18 in the horizontal direction. Here, the vertical direction of the mirror faces of the first reflecting mirror 18 and a second reflecting mirror 19 is the direction of arrow y in FIG. 15 and coincides with the horizontal direction (in other words, the vehicle width direction) of the vehicle. The gradation film 50 is configured such that light transmittance is the lowest at the center of the first reflecting mirror 18 in the vertical direction, and light transmittance gradually increases from the center toward the horizontal direction.

In addition, a second reflecting mirror 19, which reflects a reflected image that is imaged on the first reflecting mirror 18 toward the crew member m side, is installed to the lower side of the upper part wall 15 of the dashboard 12. The second reflecting mirror 19 is configured by a plane mirror and is arranged such that the mirror face faces the backward side of the vehicle 1 on the lower side of the front end portion side of the first opening 17. In the case of this Example 1, the second reflecting mirror 19 is attached to the rear face of the dashboard 12 through a bracket 20.

On the other hand, a face of the protruded part 16 that is located on the rear side of the vehicle is inclined to the upper side so as to confront the face of the crew member m seated on the driver's seat, and a second opening 21 that is horizontally long and has an approximate oval shape is formed at an approximate center of the above-described face. This second opening 21 is arranged in an area combining the second reflecting mirror 19 and the eye-point E of the crew member m so as to enable the crew member m to visually confirm the second reflecting mirror 19 that is located on the lower side of the upper part wall 15. In addition, the first opening 17 is arranged in an area that connects the first reflecting mirror 18 and the second reflecting mirror 19. Accordingly, a reflected image of the forward side of the vehicle 1 that is projected to the first reflecting mirror 18 can be visually confirmed by the crew member m through the second reflecting mirror 19 and the second opening 21.

In addition, it is preferable that the second opening 21 has such a height so as to be hidden by the steering wheel 13 in the posture of the crew member at the time of normal driving as illustrated in FIG. 6A, and to be viewed from the upper portion of the steering wheel 13 at a time when the crew member m seated on the driver's seat stretches upward and looks into the second opening 21 in the forward direction, as illustrated in FIG. 6B.

In addition, transmission plates 22 and 23, which are formed from transparent resin or the like, are attached to the first opening portion 17 that is located on the forward side of the protruded part 16 and the second opening 21 that is located on the rear face side of the protruded part 16.

In this Example 1, a first transmission part is configured by the first opening 17 and the transmission plate 22, and a second transmission part is configured by the second opening 21 and the transmission plate 23.

In the device 10 for visually confirming a forward direction, which is configured as above, according to Example 1, when the crew member m seated on the driver's seat looks into the second opening 21 disposed on the dashboard 12 with visually confirming the forward side of the vehicle, a reflected image of the vehicle forward side that is projected to the first reflecting mirror 18 is viewed through the second reflecting mirror 19.

Figure 16:
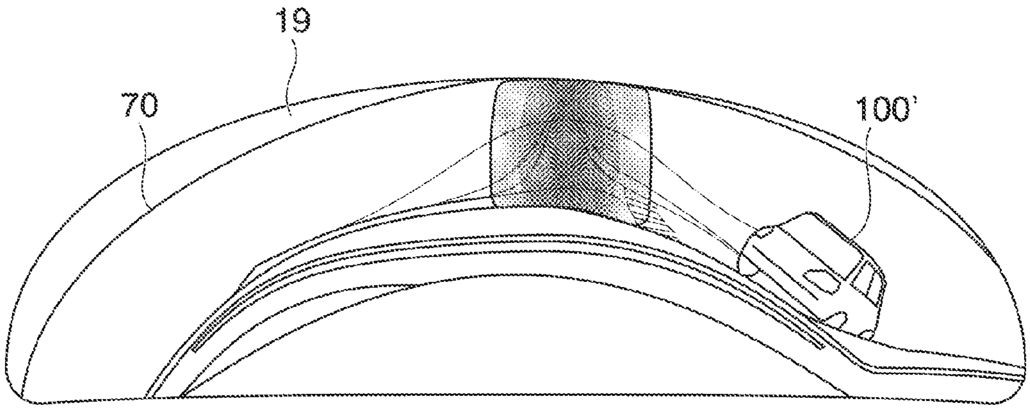
FIG. 16 is a diagram that illustrates a mirror image visually confirmed by a crew member through a second light transmitting unit in the device for visually confirming a forward direction according to Embodiment 1 described above.

At this time, since the first reflecting mirror 18 protrudes to the vehicle forward side, is curved in an approximate "U" shape in the vehicle width direction, and is configured by a convex mirror that is convex toward the forward side of the vehicle, a reflected image that is reflected by the second reflecting mirror 19 and is viewed by the crew member m, as illustrated in FIG. 16, reflects a wide range of the lower side of the front portion and the left and right sides (vehicle width direction) of the vehicle 1.

Figure 18:
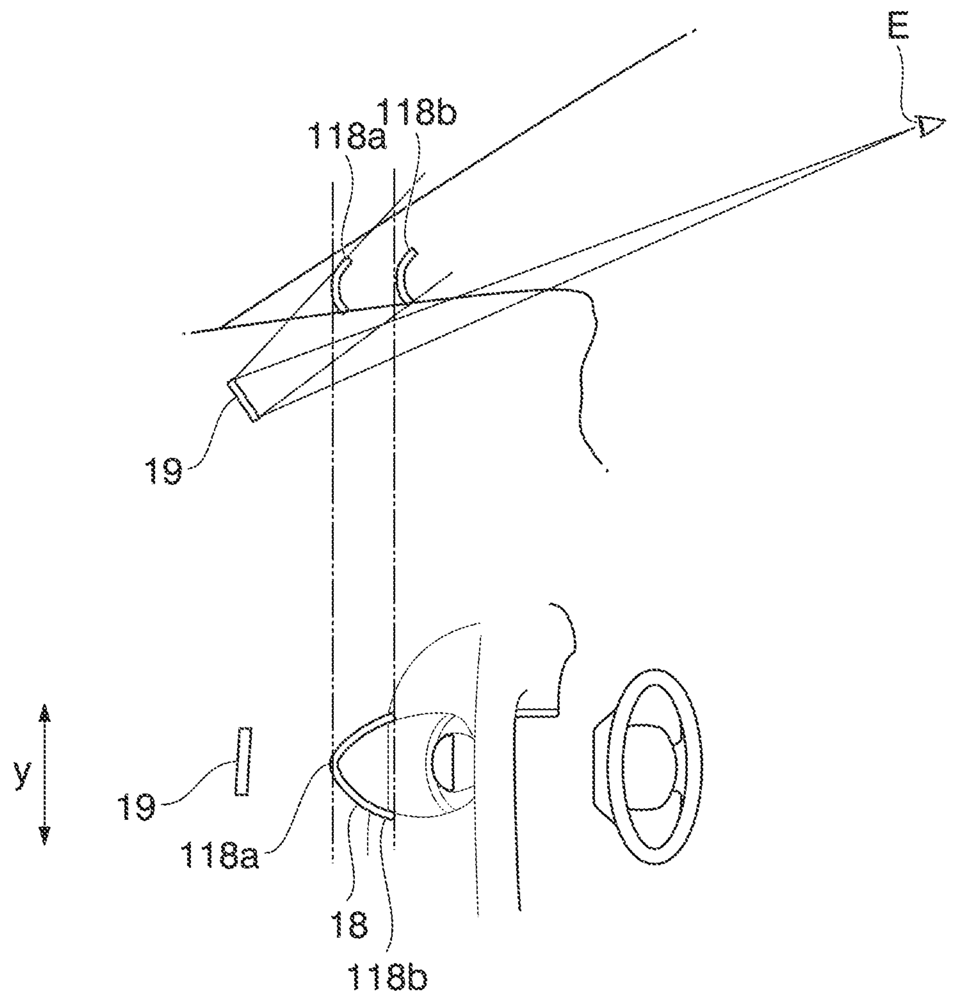
FIG. 18 is a diagram that illustrates a positional difference in the forward/backward direction of the vehicle in the center and the end portion of the first reflecting mirror in the horizontal direction.

In addition, since the first reflecting mirror 18 protrudes toward the forward side of the vehicle and is curved in an approximate "U" shape in the vehicle width direction, as illustrated in FIG. 18, there is a difference between the positions of the center portion 118*a* of the first reflecting mirror 18 in the horizontal direction (the direction of arrow y in FIG. 18) and both end portions 118*b* thereof in the horizontal direction in the forward/backward direction of the vehicle, and, due to this positional difference and the relative positional relation of the second reflecting mirror 19 and the eye-point E of the crew member m, the center portion 118*a* of the first reflecting mirror 18 is reflected to the upper side (in other words, the upper side of the second reflecting mirror 19) of the second reflecting mirror 19 in the vertical direction of the vehicle, and both end portions 118*b* of the first reflecting mirror 18 are reflected to the lower side (in other words, the lower side of the second reflecting mirror 19) of the second reflecting mirror 19 in the vertical direction of the vehicle.

Accordingly, as illustrated in FIG. 16, the reflected image 70 of the first reflecting mirror 18 that is reflected in the second reflecting mirror 19 is in a curved shape that is convex toward the upper side.

Since the image viewed by the crew member m is an image that has been reflected twice by the first reflecting mirror 18 and the second reflecting mirror 19, the image is not horizontally reversed and allows the crew member m to confirm surrounding conditions without any sense of discomfort.

In addition, the reflected image 70 of the first reflecting mirror 18 that is reflected by the second reflecting mirror 19 and is viewed by the crew member m reflects a wide range of the vehicle 1 in the horizontal direction, and, for example, as illustrated in FIG. 14, in a case where another vehicle 100 approaches the vehicle 1 from the right side at an intersection having an obstructed view, an image 100' of the another vehicle 100 is also reflected on the reflected image 70 of the first reflecting mirror 18 as illustrated in FIG. 16, whereby the crew member m can confirm another vehicle 100 that is not directly viewable.

Incidentally, since an image of the road surface positioned on the forward side of the vehicle 1 is also reflected on the reflected image 70 of the first reflecting mirror 18 that is reflected by the second reflecting mirror 19 and is viewed by the crew member m, for example, there is a case where light from the road surface, which has been emitted by the headlight of the vehicle 1 in the night time, is reflected to the center of the reflected image 70. In addition, there is a case where the sun light reflected by the bonnet of the vehicle 1 in the day time, light of the headlight of a vehicle that is oppositely positioned in the night time, or light reflected by a water drop adhering to the bonnet of the vehicle 1 in the night time on a rainy day is reflected by the center portion 118*a* of the first reflecting mirror 18, is incident to the center portion of the second reflecting mirror 19, and is further reflected by the second reflecting mirror 19 so as to travel toward the eye-point E of the crew member m. In such a case, in the device 10 for visually confirming a forward direction, since the gradation film 50 is attached to the center portion 118*a* of the mirror face of the first reflecting mirror 18, even in a case where external light such as light of a road surface, light of the headlight of an oppositely positioned vehicle, or light reflected on the bonnet of the vehicle is incident to the center portion 118*a* of the first reflecting mirror 18, the incident light and any reflected light of the incident light is suppressed by the gradation film 50 from being transmitted, and accordingly, the crew member m is not annoyed, and the visibility is improved.

Figure 17:
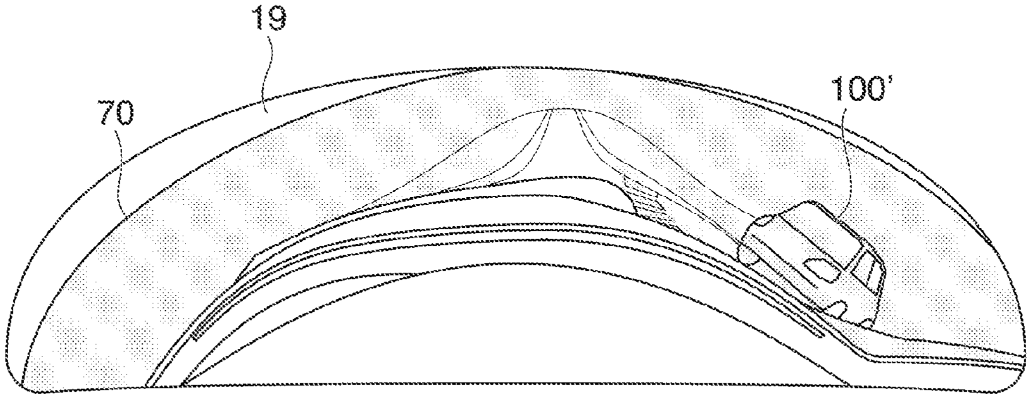
FIG. 17 is a diagram of a comparative example for Example 1 described above, which corresponds to FIG. 16.

FIG. 17 illustrates a mirror image of the second reflecting mirror 19 that is visually confirmed by the crew member m through the second opening 21 in a comparative example in which the gradation film 50 is not disposed in the center portion 118*a* of the mirror face of the first reflecting mirror 18. In a case where the gradation film 50 is not disposed as above, for example, light from the road surface or the like is reflected at the center of the reflected image 70 of the first reflecting mirror 18, and accordingly, the crew member m is annoyed so as to decrease the visibility.

In addition, although a decrease in the visibility due to light incident to the center portion 118*a* of the first reflecting mirror 18 can be prevented by cutting the center portion of the reflected image 70 of the first reflecting mirror 18, in a case where the center portion of the reflected image 70 is cut, images of the reflected image 70 on the left and right sides are divided, and a connection disappears to be unnatural, whereby it is difficult for the crew member m to intuitively understand the reflected image. In the device 10 for visually confirming a forward direction according to Example 1, by disposing the gradation film 50 in the center portion 118*a* of the first reflecting mirror 18, the convenience is improved through day and night while the continuity of the reflected image 70 in the horizontal direction is secured.

In this device 10 for visually confirming a forward direction, the first reflecting mirror 18 that reflects the lower side of the front portion and the left and right sides of the vehicle 1 is installed to the front face of the protruded part 16 located on the dashboard 12, the second reflecting mirror 19 that reflects the image imaged on the first reflecting mirror 18 to the crew member m side is arranged on the lower side of the dashboard 12, and the first opening 17 and the second opening 21 are disposed in the area that connects the first reflecting mirror 18 and the second reflecting mirror 19 that are located on the dashboard 12 and the area that connects the second reflecting mirror 19 and the eye-point E of the crew member m, whereby the first reflecting mirror 18 and the second reflecting mirror 19 are arranged at positions, which are sufficiently low, not disturbing the forward field of view of the crew member m. Accordingly, while a simple structure is employed in which expensive components such as imaging means and a motor are not used, high visibility can be secured.

Especially, in the device 10 for visually confirming a forward direction, since the second reflecting mirror 19 is arranged on lower side of the dashboard 12, the first reflecting mirror 18 that directly reflects the forward side and the left and right sides of the vehicle 1 can be installed at a portion on the dashboard 12 that is sufficiently low. As a result, a blind spot positioned on the lateral side with respect to the traveling direction of the vehicle 1 can be easily reflected. In addition, since a gap between the first reflecting mirror 18 disposed on the dashboard 12 and the second reflecting mirror 19 disposed under the dashboard 12 can be set to be relatively small, the reflected image of the first reflecting mirror 18 can be reflected on the second reflecting mirror 19 in an enlarged scale, whereby high visibility can be acquired. Particularly, even in a vehicle in which the forward inclination of the front window shield glass 11 is high, the first reflecting mirror 18 can be arranged near the front end portion of the inside of the vehicle, and accordingly, in a case where the left and right sides of the front portion of the vehicle 1 are reflected, the front pillar FP of the vehicle 1 does not disturb the reflected field of view, whereby high visibility in the horizontal direction can be acquired.

In addition, in the device 10 for visually confirming a forward direction, the protruded part 16 is disposed on the upper part wall 15 of the dashboard 12, and the second opening 21 is arranged on a face of the protruded part 16 that is located on the backward side of the vehicle, whereby the second opening 21 can be visually noticeable in an easy manner when the crew member m visually confirms a front direction with stretching upward. Accordingly, the visibility for the crew member can be improved.

In addition, in the case of this device 10 for visually confirming a forward direction, the second opening 21 is formed on a face of the protruded part 16 that forwardly faces the face of the crew member m, and accordingly, the visible range in which the second reflecting mirror 19 of the second opening 21 is visible can be sufficiently secured while the area of the second opening 21 is suppressed to be minimal.

In addition, in the device 10 for visually confirming a forward direction according to Example 1, since the first reflecting mirror 18 is arranged on the face of the protruded part 16, which is at a blind spot for the crew member m, that is located on the forward side of the vehicle, the first reflecting mirror 18 is not directly visible to the crew member m during driving. Accordingly, the field of view of the crew member m can be prevented from being disturbed by reflected light or the like, and the outer appearance is good.

In addition, in the case of the device 10 for visually confirming a forward direction, since the first opening 17 located on the dashboard 12 is arranged on the forward side of the protruded part 16, that is at a blind spot of the crew member m, it is advantageous to improve the outer appearance.

Furthermore, in the device 10 for visually confirming a forward direction according to this Example 1, since the first opening 17 and the second opening 21 that are located on the dashboard 12 are closed by the transmission plates 22 and 23, the penetration of dusts, water vapor, or the like into the inside of the dashboard 12 can be prevented. In addition, even in a case where the transmission plates 22 and 23 are attached to any one of the first opening 17 and the second opening 21, such an advantage can be acquired.

Example 2

Next, a device 10 for visually confirming a forward direction according to Example 2 of the present invention will be described with reference to FIG. 19.

The difference between the device 10 for visually confirming a forward direction according to Example 2 and that according to Example 1 lies in the configuration of the transmission suppressing part attached to the center portion 118*a* of the mirror face of the first reflecting mirror 18, and the other configuration of Example 2 is the same as that of Example 1. Hereinafter, only the difference will be described.

In the device 10 for visually confirming a forward direction according to Example 1 described above, while the transmission suppressing part is configured by the gradation film 50, in the device 10 for visually confirming a forward direction according to Example 2, the transmission suppressing part is configured by a polarizing filter instead of the gradation film 50. In other words, in Example 2, the polarizing filter is attached to the center portion 118*a* of the mirror face of the first reflecting mirror 18.

Figure 19:
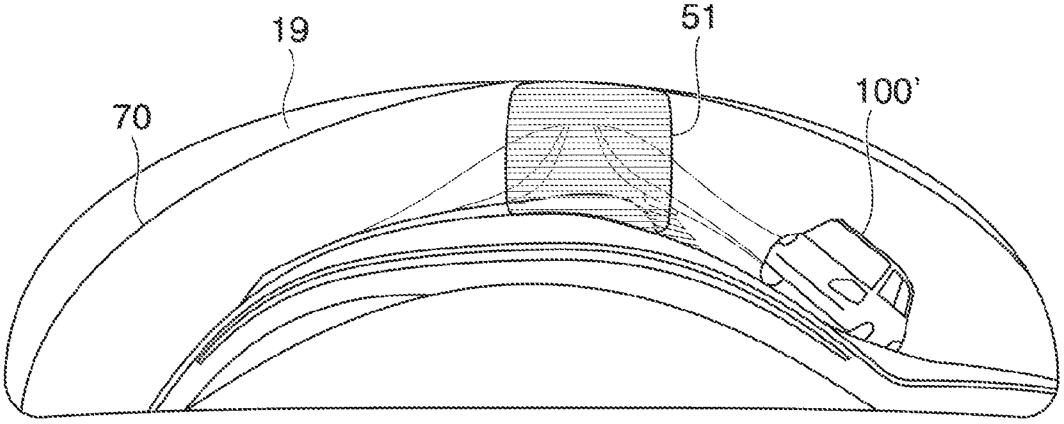
FIG. 19 is a diagram that illustrates a mirror image visually confirmed through a second light transmitting unit by a crew member in a device for visually confirming a forward direction according to Example 2 of the third embodiment of the present invention.

FIG. 19 illustrates a mirror image of the second reflecting mirror 19 that is visually confirmed by the crew member m through the second opening 21 in a case where the polarizing filter is attached to the center portion 118*a* of the mirror face of the first reflecting mirror 18, and reference numeral 51 illustrates an image of a portion in which the polarizing filter is disposed in the figure.

In a case where the polarizing filter is attached to the center portion 118*a* of the mirror face of the first reflecting mirror 18, diffused reflection occurring in the center portion 118*a* of the first reflecting mirror 18 can be suppressed, and accordingly, similarly to a case where the gradation film 50 is disposed, a decrease in the visibility due to light incident to the center portion 118*a* of the first reflecting mirror 18 can be suppressed, whereby the visibility is improved.

Example 3

Next, a device 10 for visually confirming a forward direction according to Example 3 of the present invention will be described with reference to FIG. 20.

The difference between the device 10 for visually confirming a forward direction according to Example 3 and that according to Examples 1 and 2 lies in the installation position of the transmission suppressing part, and the other configuration of Example 3 is the same as that of Example 1. Hereinafter, only the difference will be described.

Figure 20:
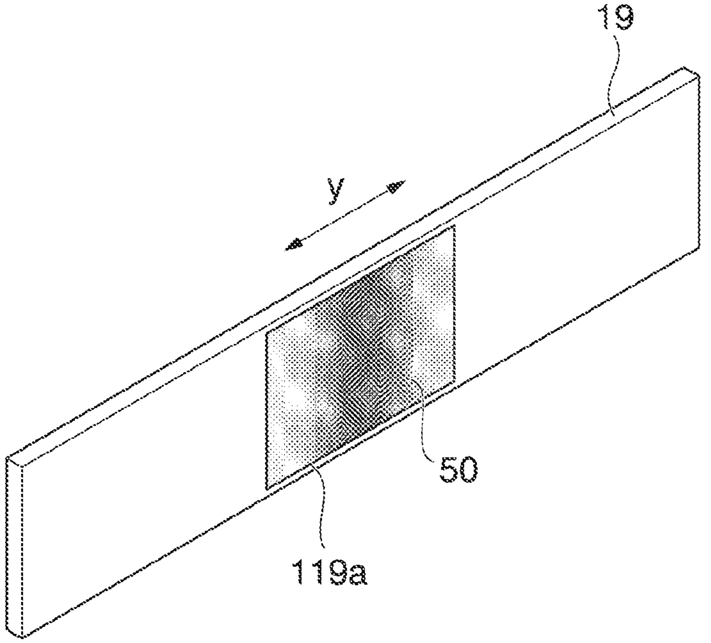
FIG. 20 is a perspective view of a second reflecting mirror of a device for visually confirming a forward direction according to Example 3 of the third embodiment of the present invention.

In the device 10 for visually confirming a forward direction according to Example 1 described above, while the gradation film 50 as the transmission suppressing part is attached to the center portion 118*a* of the mirror face of the first reflecting mirror 18, in the device 10 for visually confirming a forward direction according to Example 3, the gradation film 50 is not attached to the first reflecting mirror 18, and, as illustrated in FIG. 20, the gradation film 50 is attached to the center portion 119*a* of the mirror face of the second reflecting mirror 19 in the horizontal direction. Here, the horizontal direction of the mirror face of the second reflecting mirror 19 is the direction of arrow y in FIG. 20 and coincides with the horizontal direction (in other words, the vehicle width direction) of the vehicle.

As above, in a case where the gradation film 50 is attached to the center portion 119*a* of the mirror face of the second reflecting mirror 19, even in a case where external light such as light of a road surface, light of the headlight of an oppositely positioned vehicle, or light reflected on the bonnet of the vehicle is reflected by the center portion 118*a* of the first reflecting mirror 18, and the reflected light is incident to the center portion 119*a* of the second reflecting mirror 19, the incident light and any reflected light of the incident light is suppressed by the gradation film 50 from being transmitted, and accordingly, the crew member m is not annoyed, and the visibility is improved.

In addition, even in a case where a polarizing filter instead of the gradation film 50 is attached to the center portion 119*a* of the mirror face of the second reflecting mirror 19, diffused reflection occurring in the center portion 119*a* of the second reflecting mirror 19 can be suppressed, and accordingly, a decrease in the visibility due to light incident to the center portion 118*a* of the first reflecting mirror 18 can be suppressed, whereby the visibility is improved.

Here, a case where the transmission suppressing part is disposed in the center portion 118*a* of the mirror face of the first reflecting mirror 18 and a case where the transmission suppressing part is disposed in the center portion 119*a* of the mirror face of the second reflecting mirror 19 will be compared with each other.

When the eye-point E of the driver m is shifted in the horizontal direction of the vehicle, the amount of shift of the image of the center portion 118*a* of the first reflecting mirror 18 that is reflected in the second reflecting mirror 19 in the horizontal direction of the vehicle for the shift of the eye-point E is large, and accordingly, in a case where the transmission suppressing part is disposed in the center portion 119*a* of the mirror face of the second reflecting mirror 19, there is a possibility that the image of the center portion 118*a* of the first reflecting mirror 18 is deviated from the transmission suppressing part disposed in the second reflecting mirror 19 due to the shift of the eye-point E of the driver m, and, as a result, the area of the eye-point for which the effect of suppressing the transmission of light (hereinafter, referred to as a transmission suppressing effect) is acquired is narrowed. Accordingly, in the case where the transmission suppressing part is disposed in the center portion 119*a* of the mirror face of the second reflecting mirror 19, in order not to narrow the area of the eye-point, the transmission suppressing part needs to be widely disposed in the horizontal direction.

In contrast to this, in a case where the transmission suppressing part is disposed in the center portion 118*a* of the mirror face of the first reflecting mirror 18, the area of the eye-point for which the transmission suppressing effect is acquired is extremely wide, and, even in a case where the eye-point E of the driver m is slightly shifted, there is hardly any effect. Accordingly, in a case where the transmission suppressing part is disposed in the center portion 118*a* of the mirror face of the first reflecting mirror 18, even in a case where the transmission suppressing part is widened in the horizontal direction, the area of the eye-point for which the transmission suppressing effect is acquired can be sufficiently secured. Therefore, the case where the transmission suppressing part is disposed in the center portion 118*a* of the mirror face of the first reflecting mirror 18 is advantageous over the case where the transmission suppressing part is disposed in the center portion 119*a* of the mirror face of the second reflecting mirror 19 and is more convenient.

Example 4

Next, a device 10 for visually confirming a forward direction according to Example 4 of the present invention will be described with reference to FIGS. 21 to 23.

As described above, in the device 10 for visually confirming a forward direction according to the present invention, since the first reflecting mirror 18 protrudes to the vehicle forward side, is curved in an approximate "U" shape in the vehicle width direction, and is configured by a convex mirror that is convex toward the forward side of the vehicle, a reflected image that is reflected by the second reflecting mirror 19 and is viewed by the crew member m, as illustrated in FIG. 16, reflects a wide range of the lower side of the front portion and the left and right sides (vehicle width direction) of the vehicle 1, and the crew member m can recognize a vehicle 100 approaching to the vehicle in the horizontal direction by visually confirming an image 100' included in the reflected image. At this time, in order to enable easy identification of the image 100' (in other words, whether it is a vehicle or not), the dimensions, the installation angle, and the like of the first reflecting mirror 18 are set such that the sky is reflected in an upper portion of the mirror image of the first reflecting mirror 18.

Figure 23:
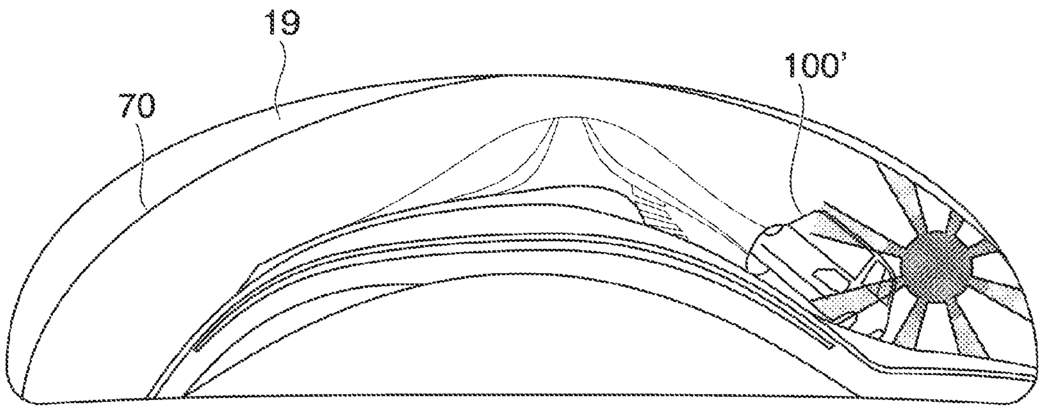
FIG. 23 is a diagram of a comparative example for Example 4 described above, which corresponds to FIG. 22.

However, in a case where the first reflecting mirror 18 is set such that the sky is reflected in the mirror image of the first reflecting mirror 18 as above, in a time frame during morning and evening in which the sky is located at a low position, as illustrated in FIG. 23, the sun is reflected to the upper side of the end portion of the mirror image of the first reflecting mirror 18, which may be annoying.

This, in the device 10 for visually confirming a forward direction according to Example 4, not only a transmission suppressing part such as the gradation film 50 is disposed in the center portion 118*a* of the mirror face of the first reflecting mirror 18 in the horizontal direction (the direction of arrow y in FIG. 21), but also a transmission suppressing part (hereinafter, referred to as a second transmission suppressing part) that suppresses the transmission of light is disposed also at a position located on an upper side of the center of a line that joins the upper end and the lower end of the first reflecting mirror 18 in the vertical direction of the vehicle in at least one end portion of the mirror face of the first reflecting mirror 18 in the horizontal direction. The other configuration is the same as that of Example 1.

Figure 21:
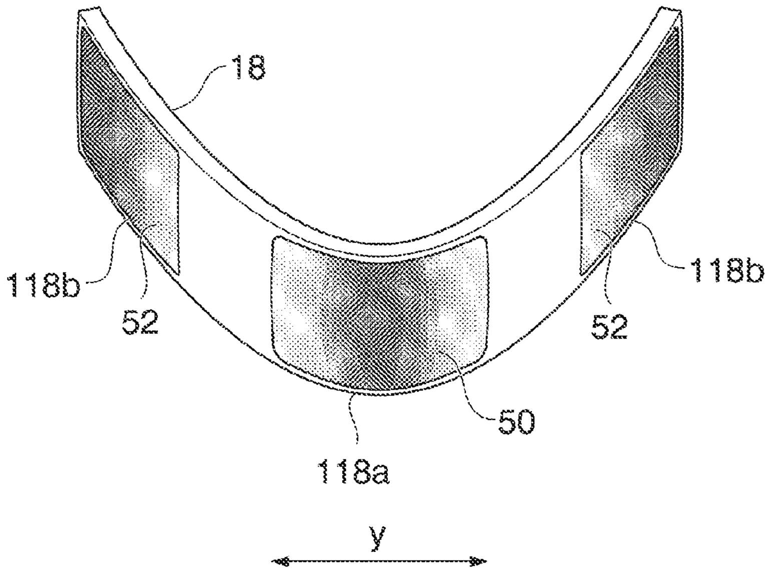
FIG. 21 is a perspective view of a first reflecting mirror of a device for visually confirming a forward direction according to Example 4 of the third embodiment of the present invention.

For example, as illustrated in FIG. 21, gradation films (second transmission suppressing parts) 52 that suppress the transmission of light are attached to predetermined areas of the left and right end portions 118*b* of the mirror face of the first reflecting mirror 18 in the horizontal direction. The gradation film 52 is configured such that the light transmittance is the lowest in the left and right ends of the first reflecting mirror 18, and the light transmittance gradually increases from the left and right ends toward the center in the horizontal direction. Here, as the gradation film 52, a blue filter that can cut light of 550 to 770 μm (yellow, orange, and red) that is a wavelength of the morning sun or the evening sun is particularly effective.

Figure 22:
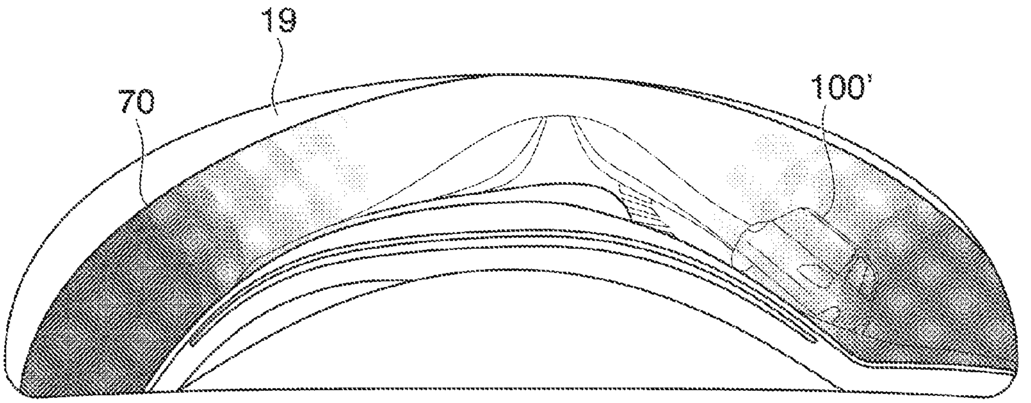
FIG. 22 is a diagram that illustrates a mirror image visually confirmed by a crew member through a second light transmitting unit in the device for visually confirming a forward direction according to Embodiment 4 described above.

As above, in a case where the gradation films 52 are also attached to the left and right end portions 118*b* of the mirror face of the first reflecting mirror 18, as illustrated in FIG. 22, even in a case the sun is reflected at the end portion of the mirror image of the first reflecting mirror 18 during morning and evening, the sun light is suppressed by the gradation films 52 from being transmitted, and accordingly, the crew member m is not annoyed, and the visibility of an image reflected at the end portion 118*b* of the first reflecting mirror 18 is improved.

In FIG. 21, although the gradation films 52 are disposed in both left and right end portions 118*b* of the first reflecting mirror 18, the gradation film 52 may be disposed only in one of the left and right end portions. In addition, in FIG. 21, although the gradation film 52 is disposed over all heights of the first reflecting mirror 18 in the vertical direction of the vehicle in the end portions 118*b* of the mirror face of the first reflecting mirror 18, in a case where the gradation film 52 is disposed in a further upper area than the center of a line joining the upper end and the lower end of the first reflecting mirror 18 in the vertical direction of the vehicle, the effect of reducing the annoyance of the sun light during morning and evening can be acquired.

Example 5

Next, a device 10 for visually confirming a forward direction according to Example 5 of the present invention will be described with reference to FIGS. 24 to 26B.

As described above, in the device 10 for visually confirming a forward direction according to the present invention, since the first reflecting mirror 18 protrudes to the vehicle forward side in the plan view and is curved in an approximate "U" shape in the vehicle width direction, as illustrated in FIG. 18, there is a difference between the position of the center portion 118*a* of the first reflecting mirror in the horizontal direction and both end portions 118*b* in the horizontal direction in the forward/backward direction of the vehicle. In addition, in the devices 10 for visually confirming a forward direction according to Examples 1 to 4 described above, the angle of inclination of the first reflecting mirror 18 in the vertical direction of the vehicle is the same over the whole length in the horizontal direction.

Accordingly, due to the positional difference between the center portion 118*a* of the first reflecting mirror 18 and both the end portions 118*b* in the forward/backward direction of the vehicle and the relative positional relation of the second reflecting mirror 19 and the eye-point E of the crew member m, the center portion 118*a* of the first reflecting mirror 18 is reflected to the upper side (in other words, the upper side of the second reflecting mirror 19) of the second reflecting mirror 19 in the vertical direction of the vehicle, and both end portions 118*b* of the first reflecting mirror 18 are reflected to the lower side (in other words, the lower side of the second reflecting mirror 19) of the second reflecting mirror 19 in the vertical direction of the vehicle.

Figure 25A:
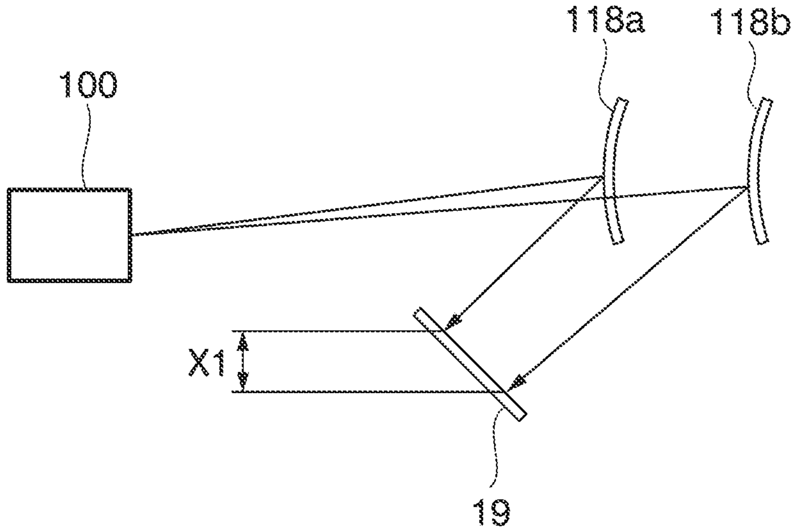
FIG. 25A is a diagram that illustrates a difference in the positions of an image of a first reflecting mirror on a second reflecting mirror in the vertical direction and is a case where the inclination angle with respect to the vertical direction of the vehicle is the same in the center portion and the end portion of the mirror face of the first reflecting mirror in the horizontal direction.

In addition, for example, in a case where the crew member m drives the vehicle on a road that extends straight to the left and right sides to be perpendicular to the track of the vehicle 1 and, as illustrated in FIG. 14, additionally visually recognizes a vehicle 100 through the device 10 for visually confirming a forward direction, as illustrated in FIG. 25A, while a light beam from a target object (another vehicle 100) that is present in the forward direction of the vehicle 1 and can be visually recognized is reflected by the center portion 118*a* of the first reflecting mirror 18 and is reflected by an upper portion of the center portion of the second reflecting mirror 19 in the vertical direction so as to be incident to the eyes of the crew member m, a light beam from the target object (another vehicle 100) that is present far away in the horizontal direction of the vehicle 1 and can be visually recognized is reflected by one of left and right end portions 118*b* of the first reflecting mirror 18 and is reflected by a lower portion of the center portion of the second reflecting mirror 19 in the vertical direction so as to be incident to the eyes of the crew member m.

Figure 26A:
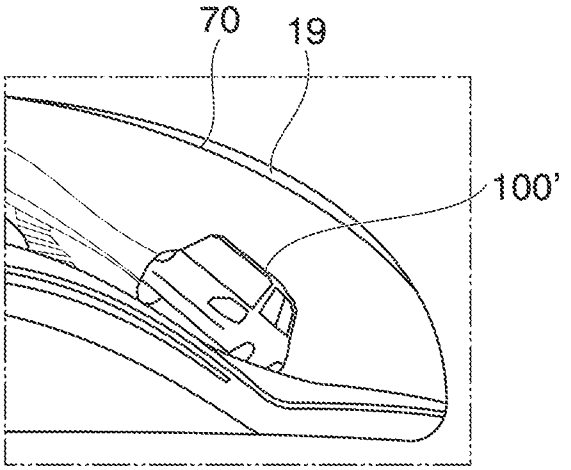
FIG. 26A is a diagram that illustrates the image of the end portion of the first reflecting mirror that is reflected on the second reflecting mirror in a comparative manner and is a case where the inclination angle with respect to the vertical direction of the vehicle is the same in the center portion and the end portion of the mirror face of the first reflecting mirror in the horizontal direction.

As a result, in the reflected image 70 of the first reflecting mirror 18 that is reflected by the second reflecting mirror 19 so as to be viewed by the crew member m, as illustrated in FIG. 26A, an image of a center portion of the road, on which another vehicle 100 travels, in the horizontal direction is located on the upper side, images of the end portions of the road in the horizontal direction are located on the lower side, and an image of the road is curved so as to be convex to the upper side, whereby the radius of curvature is small. In other words, although the road is a straight road in the horizontal direction, it is curved so as to be skewed in the mirror image viewed by the crew member m through the second reflecting mirror 19, and accordingly, the crew member m has a visual sense of discomfort. In addition, in the reflected image 70 of the first reflecting mirror 18, since the images of the end portions of the road in the horizontal direction are located on the lower side, an area in which the sky is reflected is large in the left and right end portions of the reflected image 70, and the possibility that the sun is reflected thereto increases.

Figure 24:
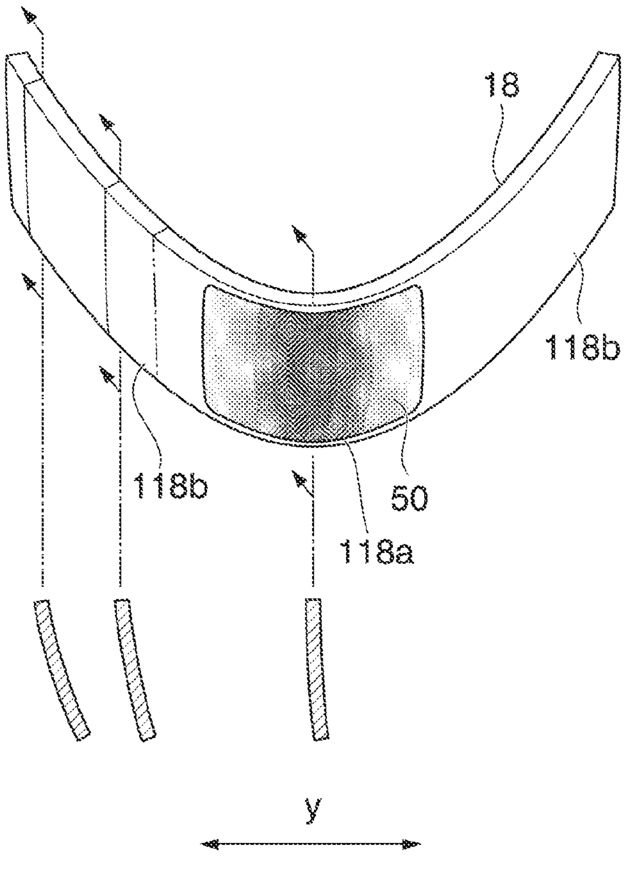
FIG. 24 is a perspective view and a longitudinal cross-sectional view of a first reflecting mirror according to Example 5 of the third embodiment of the present invention.

Thus, in the device 10 for visually confirming a forward direction according to Example 5, the angle of inclination of the mirror face of the first reflecting mirror 18 with respect to the vertical direction of the vehicle is not the same over the whole length in the horizontal direction, and, as illustrated in FIG. 24, the angle of inclination of both end portions 118*b* is set to be larger than the angle of inclination of the center portion 118*a* in the horizontal direction (the direction of arrow y in FIG. 24). In addition, in a case where the angle of inclination is to be changed, it is preferable to change the angle of inclination not sharply but gently for maintaining the continuity of the image. The other configuration is the same as that of the device 10 for visually confirming a forward direction according to Example 1, and thus the description thereof will not be presented.

Figure 25B:
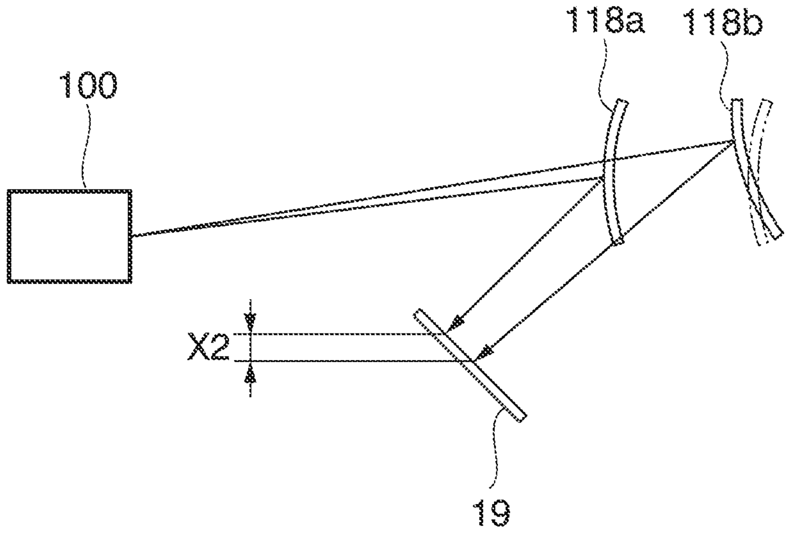
FIG. 25B is a diagram that illustrates a difference in the positions of the image of the first reflecting mirror on the second reflecting mirror in the vertical direction and is a diagram that illustrates a case where the end portions of the mirror face of the first reflecting mirror in the horizontal direction are inclined toward a further front side than the center portion.

By configuring as such, as illustrated in FIG. 25B, a light beam from a target object (another vehicle 100) that is located far away in the horizontal direction of the vehicle 1 and can be visually recognized is reflected to the upper side of one of left and right end portions 118*b* of the first reflecting mirror 18 in the vertical direction, and the reflected light is reflected by an upper portion or a portion located near the center portion of the end portion of the second reflecting mirror 19 in the vertical direction so as to be incident to the eye of the crew member m. In other words, in the second reflecting mirror 19, a difference between a position in the vertical direction to which reflected light reflected by the center portion 118*a* of the first reflecting mirror 18 is incident and a position in the vertical direction to which reflected light reflected by the end portion 118*b* of the first reflecting mirror 18 decreases ($X2<X1$).

Figure 26B:
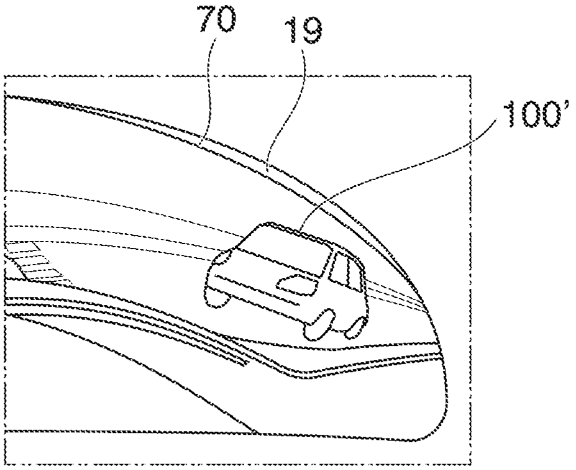
FIG. 26B is a diagram that illustrates the image of the end portion of the first reflecting mirror that is reflected on the second reflecting mirror in a comparative manner and is a diagram that illustrates a case where the end portions of the mirror face of the first reflecting mirror in the horizontal direction are inclined to a further front side than the center portion.

As a result, in the reflected image 70 of the first reflecting mirror 18 that is reflected by the second reflecting mirror 19 so as to be viewed by the crew member m, as illustrated in FIG. 26B, a positional difference between an image of the center portion in the horizontal direction and an image of the end portion in the horizontal direction in the road on which another vehicle 100 travels is small, and accordingly, the image of the road on the reflected image 70 is close to be horizontal. Accordingly, a visual sense of discomfort that is received by the crew member m can be reduced. In addition, in the reflected image 70, since the images of the end portions of the road in the horizontal direction are located on the upper side, the area on which the sky is reflected in the left and right end portions of the reflected image 70 can be small, whereby it is difficult for the sun to be reflected thereon.

In addition, in FIG. 24, although the angle of inclination of the mirror face of the first reflecting mirror 18 with respect to the vertical direction of the vehicle in both left and right end portions 118*b* of the first reflecting mirror 18 is larger than that in the center portion 118*a*, only the angle of inclination in one of the left and right end portions 118*b* may be larger than that in the center portion 118*a*.

Embodiment 6

Next, a device 10 for visually confirming a forward direction according to Example 6 of the present invention will be described with reference to FIGS. 27 to 28B.

In the device 10 for visually confirming a forward direction according to each example described above, the curvature of the first reflecting mirror 18 as a convex mirror, that is, the curvature of the cutting plane line of the mirror face at the time of cutting the first reflecting mirror 18 in the vertical direction is constant over the whole length of the first reflecting mirror 18 in the horizontal direction.

Figure 28A:
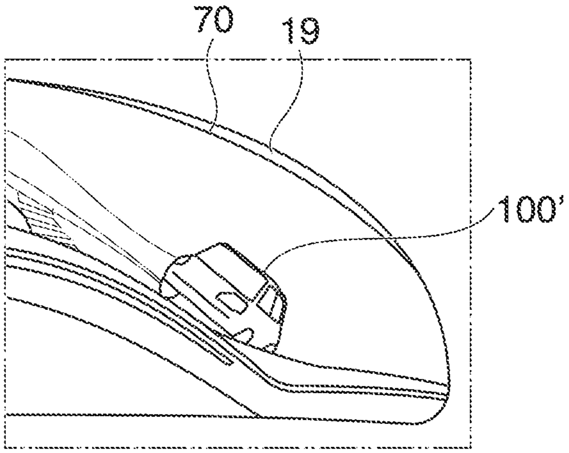
FIG. 28A is a diagram that illustrates the image of the end portion of the first reflecting mirror that is reflected on the second reflecting mirror in a comparative manner and is a diagram that illustrates a case where the curvature of the center portion and the curvature of the end portion of the mirror face of the first reflecting mirror in the horizontal direction are the same.

In such a configuration, in the reflected image 70 of the first reflecting mirror 18 that is reflected by the second reflecting mirror 19 so as to be viewed by the crew member m, the image of a target object (another vehicle 100) that is present near the forward side of the vehicle 1 is reflected to be large so as to disturb the crew member, and the image of a target object (another vehicle 100) that is present far away in the horizontal direction, as illustrated in FIG. 28A, is reflected to be small so as to slightly decrease the visibility for another vehicle 100 that is present far away.

Figure 27:
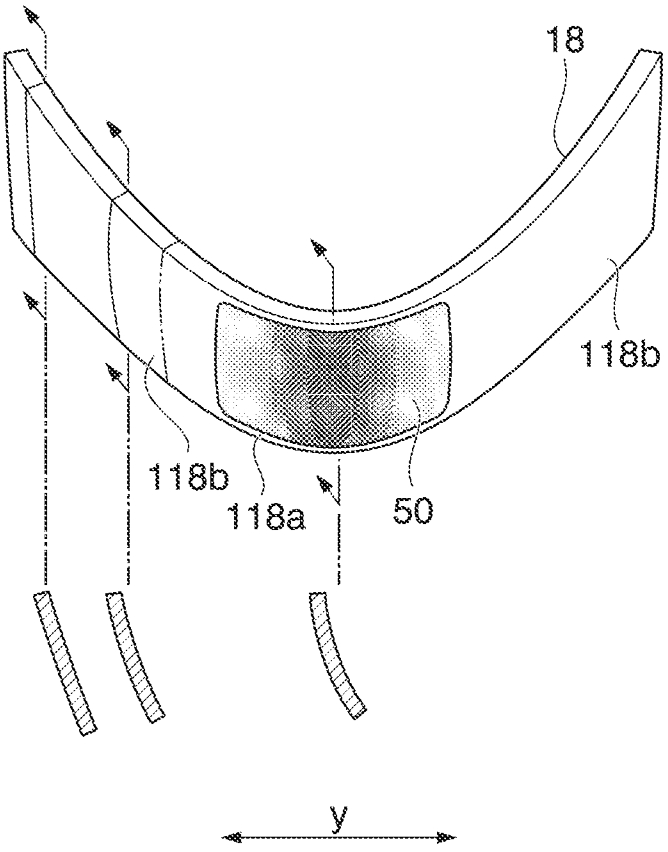
FIG. 27 is a perspective view and a longitudinal cross-sectional view of a first reflecting mirror according to Example 6 of the third embodiment of the present invention.

Thus, in the device 10 for visually confirming a forward direction according to Example 6, the curvature of the cutting plane line of the mirror face at the time of cutting the first reflecting mirror 18 in the vertical direction is not configured to be constant over the whole length of the first reflecting mirror 18 in the horizontal direction, but, as illustrated in FIG. 27, the curvature of the mirror face of the center portion 118*a* in the horizontal direction (the direction of arrow y in FIG. 27) is configured to be large, and the curvature of the mirror faces of both end portions 118*b* are configured to be small. In addition, in a case where the curvature is to be changed, it is preferable to gradually change the curvature for maintaining the continuity of the image. The other configuration is the same as that of the device 10 for visually confirming a forward direction according to Example 1, and the description thereof will not be presented.

Figure 28B:
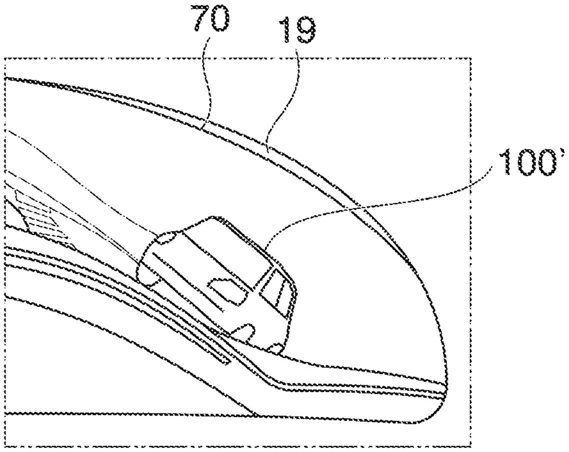
FIG. 28B is a diagram that illustrates the image of the end portion of the first reflecting mirror that is reflected on the second reflecting mirror in a comparative manner and is a diagram that illustrates a case where the curvature of end portion of the mirror face of the first reflecting mirror in the horizontal direction is smaller than the curvature of the center portion.

By configuring as such, in the reflected image 70 of the first reflecting mirror 18 that is reflected by the second reflecting mirror 19 so as to be viewed by the crew member m, the image of a target object (another vehicle 100) that is present near the forward side of the vehicle 1 can be configured not to be excessively large, and accordingly, the annoyance felt when the crew member views the reflected image 70 can be reduced, and the image 100' of a target object (another vehicle 100) that is present far away in the horizontal direction, as illustrated in FIG. 28B, can be configured to be large, and accordingly, the visibility for a target object (another vehicle 100) that approaches the vehicle 1 from a distance is improved.

In addition, in FIG. 27, although the curvature of the mirror face of the first reflecting mirror 18 in both left and right end portions 118*b* of the first reflecting mirror 18 is smaller than that in the center portion 118*a*, only the curvature of one of the left and right end portions may be configured to be larger than that of the center portion 118*a*.

The present invention is not limited to the above-described examples.

For example, the above-described Examples 4 to 6 may be appropriately combined.

In addition, in Examples 1 to 5 described above, although the first reflecting mirror 18 is configured by a convex mirror, the first reflecting mirror 18 in Examples 1 to 5 may be a plane mirror.

In addition, the second reflecting mirror 19 that reflects the reflected image of the first reflecting mirror 18 may be configured by a convex mirror. In such a case, a larger reflected image can be visually recognized by the crew member m by using the concave mirror. At this time, it is preferable that the second reflecting mirror 19 is arranged in front of the crew member m seated on the driver's seat. Through this, the distortion of the image that is visually recognized by the crew member m can be decreased. Particularly when the eye-point moves to the forward/backward side due to a difference in a driver's physique, the distortion of the image can be reduced without changing the direction of the second reflecting mirror 19.

Furthermore, in each example described above, although the device 10 for visually confirming a forward direction is arranged on the dashboard 12 on the forward side of the driver's seat, the first reflecting mirror 18, the second reflecting mirror 19, the first opening 17, the second opening 21, and the like of the device 10 for visually confirming a forward direction may be arranged at the center of the vehicle width on the dashboard 12. In such a case, it is preferable that the second reflecting mirror 19 is configured by a concave mirror, and the mirror face thereof is inclined toward the driver's seat. Through such a configuration, a larger reflected image can be visually recognized by the crew member m by using the concave mirror.

In addition, in each example described above, although the first opening 17 and the second opening 21 are formed in the dashboard 12, and the first light transmitting part and the second light transmitting part are configured by them, it may be configured such that portions, through which light can be transmitted, are disposed by a transparent resin and the like on the dashboard 12, and the first light transmitting part and the second light transmitting part are configured by the portions.

Fourth Embodiment

Hereinafter, examples of a device for visually confirming a forward direction according to a fourth embodiment of the present invention will be described with reference to the drawings.

Example 1

First, the device for visually confirming a forward direction according to Example 1 of the present invention will be described with reference to FIGS. 1 to 30.

FIG. 1 is a schematic diagram of a vehicle 1 that uses a device 10 for visually confirming a forward direction according to Example 1, and FIGS. 2 to 6B are diagrams that illustrate specific configurations of the device 10 for visually confirming a forward direction. In the figures, arrow FR denotes a forward direction of the vehicle 1 and arrow UP denotes an upward direction of the vehicle 1.

The device 10 for visually confirming a forward direction is arranged on the forward side of a driver's seat located inside the vehicle such that a crew member m seated on the driver's seat can visually confirm the lower side and the left/right side of a front portion of the vehicle 1 with his line of sight facing forward.

In FIGS. 2 and 3, reference numeral 11 is a front window shield glass that is disposed so as to be forward sloped (sloped toward the lower side of the front portion) on the front side of the front seat of the vehicle 1, reference numeral 12 is a dashboard on which meters such as a speedometer and a tachometer are arranged on the front face side facing the driver's seat, and reference numeral 13 is a steering wheel that is arranged on the front side of the driver's seat.

The dashboard 12 includes a front part wall 14 that has meters arranged thereon and faces a crew member m seated on the front seat and an upper part wall 15 that extends approximately horizontally from the upper end portion of the front part wall 14 toward the lower edge of the window shield glass 11. In a portion of the upper part wall 15, which is located at the front position (the forward position of the front face of the steering wheel 13) of the driver's seat, a protruded part 16 is disposed. This protruded part 16 is formed in the shape of an approximate half cylinder extending along the forward/backward direction of the vehicle body. In addition, in a portion of the upper part wall 15, which is located on the vehicle forward side of the protruded part 16, a first opening 17 is arranged.

The front portion of the protruded part 16 is notched so as to form an approximate "U" shape that is convex to the forward side in the top view, and a first reflecting mirror 18 is attached to the curved notch end. The first reflecting mirror 18 is configured by a convex mirror that is curved in an approximate "U" shape in the vehicle width direction, and the mirror face is installed to the front part face of the protruded part 16 such that the mirror face faces the lower side of the front portion of the vehicle 1. This first reflecting mirror 18 is set such that a broad range in the lower side of the front portion and the left and right sides of the vehicle 1 is reflected through the front window shield glass 11. A lateral-side area that can be viewed by the device 10 for visually confirming a forward direction according to Example 1 is illustrated in FIG. 14. In addition, the first opening 17 located on the dashboard 12 is formed on the forward side of the first reflecting mirror 18 so as to have approximately the same width as that of the first reflecting mirror 18.

In addition, a second reflecting mirror 19, which reflects a reflected image that is imaged on the first reflecting mirror 18 toward the crew member m side, is installed to the lower side of the upper part wall 15 of the dashboard 12. The second reflecting mirror 19 is configured by a plane mirror and is arranged such that the mirror face faces the backward side of the vehicle 1 on the lower side of the front end portion side of the first opening 17. In the case of this Example 1, the second reflecting mirror 19 is attached to the rear face of the dashboard 12 through a bracket 20.

On the other hand, a face of the protruded part 16 that is located on the rear side of the vehicle is inclined to the upper side so as to confront the face of the crew member m seated on the driver's seat, and a second opening 21 that is horizontally long and has an approximate oval shape is formed at an approximate center of the above-described face. This second opening 21 is arranged in an area combining the second reflecting mirror 19 and the eye-point E of the crew member m so as to enable the crew member m to visually confirm the second reflecting mirror 19 that is located on the lower side of the upper part wall 15. In addition, the first opening 17 is arranged in an area that connects the first reflecting mirror 18 and the second reflecting mirror 19. Accordingly, a reflected image of the forward side of the vehicle 1 that is projected to the first reflecting mirror 18 can be visually confirmed by the crew member m through the second reflecting mirror 19 and the second opening 21.

In addition, the dimension, the shape, and the installation angle of the first reflecting mirror 18 and the dimension, the installation angle, and the like of the second reflecting mirror 19 are set such that the lower portion of the front window shield glass 11 and the front end portion of the dashboard 12 are reflected in the reflected image when the crew member m seated on the driver's seat views the reflected image of the first reflecting mirror 18 through the second reflecting mirror 19 and the second opening 21.

In addition, it is preferable that the second opening 21 has such a height so as to be hidden by the steering wheel 13 in the posture of the crew member at the time of normal driving as illustrated in FIG. 6A, and to be viewed from the upper portion of the steering wheel 13 at a time when the crew member m seated on the driver's seat stretches upward and looks into the second opening 21 in the forward direction, as illustrated in FIG. 6B.

In addition, transmission plates 22 and 23, which are formed from transparent resin or the like, are attached to the first opening portion 17 that is located on the forward side of the protruded part 16 and the second opening 21 that is located on the rear face side of the protruded part 16.

In this Example 1, a first transmission part is configured by the first opening 17 and the transmission plate 22, and a second transmission part is configured by the second opening 21 and the transmission plate 23.

Figure 29:
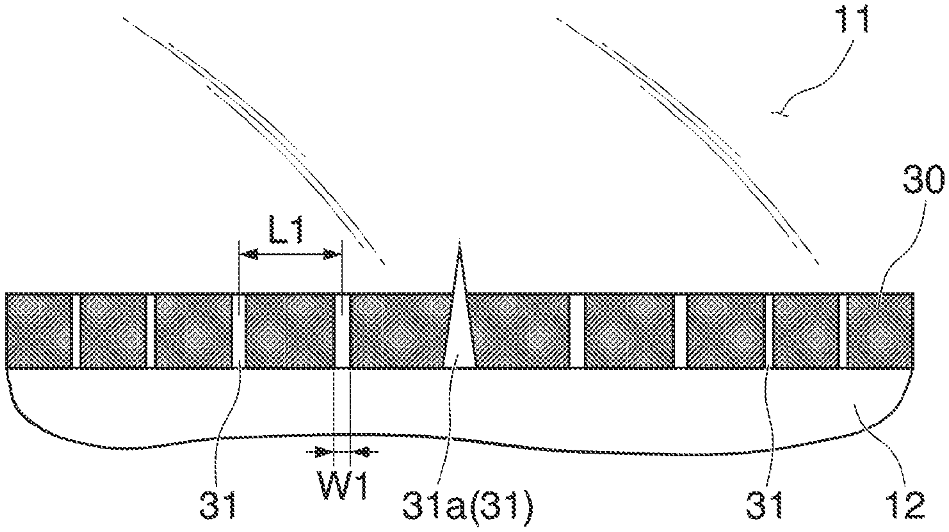
FIG. 29 is a diagram that illustrates position recognition display means of the device for visually confirming a forward direction according to Example 1 of the fourth embodiment of the present invention.

Furthermore, in this Example 1, as illustrated in FIG. 29, in a portion, which is formed along the lower edge of the front window shield glass 11, of a band-shaped black-printed portion 30 that is printed on the peripheral edge of the front window shield glass 11, a plurality of marks 31, which have a band shape, extending in the vertical direction is disposed. The marks 31 according to Example 1 are formed through overlapped printing or the like on black-printed part 30 and are colored in a color (for example, white) that can be easily recognized from the black color of the black-printed part 30.

Among these marks 31, only a mark 31*a* that is located right in front of the crew member m seated on the driver's seat has a sharp upper end, and marks of a same number are arranged to the left and right sides with the index 31*a* located at the center. A distance L1 between two marks 31 adjacent to each other is set so as to gradually decrease as they are located farther from the mark 31*a* located at the center in the horizontal direction, and the distance L1 between the marks 31 on the mirror image of the second reflecting mirror 19 and an actual distance are set so as to be in correspondence with each other. In addition, the width W1 of the mark 31 in the horizontal direction (vehicle width direction) is set so as to gradually decrease as it is located farther from the mark 31*a* located at the center in the horizontal direction.

In this example, the position recognition displaying means is configured by the marks 31 disposed in the black-printed part 30.

In the device 10 for visually confirming a forward direction, which is configured as above, according to Example 1, when the crew member m seated on the driver's seat looks into the second opening 21 disposed on the dashboard 12 with visually confirming the forward side of the vehicle, a reflected image of the vehicle forward side that is projected to the first reflecting mirror 18 is viewed through the second reflecting mirror 19.

Figure 30:
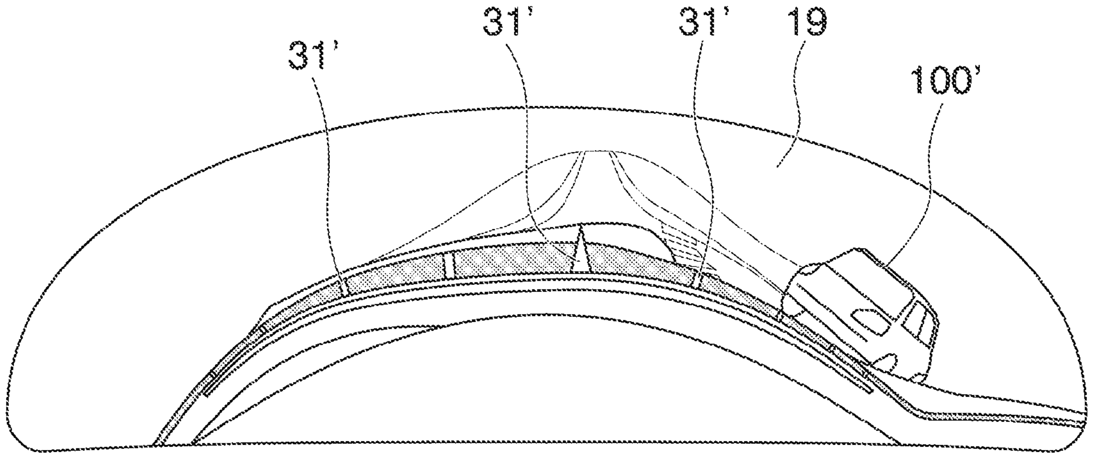
FIG. 30 is a diagram that illustrates a mirror image visually confirmed by a crew member through a second light transmitting unit of the device for visually confirming a forward direction according to Example 1 described above.

At this time, since the first reflecting mirror 18 is configured by a convex mirror that is curved from the center to the left and right sides in the widthwise direction, a reflected image that is reflected by the second reflecting mirror 19 and is viewed by the crew member m, as illustrated in FIG. 30, reflects a wide range of the lower side of the front portion and the left and right sides of the vehicle 1. Since the image viewed by the crew member m is an image that has been reflected twice by the first reflecting mirror 18 and the second reflecting mirror 19, the image is not horizontally reversed and allows the crew member m to confirm surrounding conditions without any sense of discomfort.

In addition, the reflected image of the first reflecting mirror 18 that is reflected by the second reflecting mirror 19 and is viewed by the crew member m reflects a wide range of the vehicle 1 in the horizontal direction, and, for example, as illustrated in FIG. 14, in a case where another vehicle 100 approaches the vehicle 1 from the right side at an intersection having an obstructed view, an image 100' of the another vehicle 100 is also reflected on the reflected image of the first reflecting mirror 18 as illustrated in FIG. 30, whereby the crew member m can confirm another vehicle 100 that is not directly viewable.

Furthermore, in the above-described reflected image, since the lower portion of the front window shield glass 11 is also reflected, on the road surface side of the reflected image of the first reflecting mirror 18 in the mirror image of the second reflecting mirror 19, the marks 31 disposed in the black-printed part 30 of the front window shield glass 11 are reflected in linear shapes in the vertical direction of the vehicle 1. Thus, the image 31' of this mark 31 becomes a position recognition mark that enables easy recognition of a relative position of another vehicle 100 with respect to the vehicle 1 (hereinafter, the image 31' will be referred to as a position recognition mark 31'). As a result, the relative position of another vehicle 100 can be recognized, and, accordingly, the proximity state of another vehicle 100 can be recognized.

In addition, since the position recognition mark 31' is arranged on the road surface side of the reflected image, the relative position of another vehicle 100 can be reliably recognized regardless of the vehicle height of another vehicle 100.

Furthermore, since the marks 31 are disposed on the black-printed part 30, the lengths of the position recognition marks 31' can be shortened, and the positions of the position recognition marks 31' are not deviated due to variations in the physique of the crew member and can be easily recognized.

Particularly, in Example 1, since the distance L1 between two marks 31 adjacent to each other is set so as to gradually decrease as they are located farther from the mark 31*a* located at the center in the horizontal direction, and the width W1 of the mark 31 in the horizontal direction (vehicle width direction) is set so as to gradually decrease as it is located farther from the mark 31*a* located at the center in the horizontal direction, the position recognition marks 31' reflected in the mirror image of the second reflecting mirror 19 are similarly formed, and accordingly, the depth perception of another vehicle 100 can be easily acquired by using the position recognition mark 31', and the proximity state of another vehicle 100 can be reliably recognized.

In this device 10 for visually confirming a forward direction, the first reflecting mirror 18 that reflects the lower side of the front portion and the left and right sides of the vehicle 1 is installed to the front face of the protruded part 16 located on the dashboard 12, the second reflecting mirror 19 that reflects the image imaged on the first reflecting mirror 18 to the crew member m side is arranged on the lower side of the dashboard 12, and the first opening 17 and the second opening 21 are disposed in the area that connects the first reflecting mirror 18 and the second reflecting mirror 19 that are located on the dashboard 12 and the area that connects the second reflecting mirror 19 and the eye-point E of the crew member m, whereby the first reflecting mirror 18 and the second reflecting mirror 19 are arranged at positions, which are sufficiently low, not disturbing the forward field of view of the crew member m. Accordingly, while a simple structure is employed in which expensive components such as imaging means and a motor are not used, high visibility can be secured.

Particularly, in the device 10 for visually confirming a forward direction, since the second reflecting mirror 19 is arranged on lower side of the dashboard 12, the first reflecting mirror 18 that directly reflects the forward side and the left and right sides of the vehicle 1 can be installed at a portion on the dashboard 12 that is sufficiently low. As a result, a blind spot positioned on the lateral side with respect to the traveling direction of the vehicle 1 can be easily reflected. In addition, a gap between the first reflecting mirror 18 disposed on the dashboard 12 and the second reflecting mirror 19 that is disposed on the lower side of the dashboard 12 can be set to be relatively small, and accordingly, the reflected image of the first reflecting mirror 19 can be reflected in the second reflecting mirror 18 to be large, whereby high visibility can be acquire. Particularly, even in a vehicle in which the forward inclination of the front window shield glass 11 is high, the first reflecting mirror 18 can be arranged near the front end portion of the inside of the vehicle, and accordingly, in a case where the left and right sides of the front portion of the vehicle 1 are reflected, the front pillar FP of the vehicle 1 does not disturb the reflected field of view, whereby high visibility in the horizontal direction can be acquired.

In addition, in the device 10 for visually confirming a forward direction, the protruded part 16 is disposed on the upper part wall 15 of the dashboard 12, and the second opening 21 is arranged on a face of the protruded part 16 that is located on the backward side of the vehicle, whereby the second opening 21 can be visually noticeable in an easy manner when the crew member m visually confirms a front direction with stretching upward. Accordingly, the visibility for the crew member can be improved.

In addition, in the case of this device 10 for visually confirming a forward direction, the second opening 21 is formed on a face of the protruded part 16 that forwardly faces the face of the crew member m, and accordingly, the visible range in which the second reflecting mirror 19 is visible can be sufficiently secured while the area of the second opening 21 is suppressed to be minimal.

In addition, in the device 10 for visually confirming a forward direction according to Example 1, since the first reflecting mirror 18 is arranged on the face of the protruded part 16, which is at a blind spot for the crew member m, that is located on the forward side of the vehicle, the first reflecting mirror 18 is not directly visible to the crew member m during driving. Accordingly, the field of view of the crew member m can be prevented from being disturbed by reflected light or the like, and the outer appearance is good.

In addition, in the case of the device 10 for visually confirming a forward direction, since the first opening 17 located on the dashboard 12 is arranged on the forward side of the protruded part 16, that is at a blind spot of the crew member m, it is advantageous to improve the outer appearance.

Furthermore, in the device 10 for visually confirming a forward direction according to this Example 1, since the first opening 17 and the second opening 21 that are located on the dashboard 12 are closed by the transmission plates 22 and 23, the penetration of dusts, water vapor, or the like into the inside of the dashboard 12 can be prevented. In addition, even in a case where the transmission plates 22 and 23 are attached to any one of the first opening 17 and the second opening 21, such an advantage can be acquired.

In addition, in the position recognition displaying means of the device 10 for visually confirming a forward direction according to this Example 1, although the distance L1 between two marks 31 adjacent to each other is set so as to gradually decrease as they are located farther from the mark 31*a* located at the center in the horizontal direction, all the marks 31 may be arranged with an even gap. In addition, in the position recognition displaying means according to this Example 1, although the width W1 of the mark 31 gradually decreases as it is located farther from the mark 31*a* located at the center in the horizontal direction, the widths W1 of all the marks 31 may be set to the same width dimension.

Example 2

Next, a device 10 for visually confirming a forward direction according to Example 2 of the present invention will be described with reference to FIGS. 31 and 32.

The difference between the device 10 for visually confirming a forward direction according to Example 2 and that according to Example 1 lies in the configuration of the position recognition displaying means, and the other configuration of Example 2 is the same as that of Example 1. Hereinafter, only the difference will be described.

Figure 31:
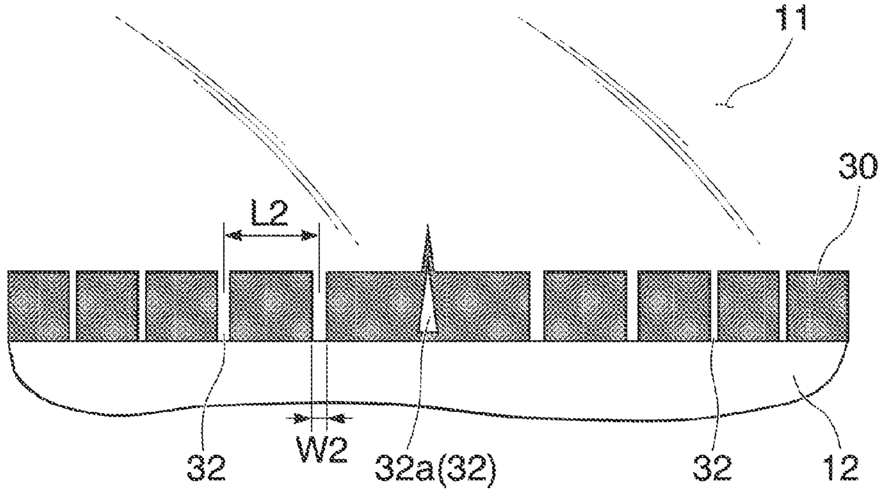
FIG. 31 is a diagram that illustrates position recognition display means of the device for visually confirming a forward direction according to Example 2 of the fourth embodiment of the present invention.

In Example 1, as the position recognition displaying means, while the marks 31 are formed so as to be overlapped on the black-printed part 30 that is disposed along the lower edge of the front window shield glass 11, in this Example 2, as illustrated in FIG. 31, a plurality of slit-shaped notches 32 is arranged when the black-printed part 30 is formed, and the position recognition displaying means is configured by the notches 32. In such a case, at the same time when the black-printed part 30 is printed on the front window shield glass, the position recognition displaying means can be formed, and, accordingly, an independent manufacturing process that is used only for forming the position recognition displaying means is not necessary.

In the position recognition displaying means of this Example 2, only the notch 32*a* that is located right in front of the crew member m seated on the driver's seat out of the notches 32 is formed in a hole having a triangle shape, and a part of the black-printed part 30 protrudes thereon in the triangle shape. The other notches 32 are formed in a linear shape having an open upper portion. The notches 32 of the same number are arranged to the left and left sides of the notch 32*a* as the center. A distance L2 between two notches 32 that are adjacent to each other is set so as to gradually decrease as they are located farther from the notch 32*a* located at the center in the horizontal direction, and the distance L2 between the notches 32 on the mirror image of the second reflecting mirror 19 is set so as to be in correspondence with the actual distance. In addition, the width W2 of the notch 32 in the horizontal direction (vehicle width direction) is set so as to gradually decrease as it is located farther from the notch 32*a* located at the center in the horizontal direction.

According to the position recognition displaying means of Example 2, the same operation and advantage as those of the position recognition displaying means according to Example 1 can be acquired.

Figure 32:
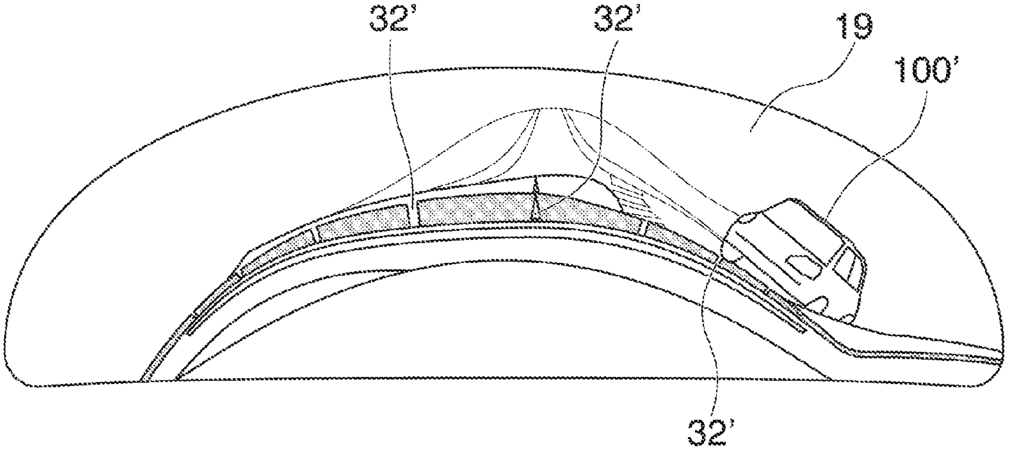
FIG. 32 is a diagram that illustrates a mirror image visually confirmed by a crew member through a second light transmitting unit of the device for visually confirming a forward direction according to Example 2 described above.

In other words, as illustrated in FIG. 32, on the road surface side (in other words, the road surface side of the reflection image of the first reflecting mirror 18 in the mirror image of the second reflecting mirror 19) of the reflected image of the first reflecting mirror 18 that is reflected by the second reflecting mirror 19 so as to be viewed by the crew member m, the notches 32 formed in the black-printed part 30 of the front window shield glass 11 are reflected in a linear shape in the direction perpendicular to the vehicle 1, and the image 32' of the notch 32 becomes a position recognition mark (hereinafter, the image 32 is referred to as a position recognition mark 32') used for easily recognizing the relative position of another vehicle 100 from the vehicle 1. As a result, the relative position of another vehicle 100 can be recognized, and, accordingly, the proximity state of another vehicle 100 can be recognized.

In addition, since the position recognition mark 32' is arranged on the road surface side of the reflected image, the relative position of another vehicle 100 can be reliably recognized regardless of the vehicle height of another vehicle 100.

Furthermore, since the notches 32 are disposed in the black-printed part 30, the lengths of the position recognition marks 32' can be shortened, and the positions of the position recognition marks 32' are not deviated due to variations in the physique of the crew member and can be easily recognized.

In addition, also in Example 2, since the distance L2 between two notches 32 adjacent to each other is set so as to gradually decrease as they are located farther from the notch 32*a* located at the center in the horizontal direction, and the width W2 of the notch 32 in the horizontal direction (vehicle width direction) is set so as to gradually decrease as it is located farther from the notch 32*a* located at the center in the horizontal direction, the position checking means 32' reflected in the mirror image of the second reflecting mirror 19 are similarly formed, and accordingly, the depth perception of another vehicle 100 can be easily acquired by the position recognition mark 32', and the proximity state of another vehicle 100 can be reliably recognized.

In addition, in the position recognition displaying means of Example 2, although the distance L2 between two notches 32 adjacent to each other is set so as to gradually decrease as they are located farther from the notch 32*a* located at the center in the horizontal direction, all the notches 32 may be arranged with an even gap. In addition, in the position recognition displaying means of Example 2, although the width W2 of the notch 32 gradually decreases as it is located farther from the notch 32*a* located at the center in the horizontal direction, the widths W2 of all the notches 32 may be set to the same width.

Example 3

Next, a device 10 for visually confirming a forward direction according to Example 3 of the present invention will be described with reference to FIG. 33.

In this Example 3, although not illustrated in the figure, the first opening 17 is disposed to be slightly separated from the lower edge of the front window shield glass 11 to the backward side of the vehicle, and a part of the upper part wall 15 of the dashboard 12 is present between the first opening 17 and the lower edge of the front window shield glass 11.

In this Example 3, on a face that is the upper face of the upper part wall 15 of the dashboard 12 and faces the front window shield glass 11, bar-shaped marks are disposed in linear shapes along the traveling direction of the vehicle, and position recognition displaying means is configured by the bar-shaped marks.

Similarly to the marks 31 of Example 1, a plurality of the bar-shaped marks is disposed, and only the bar-shaped mark that is located right in front of the crew member m seated on the driver's seat out of the bar-shaped marks is formed in a triangle shape, and bar-shaped marks of a same number are disposed to the left and right sides of the bar-shaped mark having the triangle shape as the center. In addition, a distance between two bar-shaped marks adjacent to each other is set so as to gradually decrease as they are located farther from the bar-shaped mark located at the center in the horizontal direction, and the distance between the bar-shaped marks on the mirror image of the second reflecting mirror 19 and the actual distance are set so as to be in correspondence with each other. In addition, the width of the bar-shape mark in the horizontal direction (vehicle width direction) is set so as to gradually decrease as it is located farther from the bar-shaped mark located at the center in the horizontal direction.

The other configuration is the same as that of the device 10 for visually confirming a forward direction according to Example 1, and thus the description thereof will not be presented here.

Figure 33:
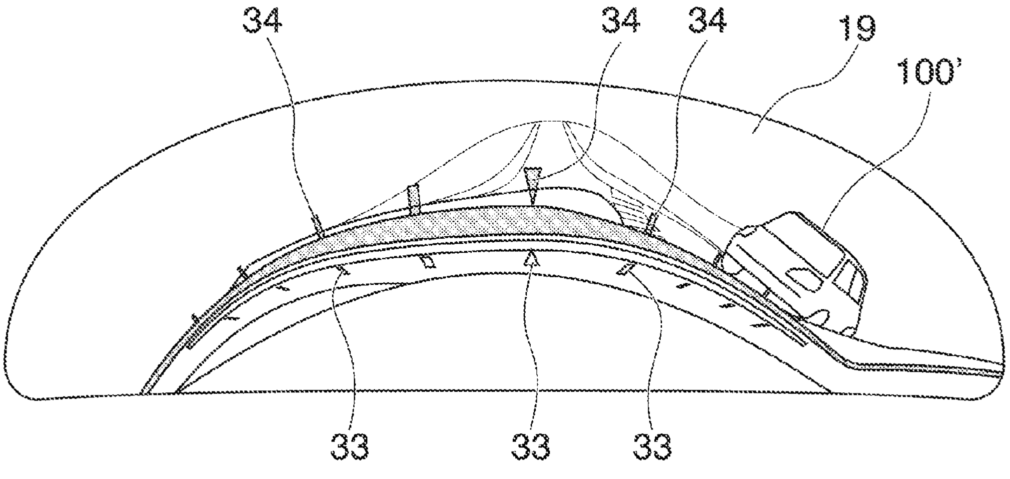
FIG. 33 is a diagram that illustrates a mirror image visually confirmed by a crew member through a second light transmitting unit of the device for visually confirming a forward direction according to Example 3 of the fourth embodiment of the present invention.

In the position recognition displaying means of this Example 3, the bar-shaped marks formed on the dashboard 12 are reflected in the front window shield glass 11, and are reflected in the first reflecting mirror 18 together with the bar-shaped marks disposed on the dashboard 12, and accordingly, as illustrated in FIG. 33, to the road surface side (in other words, the road surface side of the first reflecting mirror 18 in the mirror image of the second reflecting mirror 19) of the reflected image of the first reflecting mirror 18 that is reflected by the second reflecting mirror 19 so as to be viewed by the crew member m, the images 33 of the bar-shaped marks formed on the dashboard 12 and the images 34 of the bar-shaped marks reflected in the front window shield glass 11 are reflected. In addition, in a case where another vehicle 100 other than a vehicle that approaches from the left or right side of the vehicle 1 is present, the image 100' of this another vehicle 100 and the image 34 of the bar-shaped marks reflected in the front window shield glass 11 are viewed so as to overlap each other, and accordingly, the relative position of another vehicle 100 can be recognized more easily, whereby the proximity state can be reliably recognized.

In this Example 3, the position recognition mark is configured by the image 33 of the bar-shaped marks formed on the dashboard 12 and the image 34 of the bar-shaped marks reflected in the front window shield glass 11.

In addition, in the case of the position recognition displaying means of Example 3, since the images 33 and 34 as the position recognition marks are arranged on the road surface side of the reflected image of the first reflecting mirror 18, the relative position of another vehicle 100 can be reliably recognized regardless of the vehicle height of another vehicle 100 described above.

In addition, also in Example 3, since the distance between two bar-shaped marks adjacent to each other is set so as to gradually decrease as they are located farther from the bar-shaped mark located at the center in the horizontal direction, and the width of the bar-shaped mark in the horizontal direction (vehicle width direction) is set so as to gradually decrease as it is located farther from the bar-shaped mark located at the center in the horizontal direction, the images 33 and 34 as the position checking means that are reflected in the mirror image of the second reflecting mirror 19 are similarly formed, and the depth perception for another vehicle 100 can be easily recognized by the images 33 and 34 as the position recognition marks, and the proximity state of another vehicle 100 can be reliably recognized.

Furthermore, in the position recognition displaying means of Example 3, although the distance between two bar-shaped marks adjacent to each other is set so as to gradually decrease as they are located farther from the bar-shaped mark located at the center in the horizontal direction, all the bar-shaped marks may be arranged with an even gap. In addition, in the position recognition displaying means of Example 3, although the width of the bar-shaped mark gradually decreases as it is located farther from the bar-shaped mark located at the center in the horizontal direction, the widths of all the bar-shaped marks may be set to the same width.

Example 4

Next, a device 10 for visually confirming a forward direction according to Example 4 of the present invention will be described with reference to FIGS. 34 to 36.

Figure 34:
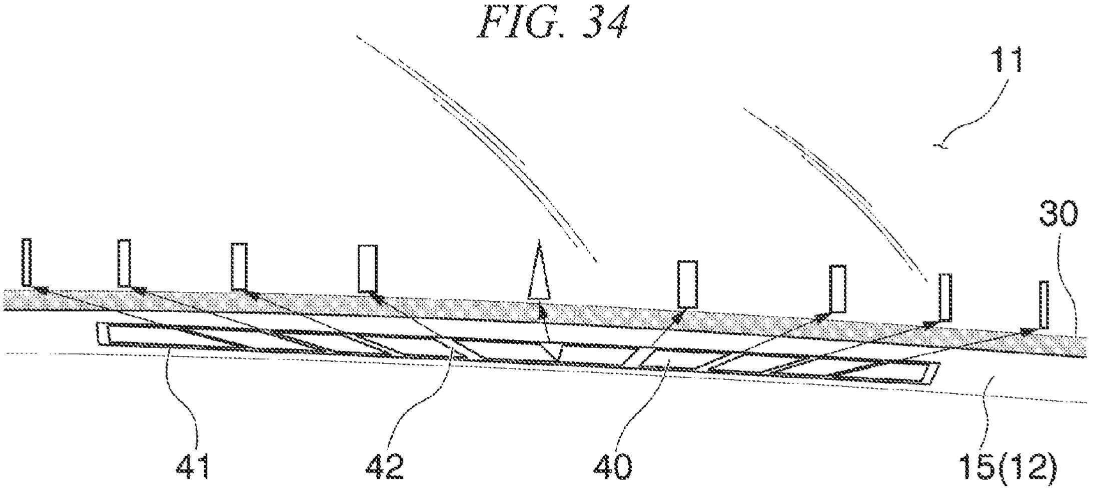
FIG. 34 is a perspective view of the periphery of an air outlet of a defroster of a vehicle that includes the device for visually confirming a forward direction according to Example 4 of the fourth embodiment of the present invention, viewed from the driver's seat side.
Figure 35:
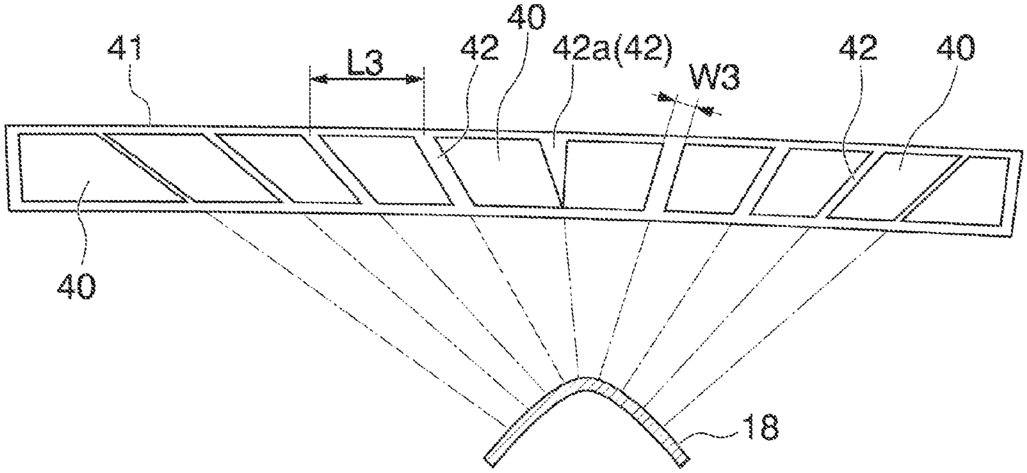
FIG. 35 is a plan view of the air outlet of the above-described defroster.

In this Example 4, the first opening 17 is disposed to be slightly separated from the lower edge of the front window shield glass 11 to the backward side of the vehicle, part of the upper part wall 15 of the dashboard 12 is present between the first opening 17 and the lower edge of the front window shield glass 11, and, as illustrated in FIG. 34, an outlet 40 of a defroster is open therein.

The defroster includes a blow frame (hereinafter, referred to as a frame) 41 that is fitted into the opening of the upper part wall 15, and a plurality of outlets 40 is open to the frame 41. The outlets 40 are partitioned by a plurality of bars 42 that are disposed in the frame 41. As illustrated in FIG. 35, the bars 42 are formed in a radial shape with the first reflecting mirror 18 as the center thereof, and only the bar **42*a* located right in front of the crew member m seated on the driver's seat out of the bars 42 is formed in a triangle shape that is sharped on the backward side of the vehicle, the other bars 42 are formed in a linear band shape and, and the bars of a same number are arranged to the right and left sides of the bar 42*a* having the triangle shape as the center. A distance L3 between two bars 42 adjacent to each other is set so as to gradually decrease as they are located farther from the bar 42*a* located at the center in the horizontal direction, and the distance L3 between the bars 42 on the mirror image of the second reflecting mirror 19 and an actual distance are set so as to be in correspondence with each other. In addition, the width of the bar 42 in the horizontal direction (vehicle width direction) is set so as to gradually decrease as it is located farther from the bar 42*a*** located at the center in the horizontal direction.

The other configuration is the same as that of the device 10 for visually confirming a forward direction according to Example 1, and thus the description thereof will not be presented here.

In this Example 4, the bars 42 of the frame 41 of the defroster serve as bar-shaped marks according to Example 3, and the position recognition displaying means is configured by the bars 42. Accordingly, in the case of Example 4, an independent manufacturing process that is used only for forming the position recognition displaying means is not necessary.

Figure 36:
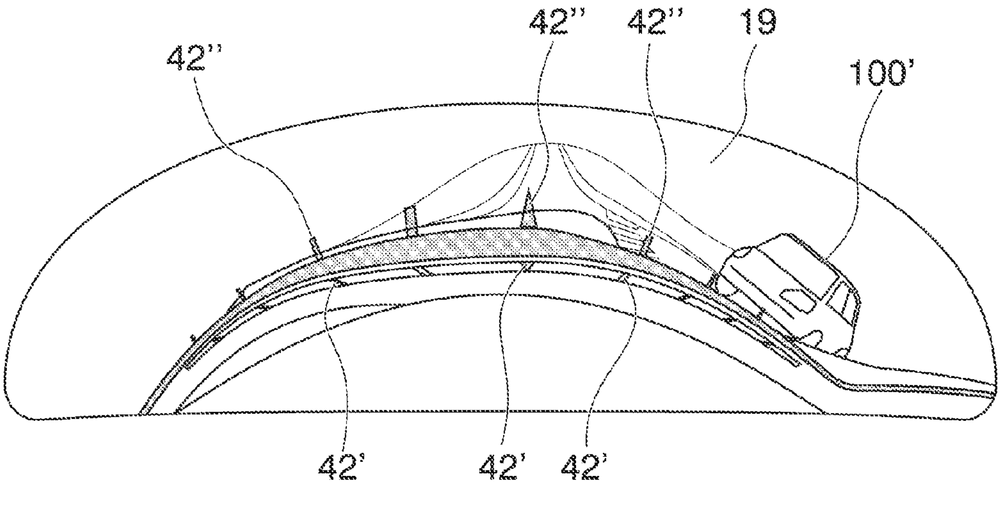
FIG. 36 is a diagram that illustrates a mirror image visually confirmed by a crew member through the second light transmitting unit of the device for visually confirming a forward direction according to Example 4 described above.

In the position recognition displaying means of this Example 4, the bars 42 of the frame 41 of the defroster that is disposed on the dashboard 12, as illustrated in FIG. 34, are reflected in the front window shield glass 11 and are reflected in the first reflecting mirror 18 together with the bars 42 of the actual frame 41, and accordingly, as illustrated in FIG. 36, to the road surface side (in other words, the road surface side of the first reflecting mirror 18 in the mirror image of the second reflecting mirror 19) of the reflected image of the first reflecting mirror 18 that is reflected by the second reflecting mirror 19 so as to be viewed by the crew member m, the image 42' of the bars 42 of the frame 41 of the defroster and the image 42" (the image 42" of the image 42' of the bars 42 of the frame 41 of the defroster that is reflected in the front window shield glass 11) of the bars reflected in the front window shield glass 11 are reflected. In addition, in a case where another vehicle 100 other than a vehicle that approaches from the left or right side of the vehicle 1 is present, the image 100' of this vehicle 100 and the image 42" of the bars reflected in the front window shield glass 11 are viewed so as to overlap each other, and accordingly, the relative position of the vehicle 100 can be recognized more easily, whereby the proximity state can be reliably recognized.

In this Example 4, the position recognition mark is configured by the image 42' of the bars 42 of the frame 41 of the defroster and the image 42" of the bars reflected in the front window shield glass 11.

In addition, in the case of the position recognition displaying means of Example 4, since the images 42' and 42" as the position recognition marks are arranged on the road surface side of the reflected image of the first reflecting mirror 18, the relative position of the vehicle 100 can be reliably recognized regardless of the vehicle height of the vehicle 100.

In addition, also in Example 4, since the distance L3 between two bars 42 adjacent to each other is set so as to gradually decrease as they are located farther from the bar 42*a* located at the center in the horizontal direction, and the width W3 of the bar 42 in the horizontal direction (vehicle width direction) is set so as to gradually decrease as it is located farther from the bar 42*a* located at the center in the horizontal direction, the images 42' and 42" as the position checking means that are reflected in the mirror image of the second reflecting mirror 19 are similarly formed, and the depth perception for the vehicle 100 can be easily recognized by the images 42' and 42" as the position recognition marks, and the proximity state of the vehicle 100 can be reliably recognized.

In addition, in the position recognition displaying means of Example 4, although the distance L3 between two bars 42 adjacent to each other is set so as to gradually decrease as they are located farther from the bar 42*a* located at the center in the horizontal direction, all the bars 42 may be arranged with an even gap. In addition, in the position recognition displaying means of Example 4, although the width W3 of the bar 42 gradually decreases as it is located farther from the bar 42*a* located at the center in the horizontal direction, the widths W3 of all the bars 42 may be set to the same width.

Furthermore, the present invention is not limited to the above-described examples.

For example, in each example described above, although the first reflecting mirror 18 is configured by the convex mirror, the first reflecting mirror 18 may be a plane mirror.

In addition, the second reflecting mirror 19 that reflects the reflected image of the first reflecting mirror 18 may be configured by a concave mirror. In such a case, a larger reflected image can be visually recognized by the crew member m by using the concave mirror. At this time, it is preferable that the second reflecting mirror 19 is arranged in front of the crew member m seated on the driver's seat. Through this, the distortion of the image that is visually recognized by the crew member m can be decreased. Particularly when the eye-point moves to the forward/backward side due to a difference in a driver's physique, the distortion of the image can be reduced without changing the direction of the second reflecting mirror 19.

Furthermore, in each example described above, although the device 10 for visually confirming a forward direction is arranged on the dashboard 12 on the forward side of the driver's seat, the first reflecting mirror 18, the second reflecting mirror 19, the first opening 17, the second opening 21, and the like of the device 10 for visually confirming a forward direction may be arranged at the center of the vehicle width on the dashboard 12. In such a case, it is preferable that the second reflecting mirror 19 is configured by a concave mirror, and the mirror face thereof is inclined toward the driver's seat. Through such a configuration, a larger reflected image can be visually recognized by the crew member m by using the concave mirror.

In addition, the installation place of the position recognition displaying means is not limited to the places of each example described above but may be disposed at any place as long as the position recognition mark is located on the road surface side of the reflected image of the first reflecting mirror 18 in the mirror image reflected in the second reflecting mirror 19. For example, the position recognition displaying means may be disposed between the first reflecting mirror 18 and the second reflecting mirror 19.

Fifth Embodiment

Hereinafter, examples of a device for visually confirming a forward direction according to a fifth embodiment of the present invention will be described with reference to the drawings.

Example 1

First, the device for visually confirming a forward direction according to Example 1 of the present invention will be described with reference to FIGS. 1 to 38.

FIG. 1 is a schematic diagram of a vehicle 1 that uses a device 10 for visually confirming a forward direction according to Example 1, and FIGS. 2 to 6B are diagrams that illustrate specific configurations of the device 10 for visually confirming a forward direction. In the figures, arrow FR denotes a forward direction of the vehicle 1 and arrow UP denotes an upward direction of the vehicle 1.

The device 10 for visually confirming a forward direction is arranged on the forward side of a driver's seat located inside the vehicle such that a crew member m seated on the driver's seat can visually confirm the lower side and the left/right side of a front portion of the vehicle 1 with his line of sight facing forward.

In FIGS. 2 and 3, reference numeral 11 is a front window shield glass that is disposed so as to be forward sloped (sloped toward the lower side of the front portion) on the front side of the front seat of the vehicle 1, reference numeral 12 is a dashboard on which meters such as a speedometer and a tachometer are arranged on the front face side facing the driver's seat, and reference numeral 13 is a steering wheel that is arranged on the front side of the driver's seat.

The dashboard 12 includes a front part wall 14 that has meters arranged thereon and faces a crew member m seated on the front seat and an upper part wall 15 that extends approximately horizontally from the upper end portion of the front part wall 14 toward the lower edge of the window shield glass 11. In a portion of the upper part wall 15, which is located at the front position (the forward position of the front face of the steering wheel 13) of the driver's seat, a protruded part 16 is disposed. This protruded part 16 is formed in the shape of an approximate half cylinder extending along the forward/backward direction of the vehicle body. In addition, in a portion of the upper part wall 15, which is located on the vehicle forward side of the protruded part 16, a first opening 17 is arranged.

The front portion of the protruded part 16 is notched so as to form an approximate "U" shape that is convex to the forward side in the top view, and a first reflecting mirror 18 is attached to the curved notch end. The first reflecting mirror 18 is configured by a convex mirror that is curved in an approximate "U" shape in the vehicle width direction, and the mirror face is installed to the front part face of the protruded part 16 such that the mirror face faces the lower side of the front portion of the vehicle 1. This first reflecting mirror 18 is set such that a broad range in the lower side of the front portion and the left and right sides of the vehicle 1 is reflected through the front window shield glass 11. A lateral-side area that can be viewed by the device 10 for visually confirming a forward direction according to Example 1 is illustrated in FIG. 14. In addition, the first opening 17 located on the dashboard 12 is formed on the forward side of the first reflecting mirror 18 so as to have approximately the same width as that of the first reflecting mirror 18.

In addition, a second reflecting mirror 19, which reflects a reflected image that is imaged on the first reflecting mirror 18 toward the crew member m side, is installed to the lower side of the upper part wall 15 of the dashboard 12. The second reflecting mirror 19 is configured by a plane mirror and is arranged such that the mirror face faces the backward side of the vehicle 1 on the lower side of the front end portion side of the first opening 17. In the case of this Example 1, the second reflecting mirror 19 is attached to the rear face of the dashboard 12 through a bracket 20.

On the other hand, a face of the protruded part 16 that is located on the rear side of the vehicle is inclined to the upper side so as to confront the face of the crew member m seated on the driver's seat, and a second opening 21 that is horizontally long and has an approximate oval shape is formed at an approximate center of the above-described face. This second opening 21 is arranged in an area combining the second reflecting mirror 19 and the eye-point E of the crew member so as to enable the crew member to visually confirm the second reflecting mirror 19 that is located on the lower side of the upper part wall 15. In addition, the first opening 17 is arranged in an area that connects the first reflecting mirror 18 and the second reflecting mirror 19. Accordingly, a reflected image of the forward side of the vehicle 1 that is projected to the first reflecting mirror 18 can be visually confirmed by the crew member m through the second reflecting mirror 19 and the second opening 21.

In addition, the dimension, the shape, and the installation angle of the first reflecting mirror 18 and the dimensions, the installation angle, and the like of the second reflecting mirror 19 are set such that the lower portion of the front window shield glass 11 and the front end portion of the dashboard 12 are reflected in the reflected image when the crew member m seated on the driver's seat views the reflected image of the first reflecting mirror 18 through the second reflecting mirror 19 and the second opening 21.

In addition, it is preferable that the second opening 21 has such a height so as to be hidden by the steering wheel 13 in the posture of the crew member at the time of normal driving as illustrated in FIG. 6A, and to be viewed from the upper portion of the steering wheel 13 at a time when the crew member m seated on the driver's seat stretches upward and looks into the second opening 21 in the forward direction, as illustrated in FIG. 6B.

In addition, transmission plates 22 and 23, which are formed from transparent resin or the like, are attached to the first opening portion 17 that is located on the forward side of the protruded part 16 and the second opening 21 that is located on the rear face side of the protruded part 16.

In this Example 1, a first transmission part is configured by the first opening 17 and the transmission plate 22, and a second transmission part is configured by the second opening 21 and the transmission plate 23.

Figure 37:
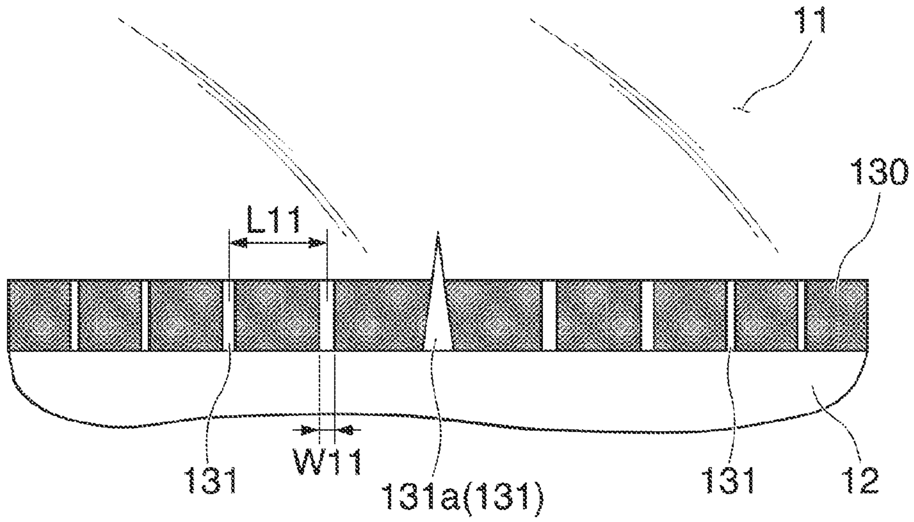
FIG. 37 is a diagram that illustrates an index as a base for position checking means of the device for visually confirming a forward direction according to Example 1 of a fifth embodiment of the present invention.

Furthermore, in this Example 1, as illustrated in FIG. 37, in a portion, which is formed along the lower edge of the front window shield glass 11, of a band-shaped black-printed portion 130 that is printed on the peripheral edge of the front window shield glass 11, a plurality of marks 131, which have a band shape, extending in the vertical direction is disposed. The marks 131 according to Example 1 are formed through overlapped printing or the like on black-printed part 130 and are colored in a color (for example, white) that can be easily recognized from the black color of the black-printed part 130.

Among these marks 131, only a mark 131*a* that is located right in front of the crew member m seated on the driver's seat has a sharp upper end, and marks of a same number are arranged to the left and right sides with the index 131*a* located at the center. A distance L11 between two marks 131 adjacent to each other is set so as to gradually decrease as they are located farther from the mark 131*a* located at the center in the horizontal direction, and the distance L11 between the marks 131 on the mirror image of the second reflecting mirror 19 and an actual distance are set so as to be in correspondence with each other. In addition, the width W11 of the mark 131 in the horizontal direction (vehicle width direction) is set so as to gradually decrease as it is located farther from the mark 131*a* located at the center in the horizontal direction.

In the device 10 for visually confirming a forward direction, which is configured as above, according to Example 1, when the crew member m seated on the driver's seat looks into the second opening 21 disposed on the dashboard 12 with visually confirming the forward side of the vehicle, a reflected image of the vehicle forward side that is projected to the first reflecting mirror 18 is viewed through the second reflecting mirror 19.

Figure 38:
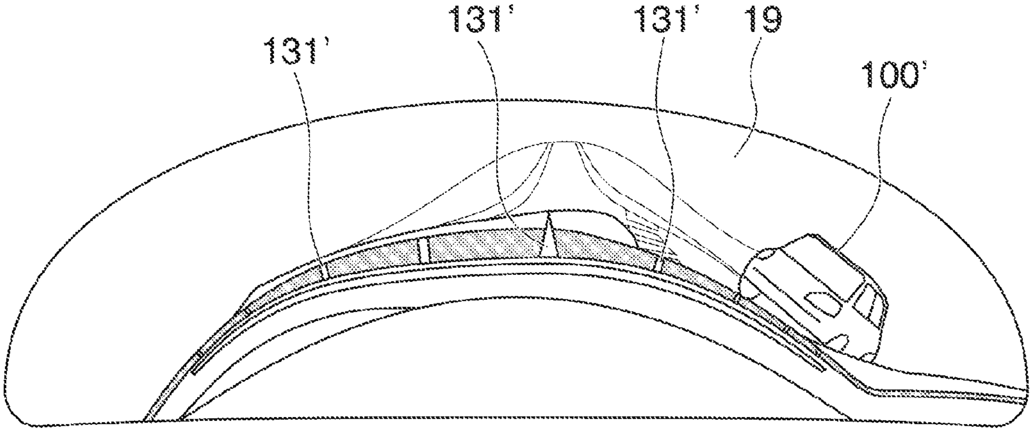
FIG. 38 is a diagram that illustrates a mirror image visually confirmed by a crew member through the second light transmitting unit of the device for visually confirming a forward direction according to Example 1 described above.

At this time, since the first reflecting mirror 18 is configured by a convex mirror that is curved from the center to the left and right sides in the widthwise direction, a reflected image that is reflected by the second reflecting mirror 19 and is viewed by the crew member m, as illustrated in FIG. 38, reflects a wide range of the lower side of the front portion and the left and right sides of the vehicle 1. Since the image viewed by the crew member m is an image that has been reflected twice by the first reflecting mirror 18 and the second reflecting mirror 19, the image is not horizontally reversed and allows the crew member m to confirm surrounding conditions without any sense of discomfort.

In addition, the reflected image of the first reflecting mirror 18 that is reflected by the second reflecting mirror 19 and is viewed by the crew member m reflects a wide range of the vehicle 1 in the horizontal direction, and, for example, as illustrated in FIG. 14, in a case where another vehicle 100 approaches the vehicle 1 from the right side at an intersection having an obstructed view, an image 100' of the another vehicle 100 is also reflected on the reflected image of the first reflecting mirror 18 as illustrated in FIG. 38, whereby the crew member m can confirm another vehicle 100 that is not directly viewable.

Furthermore, in the above-described reflected image, since the lower portion of the front window shield glass 11 is also reflected, on the road surface side of the reflected image of the first reflecting mirror 18 in the mirror image of the second reflecting mirror 19, the marks 131 disposed in the black-printed part 130 of the front window shield glass 11 are reflected in linear shapes in the vertical direction of the vehicle 1. Thus, the image 131' of this mark 131 becomes position checking means that enables easy recognition of the degree of proximity of another vehicle 100 with respect to the vehicle 1 (hereinafter, the image 131' will be referred to as a position checking means 131'). In Example 1, proximity checking means is configured by the position checking means 131'. In other words, the proximity checking means is formed by position checking means that is configured by a plurality of linear-shaped images 131', which are arranged to the left and right sides with respect to the traveling direction of the vehicle, disposed along the vertical direction of the vehicle.

Particularly, in Example 1, since the distance L11 between two marks 131 adjacent to each other is set so as to gradually decrease as they are located farther from the mark 131*a* located at the center in the horizontal direction, and the width W11 of the mark 131 in the horizontal direction (vehicle width direction) is set so as to gradually decrease as it is located farther from the mark 131*a* located at the center in the horizontal direction, the position checking means 131' reflected in the mirror image of the second reflecting mirror 19 is similarly formed, and accordingly, the degree of proximity of another vehicle 100 can be recognized more easily by the position checking means 131', whereby the degree of proximity can be reliably recognized.

Particularly, although the image 100' of another vehicle 100 that is located far from the vehicle 1 is positioned in the end portion of the mirror image of the second reflecting mirror 19 in the horizontal direction, and the size of the image is small, the width W11 of the position checking means 131' decreases from the center toward the left and right sides, and accordingly, the ratio of the width W11 of the position checking means 131' to the width of the image 100' of another vehicle 100 does not increase even in the end portion of the mirror image in the horizontal direction. Accordingly, compared to a case where all the widths W11 of the position checking means 131' are configured to be the same width, the degree of proximity of another vehicle 100 can be relatively easily recognized.

In addition, since the position checking means 131' is arranged on the road surface side of the reflected image of the first reflecting mirror 18, the degree of proximity can be reliably recognized regardless of the vehicle height of another vehicle 100.

Furthermore, since the marks 131 are disposed on the black-printed part 130, the lengths of the position checking means 131' can be shortened, and the positions of the position checking means 131' are not deviated due to variations in the physique of the crew member and can be easily recognized.

In this device 10 for visually confirming a forward direction, the first reflecting mirror 18 that reflects the lower side of the front portion and the left and right sides of the vehicle 1 is installed to the front face of the protruded part 16 located on the dashboard 12, the second reflecting mirror 19 that reflects the image imaged on the first reflecting mirror 18 to the crew member m side is arranged on the lower side of the dashboard 12, and the first opening 17 and the second opening 21 are disposed in the area that connects the first reflecting mirror 18 and the second reflecting mirror 19 that are located on the dashboard 12 and the area that connects the second reflecting mirror 19 and the eye-point E of the crew member m, whereby the first reflecting mirror 18 and the second reflecting mirror 19 are arranged at positions, which are sufficiently low, not disturbing the forward field of view of the crew member m. Accordingly, while a simple structure is employed in which expensive components such as imaging means and a motor are not used, high visibility can be secured.

Especially, in the device 10 for visually confirming a forward direction, since the second reflecting mirror 19 is arranged on lower side of the dashboard 12, the first reflecting mirror 18 that directly reflects the forward side and the left and right sides of the vehicle 1 can be installed at a portion on the dashboard 12 that is sufficiently low. As a result, a blind spot positioned on the lateral side with respect to the traveling direction of the vehicle 1 can be easily reflected. In addition, since a gap between the first reflecting mirror 18 disposed on the dashboard 12 and the second reflecting mirror 19 disposed under the dashboard 12 can be set to be relatively small, the reflected image of the first reflecting mirror 18 can be reflected on the second reflecting mirror 19 in an enlarged scale, whereby high visibility can be acquired. Particularly, even in a vehicle in which the forward inclination of the front window shield glass 11 is high, the first reflecting mirror 18 can be arranged near the front end portion of the inside of the vehicle, and accordingly, in a case where the left and right sides of the front portion of the vehicle 1 are reflected, the front pillar FP of the vehicle 1 does not disturb the reflected field of view, whereby high visibility in the horizontal direction can be acquired.

In addition, in the device 10 for visually confirming a forward direction, the protruded part 16 is disposed on the upper part wall 15 of the dashboard 12, and the second opening 21 is arranged on a face of the protruded part 16 that is located on the backward side of the vehicle, whereby the second opening 21 can be visually noticeable in an easy manner when the crew member m visually confirms a front direction with stretching upward.

Accordingly, the visibility for the crew member can be improved. In addition, in the case of this device 10 for visually confirming a forward direction, the second opening 21 is formed on a face of the protruded part 16 that forwardly faces the face of the crew member m, and accordingly, the visible range in which the second reflecting mirror 19 of the second opening 21 is visible can be sufficiently secured while the area of the second opening 21 is suppressed to be minimal.

In addition, in the device 10 for visually confirming a forward direction according to Example 1, since the first reflecting mirror 18 is arranged on the face of the protruded part 16, which is at a blind spot for the crew member m, that is located on the forward side of the vehicle, the first reflecting mirror 18 is not directly visible to the crew member m during driving.

Accordingly, the field of view of the crew member m can be prevented from being disturbed by reflected light or the like, and the outer appearance is good. In addition, in the case of the device 10 for visually confirming a forward direction, since the first opening 17 located on the dashboard 12 is arranged on the forward side of the protruded part 16, that is at a blind spot of the crew member m, it is advantageous to improve the outer appearance.

Furthermore, in the device 10 for visually confirming a forward direction according to this Example 1, since the first opening 17 and the second opening 21 that are located on the dashboard 12 are closed by the transmission plates 22 and 23, the penetration of dusts, water vapor, or the like into the inside of the dashboard 12 can be prevented. In addition, even in a case where the transmission plates 22 and 23 are attached to any one of the first opening 17 and the second opening 21, such an advantage can be acquired.

In addition, in the proximity checking means of the device 10 for visually confirming a forward direction according to this Example 1, although the distance L11 between two marks 131 adjacent to each other is configured to gradually decrease as they are located farther from the mark **131*a* located at the center in the horizontal direction, and the width W11 of the mark 131 is configured to gradually decrease as the mark is located farther from the mark 131*a*** located at the center in the horizontal direction, only one thereof may be employed so as to be configured.

In other words, it may be configured such that the widths W11 of all the marks 131 are set to the same width, and only the distance L11 between two marks 131 adjacent to each other gradually decreases as they are located farther from the mark **131*a* located at the center in the horizontal direction. Alternatively, it may be configured such that all the marks 131 are arranged with an even gap, and only the width W11 of the mark 131 gradually decreases as the mark is located farther from the mark 131*a* located at the center in the horizontal direction. Even in such a case, the degree of proximity of another vehicle 100** can be easily recognized.

Example 2

Next, a device 10 for visually confirming a forward direction according to Example 2 of the present invention will be described with reference to FIGS. 39 and 40.

The difference between the device 10 for visually confirming a forward direction according to Example 2 and that according to Example 1 lies in the marks that forms a base of the position checking means in the proximity checking means, and the other configuration of Example 2 is the same as that of Example 1.

Hereinafter, only the difference will be described.

Figure 39:
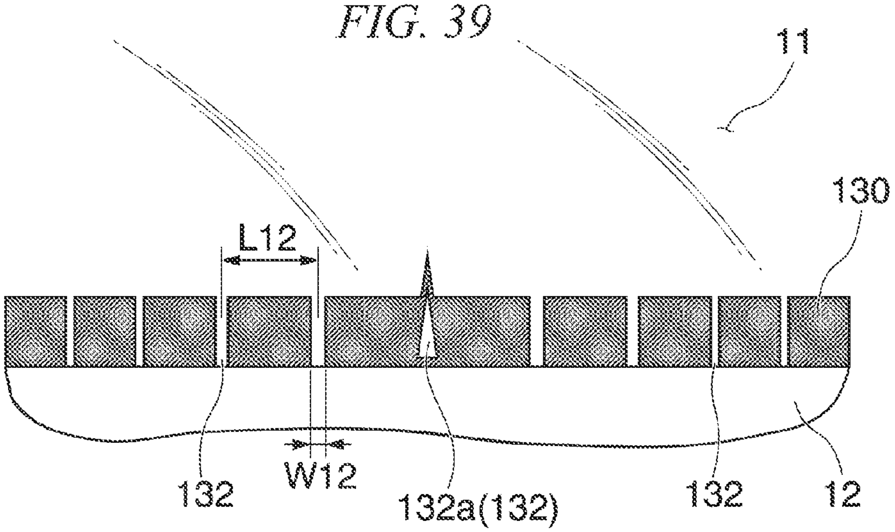
FIG. 39 is a diagram that illustrates an index as a base for position checking means of the device for visually confirming a forward direction according to Example 2 of the fifth embodiment of the present invention.

In Example 1, while the marks 131 are formed so as to be overlapped on the black-printed part 130 that is disposed along the lower edge of the front window shield glass 11, in this Example 2, as illustrated in FIG. 39, a plurality of slit-shaped notches 132 is arranged when the black-printed part 130 is formed, and the mark is configured by the notches 132. In such a case, at the same time when the black-printed part 130 is printed on the front window shield glass, the mark can be formed, and, accordingly, an independent manufacturing process that is used only for forming the mark is not necessary.

In this Example 2, only the notch 132*a* that is located right in front of the crew member m seated on the driver's seat out of the notches 132 is formed in a hole having a triangle shape, and part of the black-printed part 130 protrudes thereon in the triangle shape. The other notches 132 are formed in a linear shape having an open upper portion. The notches 132 of the same number are arranged to the left and left sides of the notch 132*a* as the center. A distance L12 between two notches 132 that are adjacent to each other is set so as to gradually decrease as they are located farther from the notch 132*a* located at the center in the horizontal direction, and the distance L12 between the notches 132 on the mirror image of the second reflecting mirror 19 is set so as to be in correspondence with the actual distance. In addition, the width W12 of the notch 132 in the horizontal direction (vehicle width direction) is set so as to gradually decrease as it is located farther from the notch 132*a* located at the center in the horizontal direction.

Figure 40:
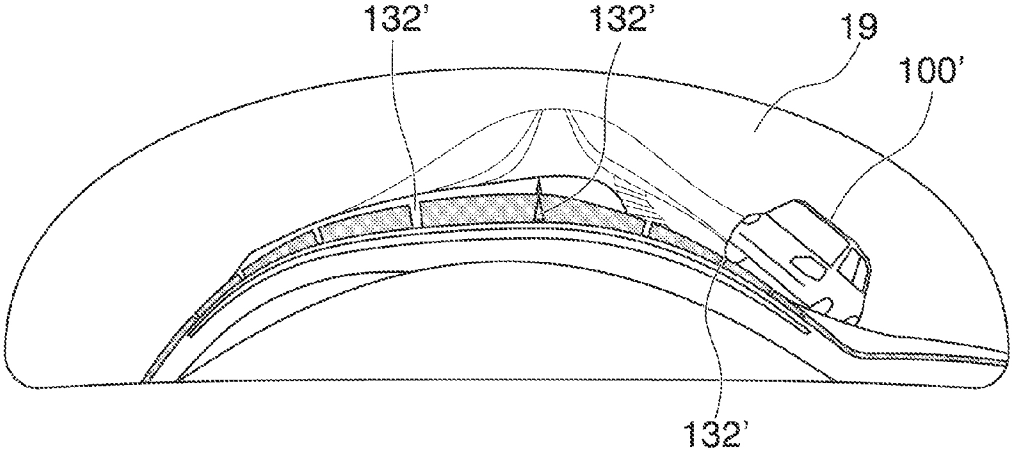
FIG. 40 is a diagram that illustrates a mirror image visually confirmed by a crew member through the second light transmitting unit of the device for visually confirming a forward direction according to Example 2 described above.

In this Example 2, as illustrated in FIG. 40, on the road surface side (in other words, the road surface side of the reflection image of the first reflecting mirror 18 in the mirror image of the second reflecting mirror 19) of the reflected image of the first reflecting mirror 18 that is reflected by the second reflecting mirror 19 so as to be viewed by the crew member m, the notches 132 formed in the black-printed part 130 of the front window shield glass 11 are reflected in a linear shape in the direction perpendicular to the vehicle 1, and the image 132' of the notch 132 becomes position checking means (hereinafter, the image 132' is referred to as position checking means 132') used for easily recognizing the degree of proximity of another vehicle 100 to the vehicle 1. In Example 2, the proximity checking means is configured by this position checking means 132'. In other words, the proximity checking means is formed by the position checking means that is configured by a plurality of linear-shaped images 132' that are disposed in the vertical direction of the vehicle and are arranged in the left and right sides with respect to the traveling direction of the vehicle.

In addition, according to the proximity checking means of Example 2, the same operation and advantages as those of the proximity checking means of Example 1 can be acquired.

In other words, in Example 2, since the distance L12 between two notches 132 adjacent to each other is set so as to gradually decrease as they are located farther from the notch 132*a* located at the center in the horizontal direction, and the width W12 of the notch 132 in the horizontal direction (vehicle width direction) is set so as to gradually decrease as it is located farther from the notch 132*a* located at the center in the horizontal direction, the position checking means 132' reflected in the mirror image of the second reflecting mirror 19 is similarly formed, and accordingly, the degree of proximity of another vehicle 100 can be easily acquired by the position checking means 132', and the degree of proximity of another vehicle 100 can be reliably recognized.

Particularly, although the image 100' of another vehicle 100 that is located far from the vehicle 1 is positioned in the end portion of the mirror image of the second reflecting mirror 19 in the horizontal direction, and the size of the image is small, the width W12 of the position checking means 132' decreases from the center toward the left and right sides, and accordingly, the ratio of the width W12 of the position checking means 132' to the width of the image 100' of another vehicle 100 does not increase even in the end portion of the mirror image in the horizontal direction. Accordingly, compared to a case where all the widths W12 of the position checking means 132' are configured to be the same width, the degree of proximity of another vehicle 100 can be relatively easily recognized.

In addition, since the position checking means 132' is arranged on the road surface side of the reflected image of the first reflecting mirror 18, the degree of proximity can be reliably recognized regardless of the vehicle height of another vehicle 100.

Furthermore, since the notches 132 are disposed in the black-printed part 130, the lengths of the position checking means 132' can be shortened, and the positions of the position checking means 132' are not deviated due to variations in the physique of the crew member and can be easily recognized.

In addition, in the proximity checking means of the device 10 for visually confirming a forward direction according to this Example 2, although the distance L12 between two notches 132 adjacent to each other is configured to gradually decrease as they are located farther from the notch 132*a* located at the center in the horizontal direction, and the width W12 of the notch 132 is configured to gradually decrease as the notch is located farther from the notch 132*a* located at the center in the horizontal direction, only one thereof may be employed so as to be configured.

In other words, it may be configured such that the widths W12 of all the notches 132 are set to the same width, and only the distance L12 between two notches 132 adjacent to each other gradually decreases as they are located farther from the notch 132*a* located at the center in the horizontal direction. Alternatively, it may be configured such that all the notches 132 are arranged with an even gap, and only the width W12 of the notch 132 gradually decreases as the notch is located farther from the notch 132*a* located at the center in the horizontal direction. Even in such a case, the degree of proximity of another vehicle 100 can be easily recognized.

Example 3

Next, a device 10 for visually confirming a forward direction according to Example 3 of the present invention will be described with reference to FIG. 41.

In this Example 3, although not illustrated in the figure, the first opening 17 is disposed to be slightly separated from the lower edge of the front window shield glass 11 to the backward side of the vehicle, and part of the upper part wall 15 of the dashboard 12 is present between the first opening 17 and the lower edge of the front window shield glass 11.

In this Example 3, on a face that is the upper face of the upper part wall 15 of the dashboard 12 and faces the front window shield glass 11, bar-shaped marks are disposed in linear shapes along the traveling direction of the vehicle.

Similarly to the marks 131 of Example 1, a plurality of the bar-shaped marks is disposed. Only the bar-shaped mark that is located right in front of the crew member m seated on the driver's seat out of the bar-shaped marks is formed in a triangle shape, and bar-shaped marks of a same number are disposed to the left and right sides of the bar-shaped mark having the triangle shape as the center. In addition, a distance between two bar-shaped marks adjacent to each other is set so as to gradually decrease as they are located farther from the bar-shaped mark located at the center in the horizontal direction, and the distance between the bar-shaped marks on the mirror image of the second reflecting mirror 19 and the actual distance are set so as to be in correspondence with each other. In addition, the width of the bar-shape mark in the horizontal direction (vehicle width direction) is set so as to gradually decrease as it is located farther from the bar-shaped mark located at the center in the horizontal direction.

The other configuration is the same as that of the device 10 for visually confirming a forward direction according to Example 1, and thus the description thereof will not be presented here.

Figure 41:
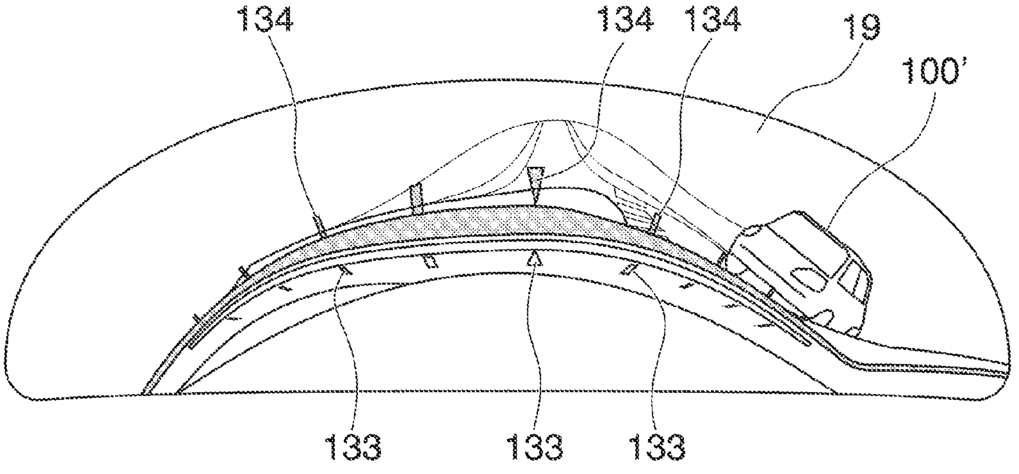
FIG. 41 is a diagram that illustrates a mirror image visually confirmed by a crew member through the second light transmitting unit of the device for visually confirming a forward direction according to Example 3 of the fifth embodiment of the present invention.

In this Example 3, the bar-shaped marks formed on the dashboard 12 are reflected in the front window shield glass 11, and are reflected in the first reflecting mirror 18 together with the bar-shaped marks disposed on the dashboard 12, and accordingly, as illustrated in FIG. 41, to the road surface side (in other words, the road surface side of the first reflecting mirror 18 in the mirror image of the second reflecting mirror 19) of the reflected image of the first reflecting mirror 18 that is reflected by the second reflecting mirror 19 so as to be viewed by the crew member m, the images 133 of the bar-shaped marks formed on the dashboard 12 and the images 134 of the bar-shaped marks reflected in the front window shield glass 11 are reflected.

In this Example 3, the images 133 of the bar-shaped marks that are formed on the dashboard 12 and the images 134 of the bar-shaped marks that are reflected in the front window shield glass 11 become the position checking means that enables easy recognition of the degree of approach of the vehicle 100 to the vehicle 1, and, in Example 3, the proximity checking means is configured by this position checking means. In other words, the proximity checking means is configured by position checking means that is configured by a plurality of linear-shaped images 133 and 134, which are disposed in the vertical direction of the vehicle, arranged to the left and right sides with respect to the traveling direction of the vehicle.

In addition, according to the proximity checking means of Example 3, the same operation and advantages as those of the proximity checking means of Example 1 can be acquired.

In other words, in Example 3, since the distance between two bar-shaped marks adjacent to each other is set so as to gradually decrease as they are located farther from the bar-shaped mark located at the center in the horizontal direction, and the width of the bar-shaped mark in the horizontal direction (vehicle width direction) is set so as to gradually decrease as it is located farther from the bar-shaped mark located at the center in the horizontal direction, the images 133 and 134 as the position checking means reflected in the mirror image of the second reflecting mirror 19 are similarly formed, and accordingly, the degree of proximity of another vehicle 100 can be easily acquired by the images 133 and 134 as the position checking means, and the degree of proximity can be reliably recognized.

In addition, in a case where another vehicle 100 other than a vehicle that approaches from the left or right side of the vehicle 1 is present, the image 100' of this another vehicle 100 and the image 134 of the bar-shaped marks reflected in the front window shield glass 11 are viewed so as to overlap each other, whereby the degree of approach of another vehicle 100 to the vehicle 1 can be easily recognized.

Particularly, although the image 100' of another vehicle 100 that is located far from the vehicle 1 is positioned in the end portion of the mirror image of the second reflecting mirror 19 in the horizontal direction, and the size of the image is small, the widths of the images 133 and 134 as the position checking means decrease from the center toward the left and right sides, and accordingly, the ratio of the widths of the images 133 and 134 as the position checking means to the width of the image 100' of the vehicle 100 does not increase even in the end portion of the mirror image in the horizontal direction. Accordingly, compared to a case where all the widths W12 of the images 133 and 134 as the position checking means are configured to be the same width, the visibility for the image is improved, and the degree of proximity of the vehicle 100 can be easily recognized.

In addition, also in the case of the proximity checking means of Example 3, the images 133 and 134 as the position checking means are arranged on the road surface side of the reflected image of the first reflecting mirror 18, and accordingly, the degree of proximity of another vehicle 100 can be reliably recognized regardless of the vehicle height of another vehicle 100 described above.

In addition, in the proximity checking means of the device 10 for visually confirming a forward direction according to Example 3, although the distance between two bar-shaped marks adjacent to each other is configured to gradually decrease as they are located farther from the bar-shaped mark located at the center in the horizontal direction, and the width of the bar-shaped mark is configured to gradually decrease as the bar-shaped mark is located farther from the bar-shaped mark located at the center in the horizontal direction, only one thereof may be employed so as to be configured.

In other words, it may be configured such that the widths of all the bar-shaped marks are set to the same width, and only the distance between two bar-shaped marks adjacent to each other gradually decreases as they are located farther from the bar-shaped mark located at the center in the horizontal direction. Alternatively, it may be configured such that all the bar-shaped marks are arranged with an even gap and only the width of the bar-shaped mark gradually decreases as the bar-shaped mark is located farther from the bar-shaped mark located at the center in the horizontal direction. Even in such a case, the degree of proximity of the vehicle 100 can be easily recognized.

Example 4

Next, a device 10 for visually confirming a forward direction according to Example 4 of the present invention will be described with reference to FIGS. 42 to 44.

Figure 42:
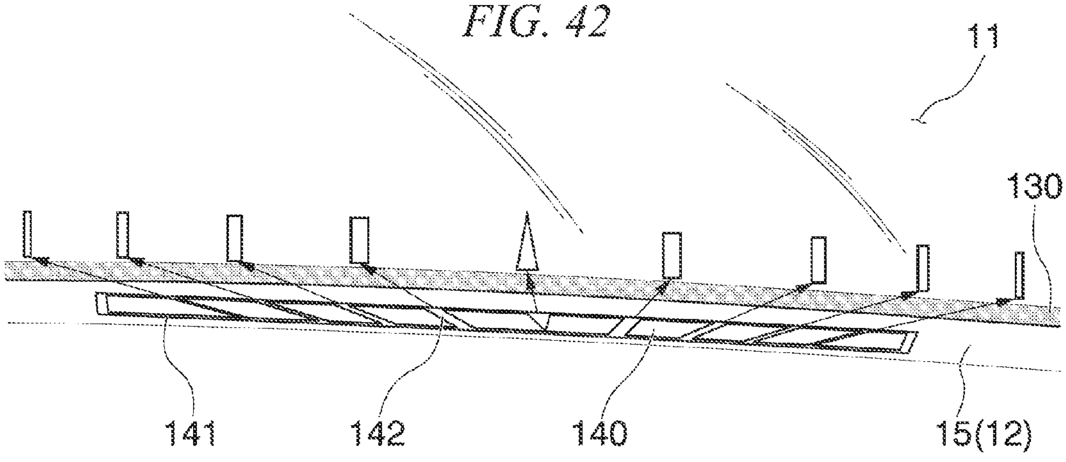
FIG. 42 is a perspective view of the periphery of an air outlet of a defroster of a vehicle that includes the device for visually confirming a forward direction according to Example 4 of the fifth embodiment of the present invention, viewed from the driver's seat side.
Figure 43:
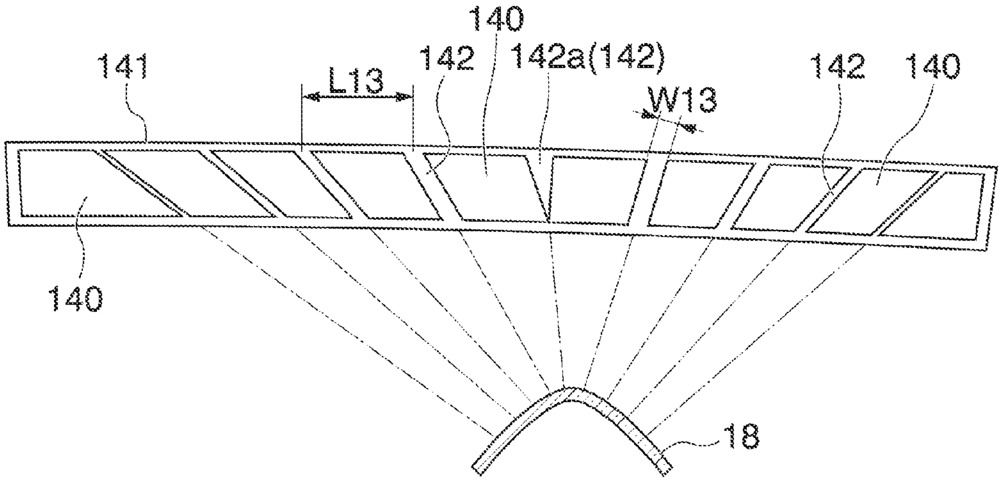
FIG. 43 is a plan view of the air outlet of the above-described defroster.

In this Example 4, the first opening 17 is disposed to be slightly separated from the lower edge 11 of the front window shield glass 11 to the backward side of the vehicle, a part of the upper part wall 15 of the dashboard 12 is present between the first opening 17 and the lower edge of the front window shield glass 11, and, as illustrated in FIG. 42, an outlet 140 of a defroster is open therein.

The defroster includes a blow frame (hereinafter, referred to as a frame) 141 that is fitted into the opening of the upper part wall 15, and a plurality of outlets 140 is open to his frame 141. The outlets 140 are partitioned by a plurality of bars 142 that are disposed in the frame 141. As illustrated in FIG. 43, the bars 142 are formed in a radial shape with the first reflecting mirror 18 as the center thereof, and only the bar **142*a*** located right in front of the crew member m seated on the driver's seat is formed in a triangle shape that is sharped on the backward side of the vehicle out of the bars 142, the other bars 142 are formed in a linear band shape and, and the bars of a same number are arranged to the right and left sides of the bar 142*a* having the triangle shape as the center. A distance L13 between two bars 142 adjacent to each other is set so as to gradually decrease as they are located farther from the bar 142*a* located at the center in the horizontal direction, and the distance L13 between the bars 142 on the mirror image of the second reflecting mirror 19 and an actual distance are set so as to be in correspondence with each other. In addition, the width W of the bar 142 in the horizontal direction (vehicle width direction) is set so as to gradually decrease as it is located farther from the bar 142*a* located at the center in the horizontal direction.

The other configuration is the same as that of the device 10 for visually confirming a forward direction according to Example 1, and thus the description thereof will not be presented here.

In this Example 4, the bars 142 of the frame 141 of the defroster serve as bar-shaped marks according to Example 3. Accordingly, in the case of Example 4, an independent manufacturing process that is used only for forming the bar-shaped marks is not necessary.

Figure 44:
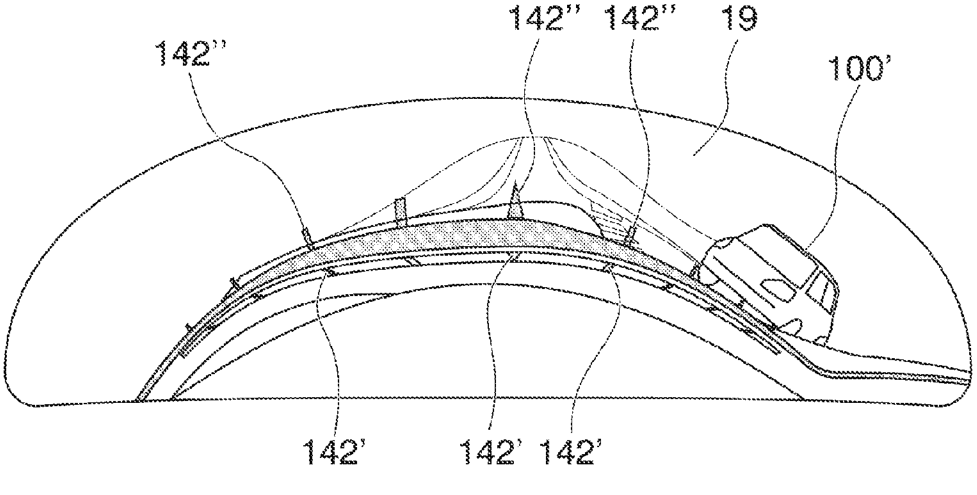
FIG. 44 is a diagram that illustrates a mirror image visually confirmed by a crew member through the second light transmitting unit of the device for visually confirming a forward direction according to Example 4 described above.

In this Example 4, the bars 142 of the frame 141 of the defroster that is disposed on the dashboard 12, as illustrated in FIG. 42, are reflected in the front window shield glass 11 and are reflected in the first reflecting mirror 18 together with the bars 142 of the actual frame 141, and accordingly, as illustrated in FIG. 44, to the road surface side (in other words, the road surface side of the first reflecting mirror 18 in the mirror image of the second reflecting mirror 19) of the reflected image of the first reflecting mirror 18 that is reflected by the second reflecting mirror 19 so as to be viewed by the crew member m, the image 142' of the bars 142 of the frame 141 of the defroster and the image 142" (the image 142" of the image 142' of the bars 142 of the frame 141 of the defroster that is reflected in the front window shield glass 11) of the bars reflected in the front window shield glass 11 are reflected.

In this Example 4, the image 142' of the bars 142 of the frame 141 of the defroster and the image 142" of the bars that is reflected in the front window shield glass 11 become position checking means that enables easy checking of the degree of approach of the vehicle 100 to the vehicle 1, and in Example 4, the proximity checking means is configured by this position checking means. In other words, the proximity checking means is configured by the position checking means that is configured by a plurality of linear-shaped images 142', which are disposed in the vertical direction of the vehicle, arranged to the left and right sides with respect to the traveling direction of the vehicle.

In addition, according to the proximity checking means of Example 4, the same operation and advantages as those of the proximity checking means of Example 1 can be acquired.

In other words, in Example 4, since the distance L13 between two bars 142 adjacent to each other is set so as to gradually decrease as they are located farther from the bar 142*a* located at the center in the horizontal direction, and the width W13 of the bar 142 in the horizontal direction (vehicle width direction) is set so as to gradually decrease as it is located farther from the bar 142*a* located at the center in the horizontal direction, the images 142' and 142" as the position checking means reflected in the mirror image of the second reflecting mirror 19 are similarly formed, and accordingly, the degree of proximity of another vehicle 100 can be easily acquired by the images 142' and 142" as the position checking means, and the degree of proximity of another vehicle 100 can be reliably recognized.

In addition, in a case where another vehicle 100 other than a vehicle that approaches from the left or right side of the vehicle 1 is present, the image 100' of this another vehicle 100 and the image 142" of the bars reflected in the front window shield glass 11 are viewed so as to overlap each other, whereby the degree of approach of another vehicle 100 to the vehicle 1 can be easily recognized.

Particularly, although the image 100' of another vehicle 100 that is located far from the vehicle 1 is positioned in the end portion of the mirror image of the second reflecting mirror 19 in the horizontal direction, and the size of the image is small, the width of the images 142' and 142" as the position checking means decreases from the center toward the left and right sides, and accordingly, the ratio of the widths of the images 142' and 142" as the position checking means to the width of the image 100' of the vehicle 100 does not increase even in the end portion of the mirror image in the horizontal direction. Accordingly, compared to a case where all the widths W13 of the images 142' and 142" as the position checking means are configured to be the same width, the visibility for the image is improved, and the degree of proximity of another vehicle 100 can be relatively easily recognized.

In addition, also in the case of the proximity checking means of Example 4, since the images 142' and 142" as the position checking means are arranged on the road surface side of the reflected image of the first reflecting mirror 18, the degree of proximity of the vehicle 100 can be reliably recognized regardless of the vehicle height of the vehicle 100.

In addition, in the proximity checking means of the device 10 for visually confirming a forward direction according to Example 4, although the distance L13 between two bars 142 adjacent to each other is configured to gradually decrease as they are located farther from the bar 142*a* located at the center in the horizontal direction, and the width W13 of the bar 142 is configured to gradually decrease as the bar is located farther from the bar 142*a* located at the center in the horizontal direction, only one thereof may be employed so as to be configured.

In other words, the width W13 of all the bars 142 are set to be the same, and it may be configured such that only the distance L13 between two bars 142 adjacent to each other gradually decreases as they are located farther from the bar 142*a* located at the center in the horizontal direction. Alternatively, it may be configured such that all the bars 142 are arranged with an even gap, and only the width W13 of the bar 142 gradually decreases as the bar is located farther from the bar 142*a* located at the center in the horizontal direction. Even in such a case, the degree of proximity of the vehicle 100 can be easily recognized.

Furthermore, the present invention is not limited to the above-described examples.

For example, in each example described above, although the first reflecting mirror 18 is configured by the convex mirror, the first reflecting mirror 18 may be a plane mirror.

In addition, the second reflecting mirror 19 that reflects the reflected image of the first reflecting mirror 18 may be configured by a concave mirror. In such a case, a larger reflected image can be visually recognized by the crew member m by using the concave mirror. At this time, it is preferable that the second reflecting mirror 19 is arranged in front of the crew member m seated on the driver's seat. Through this, the distortion of the image that is visually recognized by the crew member m can be decreased. Particularly when the eye-point moves to the forward/backward side due to a difference in a driver's physique, the distortion of the image can be reduced without changing the direction of the second reflecting mirror 19.

Furthermore, in each example described above, although the device 10 for visually confirming a forward direction is arranged on the dashboard 12 on the forward side of the driver's seat, the first reflecting mirror 18, the second reflecting mirror 19, the first opening 17, the second opening 21, and the like of the device 10 for visually confirming a forward direction may be arranged at the center of the vehicle width on the dashboard 12. In such a case, it is preferable that the second reflecting mirror 19 is configured by a concave mirror, and the mirror face thereof is inclined toward the driver's seat. Through such a configuration, a larger reflected image can be visually recognized by the crew member m by using the concave mirror.

In addition, the installation place of the marks that form a base of the position checking means is not limited to the places of each example described above but may be disposed at any place as long as the position checking mark is located on the road surface side of the reflected image of the first reflecting mirror 18 in the mirror image reflected in the second reflecting mirror 19. For example, the marks as the base of the position checking means may be disposed between the first reflecting mirror 18 and the second reflecting mirror 19.

INDUSTRIAL APPLICABILITY

According to an embodiment of the present invention, a device for visually confirming a forward direction that can improve the visibility without incurring an increase in the product cost can be provided.

In addition, according to an embodiment of the present invention, a device for visually confirming a forward direction that can suppress a decrease in the visibility due to external light can be provided.

Furthermore, according to an embodiment of the present invention, a device for visually confirming a forward direction that can easily recognize the degree of proximity of an object (for example, another vehicle) that is located on the lateral side with respect to the traveling direction of the vehicle can be provided.

REFERENCE SIGNS LIST

1 vehicle
10 device for visually confirming forward direction
11 front window shield glass
12 dashboard
16 protruded part
17 first opening (first light transmitting part)
18 first reflecting mirror
19 second reflecting mirror
21 second opening (second light transmitting part)
22 and 23 transmission plate
30 black-printed part
31 mark (position recognition displaying means)
31' image (position recognition mark)
32 notch (position recognition displaying means)
32' image (position recognition mark)
33 and 34 image (position recognition mark)
40 outlet of defroster
42 bar (bar-shaped mark; position recognition displaying means)
42' and 42" image (position recognition mark)
50 gradation film (transmission suppressing part)
52 gradation film (second transmission suppressing part)
130 black-printed part
131 mark
131' image (position checking means; proximity checking means)
132 notch (mark)
132' image (position checking means; proximity checking means)
133 and 134 image (position checking means; proximity checking means)
140 outlet of defroster
142 bar (bar-shaped mark)
142' and 142" image (position checking means; proximity checking means)

The invention claimed is:

1. A device for visually confirming a forward direction that allows a crew member to visually confirm a desired range on a forward side including forward right and left sides of a vehicle, the device comprising:

a first reflecting mirror that reflects the desired range; and a second reflecting mirror that reflects a reflected image reflected on the first reflecting mirror toward the crew member, wherein the first reflecting mirror is arranged on a dashboard that is located inside the vehicle, and the second reflecting mirror is arranged on a lower side of the dashboard and below the first reflecting mirror, wherein a first light transmitting part and a second light transmitting part are disposed in an area that connects the first reflecting mirror and the second reflecting mirror and an area that connects the second reflecting mirror and an eye-point of the crew member, wherein a protruded part that protrudes to the inside of the vehicle is disposed on the dashboard, and wherein the first reflecting mirror is disposed on a face of the protruded part that is located on the forward side of the vehicle.

2. The device for visually confirming a forward direction according to claim 1, wherein the second light transmitting part is formed on a face of the protruded part that is located on a backward side of the vehicle.

3. The device for visually confirming a forward direction according to claim 1, wherein the first light transmitting part is disposed in the protruded part on the forward side of the vehicle.

4. The device for visually confirming a forward direction according to claim 1, wherein one of the first light transmitting part and the second light transmitting part is an opening that is disposed on the dashboard.

5. The device for visually confirming a forward direction according to claim 4, wherein the opening is closed by a transmission plate through which light is transmitted.

6. The device for visually confirming a forward direction according to claim 1, wherein at least a cross-section of the first reflecting mirror along a vehicle width direction is formed as a curved face having convex curvature that is convex to the forward side of the vehicle.

7. The device for visually confirming a forward direction according to claim 6, wherein, in a reflecting face of the first reflecting mirror, an end portion side in the vehicle width direction is formed so as to be further inclined toward a lower side of a front portion than a center side in the vehicle width direction.

8. The device for visually confirming a forward direction according to claim 7, wherein the reflecting face of the first reflecting mirror is formed such that an angle of inclination toward the lower side of the front portion gradually increases from the center toward the end portion in the vehicle width direction.

9. The device for visually confirming a forward direction according to claim 6, wherein a reflecting face of the first reflecting mirror is formed such that a radius of convex curvature of an end portion side in the vehicle width direction is larger than a radius of convex curvature of a center side in the vehicle width direction.

10. The device for visually confirming a forward direction according to claim 9, wherein the reflecting face of the first reflecting mirror is formed such that a radius of convex curvature of the cross-section along the vehicle width direction gradually increases from the center side to the end portion side in the vehicle width direction.

11. The device for visually confirming a forward direction according to claim 9, wherein the reflecting face of the first reflecting mirror is formed such that a radius of convex curvature of the cross-section along a vertical direction gradually increases from the center side to the end portion side in the vehicle width direction.

12. The device for visually confirming a forward direction according to claim 1, wherein at least a cross-section of the second reflecting mirror along a vehicle width direction is formed as a curved face having concave curvature that is concave to the forward side of the vehicle.

13. The device for visually confirming a forward direction according to claim 12, wherein the second reflecting mirror is arranged in front of the crew member seated on a seat of the vehicle.

14. The device for visually confirming a forward direction according to claim 1, wherein the first reflecting mirror and the second reflecting mirror are arranged at a center of a vehicle width of the vehicle on the dashboard.

15. The device for visually confirming a forward direction according to claim 14, wherein at least a cross-section of the second reflecting mirror along a vehicle width direction is formed as a curved face having concave curvature that is concave to the forward side of the vehicle, and wherein the second reflecting mirror is arranged so as to be inclined such that a mirror face faces a driver's seat side.

16. The device for visually confirming a forward direction according to claim 1, wherein a first transmission suppressing part that suppresses transmission of light is disposed in a center portion of a mirror face of one of the first reflecting mirror and the second reflecting mirror in a horizontal direction.

17. The device for visually confirming a forward direction according to claim 16, wherein the first transmission suppressing part is disposed in the first reflecting mirror.

18. The device for visually confirming a forward direction according to claim 16, wherein, in at least one of end portions of the mirror face of the first reflecting mirror in the horizontal direction, a second transmission suppressing part that suppresses transmission of light is disposed at a position located on an upper side of a center of a line that joins an upper end and a lower end of the mirror face in a vertical direction of the vehicle.

19. The device for visually confirming a forward direction according to claim 18, wherein the second transmission suppressing part is configured by a gradation film or a polarizing filter.

20. The device for visually confirming a forward direction according to claim 16, wherein the transmission suppressing part is configured by a gradation film or a polarizing filter.

21. The device for visually confirming a forward direction according to claim 1, wherein a position recognition mark displayed by position recognition displaying means is arranged on a road face side of the reflected image in a mirror image, which is reflected on the second reflecting mirror, visually recognized by a driver.

22. The device for visually confirming a forward direction according to claim 21, wherein the position recognition displaying means is disposed in a black-printed part that is printed in a band shape along a lower edge of a front window shield glass of the vehicle, and wherein the displayed position recognition mark forms a linear shape in a vertical direction of the vehicle.

23. The device for visually confirming a forward direction according to claim 22, wherein the position recognition displaying means is configured by a slit-shaped notch that is formed in the black-printed part.

24. The device for visually confirming a forward direction according to claim 21, wherein the position recognition displaying means is configured by a bar-shaped mark that is formed in a linear shape along a traveling direction of the vehicle on a face that is an upper face of the dashboard and faces a front window shield glass.

25. The device for visually confirming a forward direction according to claim 24, wherein the position recognition displaying means is disposed in a defroster that is open to the upper face of the dashboard, and wherein the bar-shaped mark is configured by a frame of an outlet of the defroster that is radially formed with the first reflecting mirror set as a center.

26. The device for visually confirming a forward direction according to claim 1, wherein proximity checking means is disposed in a mirror image, which is visually recognized by a driver, reflected on the second reflecting mirror, wherein the proximity checking means is formed by a plurality of linear-shaped position checking means that is disposed along a vertical direction of the vehicle and is arranged in a horizontal direction with respect to a traveling direction of the vehicle, and wherein a gap between the position checking means decreases toward left and right sides.

27. The device for visually confirming a forward direction according to claim 26, wherein, in a front window shield glass of the vehicle, a band-shaped black-printed part is disposed along a peripheral edge, and wherein the position checking means is configured by an image of the mark disposed in the black-printed part that extends along a lower edge of the front window shield glass.

28. The device for visually confirming a forward direction according to claim 27, wherein the mark is configured by a slit-shape notch that is formed in the black-printed part.

29. The device for visually confirming a forward direction according to claim 26, wherein the position checking means is configured by an image of a bar-shaped mark that is formed in a linear shape along the traveling direction of the vehicle on a face that is an upper face of the dashboard and faces a front window shield glass.

30. The device for visually confirming a forward direction according to claim 29, wherein the bar-shaped mark is configured by a frame of an outlet of a defroster that is open to the upper face of the dashboard, and wherein the frame is radially formed with the first reflecting mirror set as a center.

31. The device for visually confirming a forward direction according to claim 1, wherein proximity checking means is disposed in a mirror image, which is visually recognized by a driver, reflected on the second reflecting mirror, wherein the proximity checking means is formed by a plurality of linear-shaped position checking means that is disposed along a vertical direction of the vehicle and is arranged in a horizontal direction with respect to a traveling direction of the vehicle, and wherein a width of the position checking means in the horizontal direction decreases toward left and right sides.

* * * * *